US012781722B2

(12) United States Patent
Meschke et al.

(10) Patent No.: US 12,781,722 B2
(45) Date of Patent: Nov. 3, 2026

(54) PRODUCTS, SYSTEMS AND METHODS FOR DISTRIBUTION OF FLUIDS AND MIXED CHEMICALS

(71) Applicant: Sonny's HFI Holdings, LLC, Wilmington, DE (US)

(72) Inventors: Timothy Meschke, Carver, MN (US); Matthew Olsen, Bloomington, MN (US); Rory Shanahan, Lakeville, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 0 days.

(21) Appl. No.: 19/186,817

(22) Filed: Apr. 23, 2025

(65) Prior Publication Data

US 2025/0334187 A1 Oct. 30, 2025

Related U.S. Application Data

(60) Provisional application No. 63/639,011, filed on Apr. 26, 2024, provisional application No. 63/639,024, (Continued)

(51) Int. Cl.
*F04B 13/00* (2006.01)
*B01F 23/40* (2022.01)
(Continued)

(52) U.S. Cl.
CPC .............. *F04B 13/00* (2013.01); *B01F 23/49* (2022.01); *B01F 35/833* (2022.01); (Continued)

(58) Field of Classification Search
CPC .... B08B 3/10; B08B 3/02; B08B 3/08; B08B 13/00; B08B 2203/0217; B08B 2203/027; (Continued)

(56) References Cited

U.S. PATENT DOCUMENTS

| | | | |
|---|---|---|---|
| 1,337,982 | A | 4/1920 | Frank |
| 3,288,072 | A | 11/1966 | Mckenzie |

(Continued)

FOREIGN PATENT DOCUMENTS

| | | | |
|---|---|---|---|
| CA | 2120504 | A1 | 6/1993 |
| CA | 1325464 | C | 12/1993 |

(Continued)

OTHER PUBLICATIONS

"Dosatron CS33 ChemStick With Bung Adaptor, 33 In." Kleen RiteCorp, obtained from <https://www.kleen-ritecorp.com/p-66257-dosatron-cs33-chemstick-with-bung-adaptor-33-in.aspx>.

(Continued)

*Primary Examiner* — Craig M Schneider
*Assistant Examiner* — Andrew J Rost
(74) *Attorney, Agent, or Firm* — Dorsey & Whitney LLP

(57) ABSTRACT

A fluid delivery manifold for use with a fluid delivery system includes a fluid passageway and at least one integrated valve, each with a plunger housing having an air chamber. The air chamber and the fluid passageway are non-fluidly coupled relative to each other. A valve plunger in the plunger housing blocks a valve orifice of the fluid outlet in a closed position to prevent passage of fluid, and opens to permit fluid to pass from a fluid inlet of the passageway through the valve orifice for dispensing from a fluid outlet. An actuator assembly coupled to each integrated valve includes an actuator configured to adjust a position of a valve limiter to adjustably control an effective valve orifice area of the valve orifice based on a distance of movement of the valve plunger to the open position.

14 Claims, 19 Drawing Sheets

Related U.S. Application Data filed on Apr. 26, 2024, provisional application No. 63/639,026, filed on Apr. 26, 2024, provisional application No. 63/639,068, filed on Apr. 26, 2024, provisional application No. 63/639,040, filed on Apr. 26, 2024, provisional application No. 63/639,050, filed on Apr. 26, 2024, provisional application No. 63/639,019, filed on Apr. 26, 2024, provisional application No. 63/639,059, filed on Apr. 26, 2024, provisional application No. 63/639,056, filed on Apr. 26, 2024, provisional application No. 63/639,046, filed on Apr. 26, 2024, provisional application No. 63/639,065, filed on Apr. 26, 2024, provisional application No. 63/639,053, filed on Apr. 26, 2024, provisional application No. 63/639,013, filed on Apr. 26, 2024, provisional application No. 63/639,060, filed on Apr. 26, 2024, provisional application No. 63/639,070, filed on Apr. 26, 2024.

(51) Int. Cl.

| | |
|---|---|
| ***B01F 35/83*** | (2022.01) |
| ***B05B 12/14*** | (2006.01) |
| ***B05C 5/02*** | (2006.01) |
| ***B05C 11/10*** | (2006.01) |
| ***B08B 3/02*** | (2006.01) |
| ***B08B 3/08*** | (2006.01) |
| ***B08B 3/10*** | (2006.01) |
| ***B08B 13/00*** | (2006.01) |
| ***B60S 3/00*** | (2006.01) |
| ***B60S 3/04*** | (2006.01) |
| ***F16K 1/12*** | (2006.01) |
| ***F16K 1/52*** | (2006.01) |
| ***F16K 11/22*** | (2006.01) |
| ***F16K 31/02*** | (2006.01) |
| ***F16K 31/06*** | (2006.01) |
| ***F16K 37/00*** | (2006.01) |
| ***G06F 16/2457*** | (2019.01) |

(52) U.S. Cl.

CPC ............ *B05B 12/1436* (2013.01); *B05C 5/02* (2013.01); *B05C 11/1036* (2013.01); *B08B 3/02* (2013.01); *B08B 3/08* (2013.01); *B08B 3/10* (2013.01); *B08B 13/00* (2013.01); *B60S 3/00* (2013.01); *B60S 3/04* (2013.01); *F16K 1/12* (2013.01); *F16K 1/523* (2013.01); *F16K 11/22* (2013.01); *F16K 31/02* (2013.01); *F16K 31/0655* (2013.01); *F16K 37/0016* (2013.01); *F16K 37/005* (2013.01); *G06F 16/24575* (2019.01); *B08B 2203/0217* (2013.01); *B08B 2203/027* (2013.01)

(58) Field of Classification Search

CPC .... B01F 23/49; B01F 35/833; B05B 12/1436; B05B 9/0409; B05B 7/32; B05C 5/02; B05C 11/1036; B60S 3/00; B60S 3/04; F16K 1/12; F16K 1/523; F16K 11/22; F16K 31/02; F16K 31/0655; F16K 37/0016; F16K 37/005; G06F 16/24575; G05D 7/00

See application file for complete search history.

(56) References Cited

U.S. PATENT DOCUMENTS

| | | | | |
|---|---|---|---|---|
| 3,756,456 | A | 9/1973 | Georgi | |
| 3,785,526 | A | 1/1974 | Shinn | |
| 3,788,344 | A | 1/1974 | Dyck | |
| 3,891,149 | A | 6/1975 | Rendemonti | |
| 3,918,489 | A | 11/1975 | Foster et al. | |
| 4,249,868 | A | 2/1981 | Kotyk | |
| 4,257,527 | A | 3/1981 | Snyder et al. | |
| 4,461,450 | A * | 7/1984 | Soland | F16K 37/0008 251/285 |
| 4,586,531 | A | 5/1986 | Lindell | |
| 4,588,163 | A | 5/1986 | Christensen | |
| 4,687,181 | A | 8/1987 | Simonelli et al. | |
| 4,691,850 | A | 9/1987 | Kirschmann et al. | |
| 4,715,791 | A | 12/1987 | Berlin et al. | |
| 4,874,014 | A | 10/1989 | Grant et al. | |
| 5,106,275 | A | 4/1992 | Santi et al. | |
| 5,203,366 | A * | 4/1993 | Czeck | B01F 35/22162 137/3 |
| 5,305,788 | A | 4/1994 | Mayeux | |
| 5,441,392 | A | 8/1995 | Lundback | |
| 5,803,122 | A | 9/1998 | Theilmeier | |
| 5,876,189 | A | 3/1999 | Lukas et al. | |
| 5,971,723 | A | 10/1999 | Bolt et al. | |
| 5,996,629 | A | 12/1999 | Sato et al. | |
| 6,113,007 | A | 9/2000 | Bagnara et al. | |
| 6,192,932 | B1 | 2/2001 | Izumo et al. | |
| 6,240,953 | B1 | 6/2001 | Laughlin et al. | |
| 6,250,502 | B1 | 6/2001 | Cote et al. | |
| 6,360,138 | B1 | 3/2002 | Coppola et al. | |
| 6,419,462 | B1 | 7/2002 | Horie et al. | |
| 6,478,547 | B1 | 11/2002 | Savard et al. | |
| 6,517,891 | B1 | 2/2003 | Estelle et al. | |
| 6,619,321 | B2 | 9/2003 | Reid et al. | |
| 6,718,216 | B2 | 4/2004 | Grier | |
| 6,769,666 | B2 | 8/2004 | Hall et al. | |
| 6,837,269 | B2 | 1/2005 | Reinelt et al. | |
| 6,874,537 | B2 | 4/2005 | Hayashi et al. | |
| 7,007,828 | B2 | 3/2006 | Speight | |
| 7,045,021 | B2 | 5/2006 | Ewing et al. | |
| 7,070,159 | B2 * | 7/2006 | Kajitani | F16K 31/047 251/285 |
| 7,090,190 | B2 * | 8/2006 | Yasue | F16K 7/17 251/285 |
| 7,117,886 | B2 * | 10/2006 | Kajitani | G05D 16/202 251/285 |
| 7,861,740 | B2 | 1/2011 | Phallen et al. | |
| 8,136,441 | B2 | 3/2012 | Darbois et al. | |
| 8,163,096 | B2 | 4/2012 | Belanger et al. | |
| 8,210,493 | B2 * | 7/2012 | Miyagawa | F16K 31/046 251/285 |
| 8,262,058 | B2 | 9/2012 | Kot | |
| 8,292,264 | B2 | 10/2012 | Hoffmann et al. | |
| 8,322,367 | B2 | 12/2012 | Harris et al. | |
| 8,511,513 | B2 | 8/2013 | Schultz | |
| 8,527,372 | B2 | 9/2013 | Sanville et al. | |
| 8,641,830 | B2 | 2/2014 | Molitor et al. | |
| 8,678,237 | B2 | 3/2014 | Harris et al. | |
| 8,807,158 | B2 | 8/2014 | Harris et al. | |
| 8,887,743 | B2 | 11/2014 | Molitor et al. | |
| 8,899,452 | B2 | 12/2014 | Takanohashi | |
| 9,103,339 | B2 | 8/2015 | Gammon | |
| 9,353,884 | B2 | 5/2016 | Hasunuma et al. | |
| 9,389,114 | B2 | 7/2016 | Rietsch et al. | |
| 9,421,559 | B2 | 8/2016 | Cornett et al. | |
| 9,421,566 | B2 | 8/2016 | Harris et al. | |
| 9,643,135 | B1 * | 5/2017 | Mazzei | B01F 35/1452 |
| 9,662,453 | B2 | 5/2017 | Teutsch et al. | |
| 9,803,754 | B2 | 10/2017 | Thompson | |
| 9,932,018 | B2 | 4/2018 | Krause et al. | |
| 10,060,537 | B2 | 8/2018 | Yanagida et al. | |
| 10,132,415 | B2 | 11/2018 | Tanikawa et al. | |
| 10,144,396 | B1 | 12/2018 | Krause et al. | |
| 10,369,294 | B2 | 8/2019 | Abbott | |
| 10,443,747 | B2 | 10/2019 | Harris et al. | |
| 10,488,244 | B1 | 11/2019 | Krause et al. | |
| 10,514,028 | B2 | 12/2019 | Imamura | |
| 10,550,944 | B2 | 2/2020 | Walter et al. | |
| 10,591,446 | B2 | 3/2020 | Nocon et al. | |
| 10,682,989 | B2 | 6/2020 | Blackstock | |
| 10,730,486 | B1 | 8/2020 | Krause et al. | |
| 10,767,785 | B2 | 9/2020 | Taya et al. | |
| 10,883,615 | B2 | 1/2021 | Goto et al. | |

(56) References Cited

U.S. PATENT DOCUMENTS

| | | | |
|---|---|---|---|
| 10,890,166 | B2 | 1/2021 | Murakoshi et al. |
| 10,895,331 | B2 | 1/2021 | Enzaki |
| 10,948,261 | B2 | 3/2021 | Luke |
| 10,968,901 | B2 | 4/2021 | Furet et al. |
| 11,028,808 | B2 | 6/2021 | Okamura et al. |
| 11,199,187 | B2 | 12/2021 | Oda et al. |
| 11,215,173 | B2 | 1/2022 | Teshima et al. |
| 11,261,992 | B2 | 3/2022 | Tempel |
| 11,337,381 | B1 | 5/2022 | Nelson et al. |
| 11,384,864 | B2 | 7/2022 | Yamada et al. |
| 11,434,897 | B2 | 9/2022 | Yanagibayashi et al. |
| 11,518,553 | B2 | 12/2022 | Kleinheinz et al. |
| 11,635,015 | B2 | 4/2023 | Stephens et al. |
| 11,649,907 | B2 | 5/2023 | Eurich |
| 11,936,072 | B2 | 3/2024 | Hirai et al. |
| 12,018,668 | B2 | 6/2024 | Reinhard et al. |
| 12,018,672 | B2 | 6/2024 | Heintzelman et al. |
| 12,031,529 | B2 | 7/2024 | Baeuerle |
| 12,044,222 | B2 | 7/2024 | Arnold et al. |
| 12,055,138 | B2 | 8/2024 | Rawlings |
| 12,055,139 | B2 | 8/2024 | Roberts et al. |
| 12,070,765 | B2 | 8/2024 | Post et al. |
| 12,092,099 | B2 | 9/2024 | Ogawa et al. |
| 12,135,046 | B2 | 11/2024 | Kang et al. |
| 12,435,814 | B2 | 10/2025 | Wagner-StÜRz |
| 12,611,700 | B2 | 4/2026 | Meschke et al. |
| 12,623,257 | B2 | 5/2026 | Meschke et al. |
| 2004/0220817 | A1 | 11/2004 | Sanville et al. |
| 2005/0022814 | A1 | 2/2005 | Manhard |
| 2005/0161625 | A1 | 7/2005 | Beh et al. |
| 2008/0046278 | A1 | 2/2008 | Sanville et al. |
| 2009/0026220 | A1 | 1/2009 | Ramnarine |
| 2009/0088874 | A1 | 4/2009 | Arceo et al. |
| 2010/0186778 | A1 | 7/2010 | Martin |
| 2011/0052379 | A1 | 3/2011 | Link |
| 2011/0192433 | A1 | 8/2011 | Harris et al. |
| 2012/0004776 | A1 | 1/2012 | Abad |
| 2012/0298035 | A1 | 11/2012 | Macneil |
| 2013/0103585 | A1 | 4/2013 | Carapelli |
| 2013/0202456 | A1 | 8/2013 | Lucas et al. |
| 2014/0042242 | A1 | 2/2014 | Fritze et al. |
| 2016/0037738 | A1 | 2/2016 | Kato et al. |
| 2016/0050862 | A1 | 2/2016 | Walliser |
| 2016/0185589 | A1 | 6/2016 | Uhlhorn et al. |
| 2017/0185092 | A1 | 6/2017 | Mäkinen et al. |
| 2017/0189868 | A1 | 7/2017 | Meyer et al. |
| 2017/0198822 | A1 | 7/2017 | Harris et al. |
| 2018/0345918 | A1 | 12/2018 | Foerg et al. |
| 2019/0022607 | A1 | 1/2019 | Flood |
| 2019/0056977 | A1 | 2/2019 | Wang et al. |
| 2019/0061705 | A1 | 2/2019 | Blackstock |
| 2020/0022322 | A1 | 1/2020 | Lafian |
| 2020/0148175 | A1 | 5/2020 | Mayer et al. |
| 2020/0396917 | A1 | 12/2020 | Olesen et al. |
| 2021/0053018 | A1 | 2/2021 | Dyer |
| 2021/0349482 | A1 | 11/2021 | Martin et al. |
| 2022/0333584 | A1 | 10/2022 | Roberts et al. |
| 2023/0139033 | A1 | 5/2023 | Schlueter et al. |
| 2024/0299891 | A1 | 9/2024 | Martin et al. |
| 2025/0332554 | A1 | 10/2025 | Meschke et al. |
| 2025/0332609 | A1 | 10/2025 | Meschke et al. |
| 2025/0332616 | A1 | 10/2025 | Meschke et al. |
| 2025/0332617 | A1 | 10/2025 | Meschke et al. |
| 2025/0332618 | A1 | 10/2025 | Meschke et al. |
| 2025/0332621 | A1 | 10/2025 | Meschke et al. |
| 2025/0333026 | A1 | 10/2025 | Meschke et al. |
| 2025/0333027 | A1 | 10/2025 | Meschke et al. |
| 2025/0333028 | A1 | 10/2025 | Meschke et al. |
| 2025/0334182 | A1 | 10/2025 | Meschke et al. |
| 2025/0334183 | A1 | 10/2025 | Meschke et al. |
| 2025/0334184 | A1 | 10/2025 | Meschke et al. |
| 2025/0334186 | A1 | 10/2025 | Meschke et al. |
| 2025/0334193 | A1 | 10/2025 | Meschke et al. |

FOREIGN PATENT DOCUMENTS

| | | | |
|---|---|---|---|
| CN | 209002347 | U | 6/2019 |
| CN | 110588581 | A | 12/2019 |
| CN | 111623852 | A | 9/2020 |
| CN | 112470907 | A | 3/2021 |
| EP | 0255791 | B1 | 12/1989 |
| EP | 0631119 | A1 | 12/1994 |
| EP | 1795875 | B1 | 10/2008 |
| JP | H0761225 | B2 | 7/1995 |
| JP | H0785694 | B2 | 9/1995 |
| JP | 2556232 | Y2 | 12/1997 |
| JP | H10300558 | A | 11/1998 |
| JP | 4242629 | B2 | 1/2009 |
| JP | 5196355 | B2 | 2/2013 |
| JP | 2022045794 | A | 3/2022 |
| JP | 2022046994 | A | 3/2022 |
| KR | 20150123304 | A | 11/2015 |
| KR | 20160076491 | A | 6/2016 |
| KR | 20170001251 | U | 4/2017 |
| WO | 2008024910 | A2 | 2/2008 |
| WO | 2020227822 | A1 | 11/2020 |

OTHER PUBLICATIONS

"Drum Plug Types," Gizmo Engineering, obtained from <https://gizmo-engineering.com/information/technical-information/drum-plug-styles/>.

"How does a dosing pump work?" Dosatron, Ingersoll Rand, https://www.dosatron.com/en-us/technology.

"Spot-On," Spotless Wash Solutions, retrieved Mar. 27, 2024 from <https://spotlesswashsolutions.com/spot-on-chemical-dispensing/>.

"Why Spot-On Chemical Dispensing," Spot-On Control Platform, Spotless Wash Solutions, obtained May 23, 2024 from <https://spotlesswashsolutions.com/wp-content/uploads/2024/05/040424-CC-Spoton-Broch-Gatefold-April-5-HR-OT.pdf>, 2 pages.

International Search Report and Written Opinion dated Nov. 21, 2025 in connection with International Patent Application No. PCT/US2025/025896, 13 pages.

Office Action Issued in U.S. Appl. No. 19/186,775, mailed on Jul. 14, 2026, 44 pages,.

* cited by examiner

PRODUCTS, SYSTEMS AND METHODS FOR DISTRIBUTION OF FLUIDS AND MIXED CHEMICALS

CROSS-REFERENCE TO RELATED APPLICATIONS

This application claims the benefit of U.S. Provisional Patent Application Nos. 63/639,011, 63/639,013, 63/639,019, 63/639,024, 63/639,026, 63/639,040, 63/639,046, 63/639,050, 63/639,053, 63/639,056, 63/639,059, 63/639,060, 63/639,065, 63/639,068, and 63/639,070, all filed Apr. 26, 2024, the contents of each of which are incorporated by reference herein in their entireties.

TECHNICAL FIELD

Vehicle wash components and fluid management systems including such vehicle wash components are provided for use in locations where vehicles are washed.

BACKGROUND

Car washes are often labor, equipment maintenance, and input intensive. In addition, chemicals used in the car wash industry have become increasingly concentrated in order to reduce material handling concerns and shipping costs of those chemicals. Car washes distribute fluids such as motive fluids using manifolds used with fluid delivery systems. Manifolds for use with a fluid delivery system are disclosed, for example, in U.S. Pat. No. 10,443,747 B2.

SUMMARY

A fluid delivery manifold for use with a fluid delivery system, according to certain implementations, may include a fluid passageway including a fluid inlet and a fluid outlet; at least one integrated valve, each integrated valve including a plunger housing, the plunger housing including an air chamber and configured to receive a valve limiter within an interior thereof. The fluid inlet, the fluid outlet, and the plunger housing may be integrally-constructed. A valve plunger may be arranged in the plunger housing configured to block a valve orifice of the fluid outlet in a closed position of the valve plunger to prevent passage of fluid from the fluid inlet through the valve orifice, and to open the valve orifice in an open position of the valve plunger to permit the passage of the fluid from the fluid inlet through the valve orifice for dispensing from the fluid outlet. An actuator assembly may be coupled to each integrated valve of the at least one integrated valve, each actuator assembly including an actuator and the valve limiter. The actuator may be configured to adjust a position of the valve limiter to adjustably control an effective valve orifice area of the valve orifice based on a distance of movement of the valve plunger to the open position. The air chamber and the fluid passageway may be non-fluidly coupled relative to each other.

In various implementations and alternatives, the valve plunger may include a parabolic tip.

The actuator may be configured for linearly adjusting the valve limiter to cause a linear change in the effective valve orifice area. The valve limiter may optionally be in a threaded engagement with the actuator, and/or the actuator may optionally be configured as one of a linear stepper motor or a proportional solenoid.

A return spring may be configured to engage with a plunger head of the valve plunger for biasing the valve plunger in the closed position such that the valve plunger normally blocks the passage of the fluid through the valve orifice. The air chamber may be configured to receive pressurized air to overcome a bias of the return spring during an on cycle of the fluid delivery manifold to thereby cause the valve plunger to move to the open position by a predetermined distance based on the position of the valve limiter. The valve limiter may be arranged within coils of the return spring, or the valve limiter is configured as a sleeve arranged about an exterior of the coils.

A control system may control the position of the valve limiter, and the control system may be integrated into an assembly including the fluid delivery manifold. The control system may be configured to receive a selection from a user corresponding to a selected outlet pressure, and based on the selected outlet pressure, the control system is configured cause the actuator assembly to adjust the position of the valve limiter to reach a target flow rate or a target outlet pressure of the motive fluid when the valve plunger is in the open position.

A pressure sensor may be fluidly coupled to the fluid delivery system, and the control system may be communicatively coupled to the pressure sensor and configured to cause the position of the valve limiter to be adjusted at least based on pressure sensor data. The pressure sensor may be located on a motive fluid pump fluidly coupled to the fluid inlet. Another pressure sensor may be fluidly coupled to the fluid outlet, and the control system may be communicatively coupled to the another pressure sensor and configured to cause the position of the valve limiter to be adjusted at least based on pressure sensor data of the another pressure sensor.

In various implementations and alternatives, the valve plunger may normally be in the closed position such that the valve plunger blocks the valve orifice, and the air chamber may be configured to receive pressurized air to thereby cause the valve plunger to move to the open position by a predetermined distance based on the position of the valve limiter. At least one solenoid valve may be fluidly coupled to the air chamber for delivering the pressurized air to the air chamber, where the control system may be further configured to control an actuation status of each of the at least one solenoid valve.

The control system may be further configured to control at least one chemical supply, each of the at least one chemical supplies fluidly coupled to a mixing site, each mixing site configured to receive motive fluid from the fluid outlet and chemical from a respective chemical supply of the at least one chemical supply, mix the motive fluid and the chemical to form a mixture, and dispense the mixture. Optionally, at least one solenoid valve may be fluidly coupled to the air chamber for delivering pressurized air to the air chamber and fluidly coupled to a drive mechanism of the chemical supply, and the control system may optionally be further configured to control an actuation status of the at least one solenoid valve to cause the motive fluid and the chemical to be dispensed, to thereby result in the dispensed motive fluid and chemical being received at the mixing site. Optionally, the fluid delivery manifold, the control system, and at least a portion of each of the at least one chemical supplies are mounted on a common structure.

The at least one integrated valve may be a plurality of integrated valves, and the control system may be communicatively coupled to and configured to control each actuator of the plurality of integrated valves to control the position of each valve limiter. In such cases, each of the air chambers may be fluidly coupled to an individual solenoid valve of the at least one solenoid valve such that the control system is configured to individually control fluid dispensing from each of the fluid outlets of the plurality of integrated valves.

The fluid passageway may be configured as a common fluid channel of successively fluidly connected individual fluid inlets, or the fluid passageway may further include a fluid rail configured to receive each of the individual fluid inlets at a plurality of outlet ports of the fluid rail. Optionally, an inlet port of the fluid rail may be fluidly coupled between a motive fluid source and the plurality of fluid rail outlet ports.

A method of delivering motive fluid from a fluid delivery manifold for use with a fluid delivery system, according to certain implementations, may involve: using the described fluid delivery manifold to adjust the position of the valve limiter; and causing the valve plunger to be moved to the open position in which the valve plunger contacts the valve limiter to thereby define the effective valve orifice area of the valve orifice such that the fluid is dispensed from the fluid outlet at a flow rate based on the effective valve orifice area. In some cases, the described control system may receive a selection from a user corresponding to a selected outlet pressure, and the flow rate of the fluid dispensed from the fluid outlet corresponds to the selected outlet pressure.

DETAILED DESCRIPTION

Figure 1:
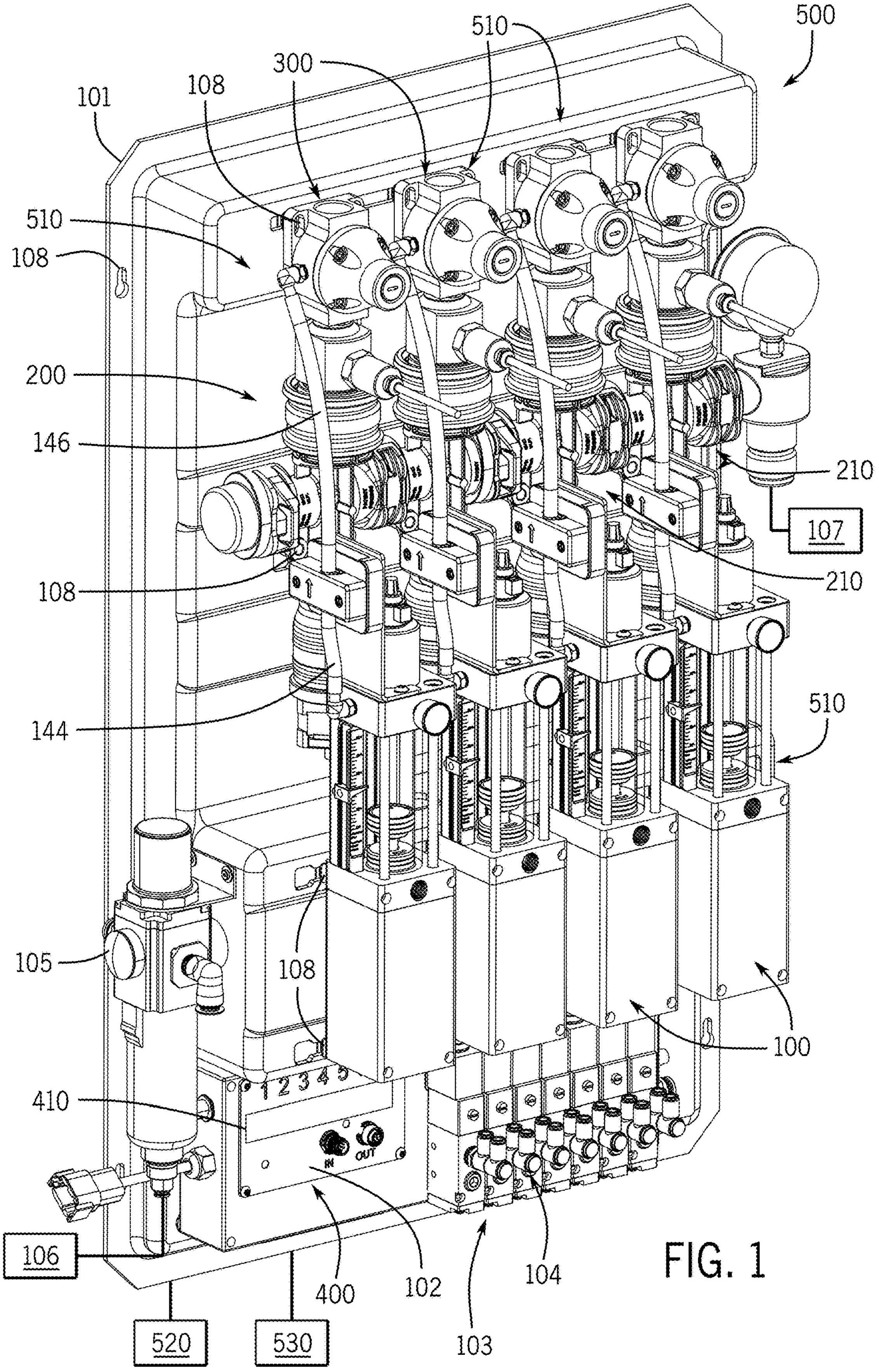
FIG. 1 illustrates a fluid management system according to various implementations of the present disclosure.

Disclosed are vehicle wash components and fluid management systems including such vehicle wash components. The vehicle wash components, according to the present disclosure, may include fluid delivery devices including but not limited to motive fluid delivery devices, chemical delivery devices, mixing sites, and assemblies thereof. The vehicle wash components may be configured to receive fluids and/or chemicals from upstream components, such as motive fluid sources, chemical supplies, driving fluid sources, pumps, regulators, electrical supplies, and so on. The received fluids and/or chemicals may be distributed by the vehicle wash components to downstream components such as fluid conduits for subsequent application to vehicles by vehicle wash applicators (e.g., nozzles and foamers) of a vehicle wash system. Control systems may be integrated with the vehicle wash components and/or the fluid management systems. Some control systems may be configured for closed loop control of the vehicle wash components and systems. Vehicle wash systems of the present disclosure may include the vehicle wash components and/or their fluid management systems, alone or in combination with other components, devices and systems for use in vehicle wash system.

The fluid management systems may be configured as chemical distribution systems, fluid distribution systems, and/or diluted chemical distribution systems. Such systems may be electrically actuated and driven by mechanical- and/or pressure-driven drive mechanisms, such as a pressurized air source or a pressurized liquid source. In implementations, the vehicle wash components and fluid management systems may inject or dispense chemicals and motive fluid for downstream mixing, and may use a control system, such as a closed loop feedback system, to monitor and regulate variables impacting dilution solutions including but not limited to: pressure, flow rates, and/or dilution ratios of fluids, chemicals, and mixtures thereof.

Fluids managed and dispensed by the vehicle wash components and systems include motive fluid and chemicals. Motive fluids managed and dispensed by the vehicle wash components may include but are not limited to water, such as pressurized water delivered from a pump, or water delivered from a municipal water source, a reclaimed water source, a water softener or a reverse osmosis system. Chemicals managed and dispensed by the vehicle wash components may include but are not limited to concentrated chemicals, mixed chemicals, diluted chemicals such as aqueous solutions of diluted chemical in water, water, and other supplies of liquid chemicals for use in vehicle wash systems, e.g., car washes, such as liquid soap, degreasers, detergents, ceramic solutions, waxes, drying agents, fragrances, sealants, tire dressing, window cleaner, protectants.

The vehicle wash systems of the present disclosure may include vehicle washes at a vehicle wash location (e.g., at a car wash) and vehicle wash stations within such locations. The vehicle wash systems generally include a centralized or main car wash controller 700 configured for operation of the vehicle wash system in connection with vehicle wash operations applied to a vehicle such as washing, rinsing, shining, coating, and drying the vehicle. The vehicle wash components and fluid management systems of the present disclosure may be utilized on-site within these vehicle wash systems.

Turning to FIG. 1, illustrated is a fluid management system 500 including four positions 510 or vehicle wash assemblies, e.g., four chemical delivery devices such as syringe pumps 100, motive fluid delivery devices such as a motive fluid delivery manifold 200 with four outlets, and four mixing sites such as loading valves 300, a control system 400, a power source 520, and a user interface 530.

Chemical delivery devices may be responsible for the delivery of chemical from the fluid management system 500, and in some implementations may be configured as a positive displacement syringe pump 100. The syringe pump 100 may be configured for dispensing metered chemical received from a chemical supply to fluidly coupled downstream components of the systems provided herein such as a mixing site or a vehicle wash applicator, e.g., via fluid lines configured as outlet tubes 144, 146. Although the fluid management system 500 illustrated in FIG. 1 includes syringe pumps 100 for chemical dispensing, other chemical delivery devices may be employed such as eductors that rely on vacuum or suction for the dispensing of chemical.

The fluid delivery manifold 200 may be responsible for the delivery and metering of motive fluid (e.g., water) according to the present disclosure. For instance, the fluid delivery manifold 200 may serve as an on/off valve for the motive fluid delivery from a motive fluid source (e.g., a pump), as well as a throttling/metering device to control motive fluid flow rate. The fluid delivery manifold 200 may have a modular construction for coupling with other fluid delivery manifolds 200, may have integrated manifold assemblies, and/or be adapted to fluidly couple to a variety of downstream components of the systems provided herein. For instance, as shown in FIG. 1, the fluid delivery manifold 200 having four outlets may be fluidly coupled to four mixing sites and may deliver motive fluid to respective inlets thereof.

Mixing sites may be responsible for receipt, mixing and discharge of dispensed chemical and motive fluid from a respective chemical delivery device and motive fluid delivery device of the fluid management system 500, and in some implementations may be configured as loading valves 300. Prior to reaching the mixing site, the chemical and motive fluid may accordingly be separate and unmixed with each other. Loading valves 300 be configured to mix pressurized chemical received from a respective syringe pump 100 with pressurized motive fluid received from the fluid delivery manifold 200. The mixing site may be responsible for the delivery of a mixed solution of the motive fluid and chemical to downstream components of the systems provided herein. While the fluid management system 500 illustrates loading valves 300 for mixing pressurized chemical and motive fluid, in some implementations, the fluid management system may include other mixing sites such as eductors for mixing dispensed chemical and pressurized motive fluid.

The fluid management systems of the present disclosure may be controlled by the control system 400. The control system 400 may be responsible for controlling the vehicle wash components, e.g., the syringe pumps 100, fluid delivery manifold 200, loading valves 300, as well as the other components of the fluid management systems, e.g., a valve node 102, a valve bank 103, individual valves 104, a pressure regulator 105, a pressurized air source 106, and a pressurized fluid source 107, which may be configured with electrical and/or mechanical components operable by the control system 400. In some implementations, the control system 400 may be configured to control components of vehicle wash systems such as external pumps and/or fluid supplies, as provided herein. The control system 400 may include one or more processors 410 with associated memory and may be programmed to cause various operations of the fluid management systems. The control system 400 may be programmed with instructions to control or perform methods or operations described herein. In some examples, the control system 400 includes a programmable logic controller (PLC) configured to be programmed to control or perform methods or operations described herein. In some examples, methods of the present disclosure may be stored as executable instructions in memory or other computer-readable medium of the control system 400 (e.g., the one or more processors 410). The executable instructions may be executed by the one or more processors 410 or processing circuitry to perform such methods. The control system 400 may be configured to control the various components of the present disclosure, including providing closed loop control thereof, e.g., closed loop control of a rate of chemical and/or motive fluid dispensing. The control system 400 may be configured to individually control the one or more vehicle wash components of the position 510, e.g., a syringe pump 100 and fluid delivery manifold 200, as well as other communicatively coupled components provided herein below. For instance the control system 400 may control dispensing from an assembly of one syringe pump 100 and/or fluid delivery manifold 200 by sending control signals, such as separate or common control signals for its/their operation, e.g., for coordinated or simultaneous operation. In some cases one or more processors 410 of the control system 400 may be configured to individually control one position 510 (e.g., one syringe pump 100 and/or one valve of the fluid delivery manifold 200) of the fluid management system 500, resulting in the control system 400 having at least one dedicated processor for each position 510 for instance by controlling a power source 520 of the fluid management system 500. The control system 400, or components thereof may also be integrated into the physical assemblies of the disclosed vehicle wash components and fluid management systems.

While the fluid management system 500 includes four positions 510, it will be appreciated that the system 500 may include more or fewer positions 510, for instance, based on the target wash site or target vehicle wash applicator. In addition, while the positions 510 of the fluid management 500 system are illustrated as vehicle wash assemblies including three vehicle wash components, it will be appreciated that each position may include more or fewer vehicle wash components. The positions 510 may be mounted on a common panel 101 or other structure as provided herein. In some examples the multiple positions 510 of a given panel 101 may be dedicated to a single bay or tunnel of a vehicle wash location. Alternatively, the multiple positions 510 of a given panel 101 may dispense to multiple bays or tunnels at the vehicle wash location. In another example, the multiple positions 510 of a given panel 101 may be dedicated to dispensing on a single car during a vehicle wash operation. Alternatively, the positions of the panel may dispense on multiple vehicles simultaneously or substantially simultaneously as the vehicles pass through the vehicle wash location in sequence within the tunnel or in parallel when multiple bays or tunnels are used simultaneously at the vehicle wash location.

Figure 5A:
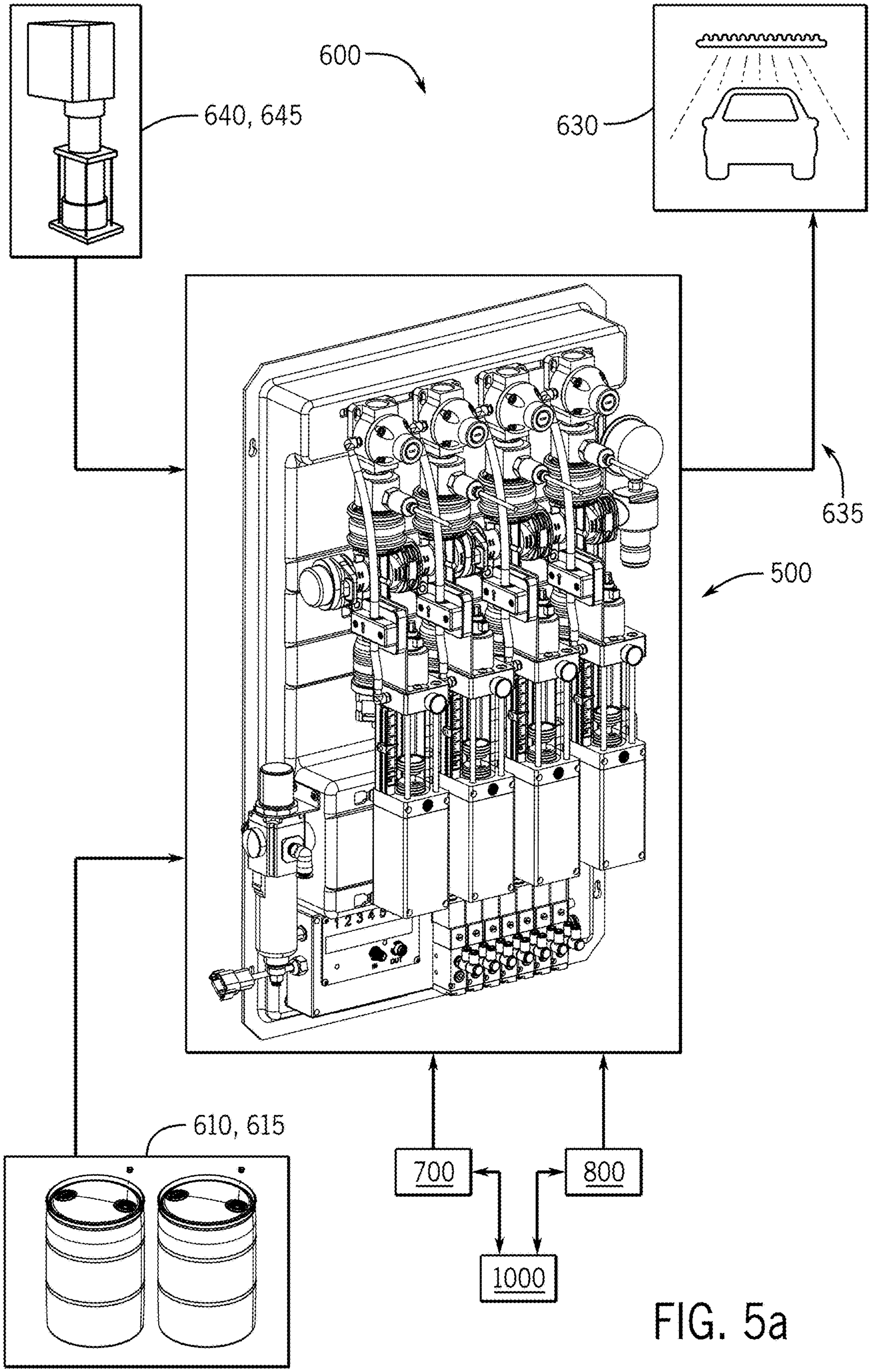
FIG. 5*a* illustrates the fluid management system of FIG. 1 in combination with components of a vehicle wash system, according to various implementations of the present disclosure.

The fluid management systems may be powered via a power source 520, which may be independent from a power source of a car wash controller 700 (FIG. 5*a*). In some implementations, the control system 400 may be configured to control delivery of power from the power source 520, and thus actuation of the mechanical and/or electrical components of the components of the position 510 of the fluid management systems. Accordingly, the control system 400 may be configured to send instructions to cause the component(s) of the position 510 to be powered at a voltage independent of the sensed voltage from the car wash controller 700 or otherwise. For example, the mechanical and/or electrical components of the vehicle wash component(s) may not be communicatively coupled to the car wash controller 700 and may not be capable of receiving instructions therefrom. The mechanical and/or electrical component(s) of the position 510 may instead be caused to operate by the control system 400 causing the power source 520 to power such components. The power source 520 may be integrated into the fluid management system or may be arranged separately within the confines of the vehicle wash location and may be configured as a breaker box, for example.

The user interface 530 may enable a user to enter inputs into the control system 400 such as selections of operating parameters, chemical types to be delivered from the system 500, applicator nozzles, fluid lines, and so on. The user interface 530 may be configured with a processor and memory and be communicatively coupled to the system 500 via a wired or wireless connection. For instance, the user interface 530 may be provided as a tablet, mobile phone, computer, etc., or may be a local user interface integrated into the system 500, e.g., on the panel 101. Accordingly, the user interface 530 may be located at the vehicle wash location housing the system 500, may be remote from the system 500, or may be integrated into the assembly forming the system 500.

The vehicle wash components as well as other components of the fluid management systems may form a unitary assembly, may optionally be mounted on or in the fluid management systems, such as on a common structure such as a panel 101, which may include a frame, a thermoformed structure, a sheet metal substrate. The assembly or structure may be free-standing, may be mounted on a wall, or be secured at a vehicle wash location. In implementations, the valve node 102, the valve bank 103, individual valves 104, the pressure regulator 105, the pressurized air source 106, the pressurized fluid source 107, and mounting structure 108 are example components that may be used in connection with or integrated into the vehicle wash components and fluid management systems and assemblies of the present disclosure. In some implementations, chemical supplies such as vessels containing chemical may be integrated into the assembly or structures provided herein.

Fluid Delivery Manifolds

Delivery of motive fluid (e.g., water) and its metering may be achieved using the fluid delivery manifold 200 of the present disclosure. The fluid delivery manifold 200 or components thereof may be configured to be controlled by the control system 400. The fluid delivery manifold 200 may accordingly be a component of the fluid management system 500 of the present disclosure.

Figure 2A:
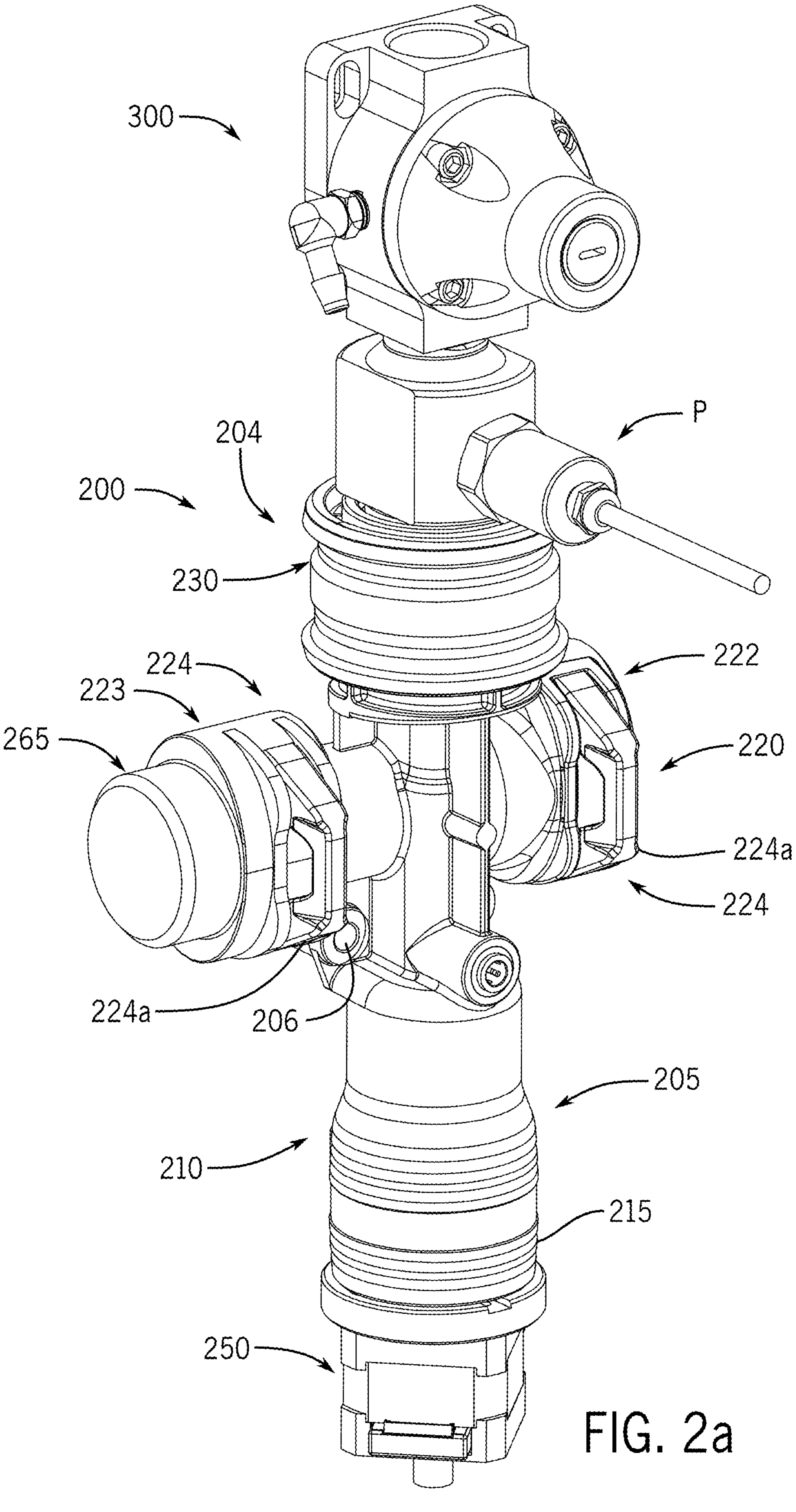
FIGS. 2*a*-2*f* illustrate various views of a fluid delivery manifold, according to various implementations of the present disclosure.
Figure 2B:
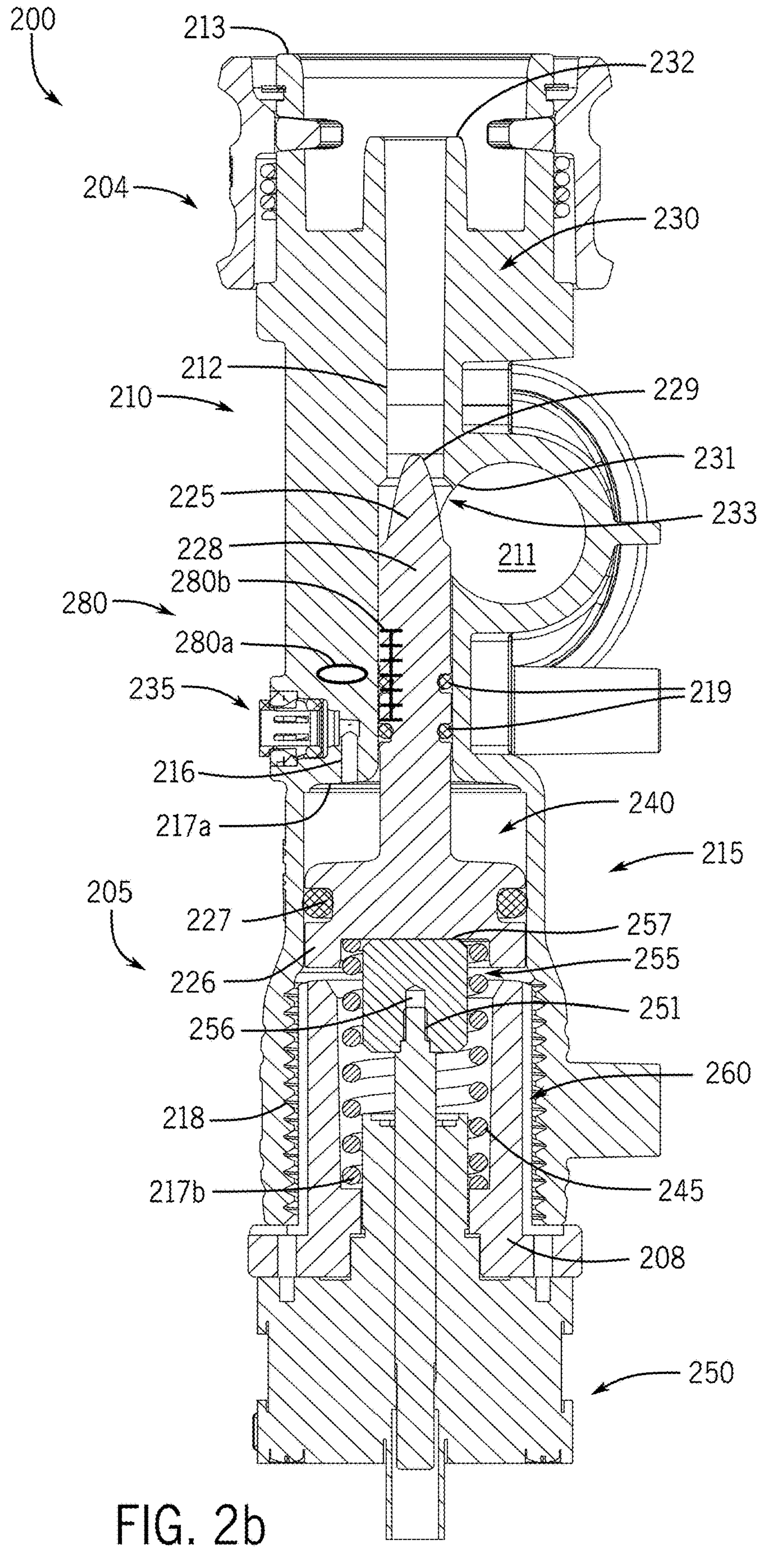
Figure 2C:
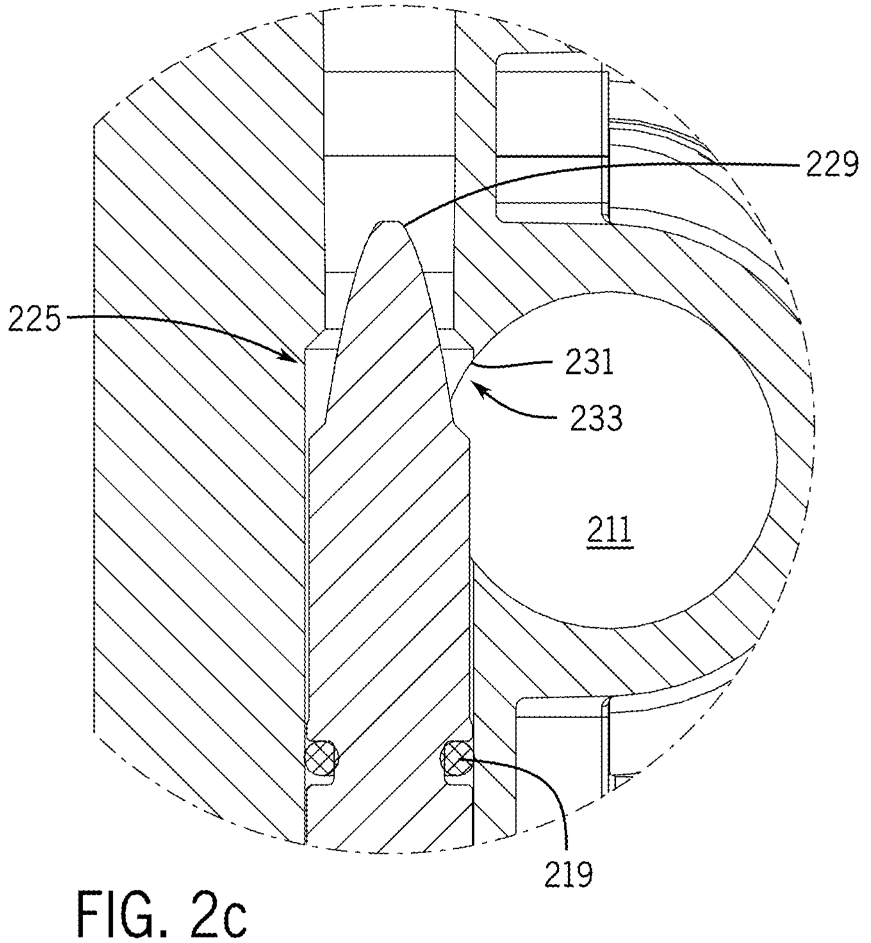

Turning to FIGS. 2*a* and 2*b*, the fluid delivery manifold 200 is illustrated according to aspects the present disclosure. FIG. 2*a* illustrates the fluid delivery manifold 200 coupled to the loading valve 300 via a coupling mechanism 204, while FIG. 2*b* is a cross-section of the fluid delivery manifold 200.

The fluid delivery manifold 200 may include a coupling mechanism 204, an integrated valve 205, mounting structures 206, a manifold housing 210, a plunger housing 215, a fluid inlet 220, a valve plunger 225, a fluid outlet 230, an air inlet port 235, an air chamber 240, a return spring 245, an actuator 250, a valve limiter 255, an actuator assembly 260, and an end cap 265. In some cases, the fluid delivery manifold 200 may be a single inlet, single outlet manifold with one integrated valve 205, while in other cases, the fluid delivery manifold 200 may be coupled to adjacent fluid delivery manifolds 200 via their inlet portions to form a single fluid delivery manifold 200 with a single inlet and multiple fluid outlets and a corresponding number of integrated valves 205 to the fluid outlets (FIG. 1). Accordingly, fluid delivery manifold 200 may have a modular construction for coupling with other fluid delivery manifolds 200.

The coupling mechanism 204 may individually couple an outlet to downstream components such as a loading valve 300, a check valve, a pressure sensor P, or other fluid delivery components and conduits. The coupling mechanism 204 may be formed integrally with or separate from the fluid delivery manifold 200.

The mounting structures 206 may include feet or fasteners and may be integrally formed in the fluid delivery manifold 200 for securing to various external surfaces and/or objects, such as the panel 101 or other common structure for receiving multiple system components.

The integrated valve 205 may be arranged at an opposite end of the manifold housing 210 relative to the coupling mechanism 204 and may be configured as an air-actuated integrated valve 205. The integrated valve 205 may be configured to house and receive at least portions of the valve plunger 225, the air inlet port 235, the air chamber 240, the return spring 245, the actuator 250, and the valve limiter 255. The integrated valve may include or receive a sleeve 208, which may be threaded or have another coupler for engagement with the integrated valve 205 and/or the plunger housing 215.

The manifold housing 210 may define various components of the fluid delivery manifold 200 or portions thereof. For instance, the housing 210 may define a fluid ingress channel 211 or portions thereof, which may include the fluid inlet 220. An outlet channel 212 may be defined in the housing 210 and include the fluid outlet 230 or portions thereof. The fluid ingress channel 211, the outlet channel 212, the fluid inlet 220, and fluid outlet 230 may all be fluidly coupled to define a fluid passageway. The outlet channel 212 may be configured to receive a portion (e.g., stem) of the valve plunger 225 for blocking and controlling the flow of motive fluid from the fluid ingress channel 211 to the outlet channel 212 as provided herein. An outlet coupler 213 arranged at an egress of the outlet channel 212 may be defined by the housing 210 and may include a collar with threads, barbs or other coupling features. The outlet coupler 213 may define all or a portion of the coupling mechanism 204, and as illustrated, the outlet coupler 213/coupling mechanism 204 may be configured as a quick-connect coupling.

The housing 210 may also define portions of the integrated valve 205 such as portions of the plunger housing 215, air inlet port 235, and air chamber 240. For instance, an air channel 216 may be defined in the housing 210 as illustrated in FIG. 2*b*, which may be a component of the air inlet port 235 for the delivery of pressurized air to the plunger housing 215. In addition, all or a portion of the air chamber 240 of the plunger housing 215 may be defined by the housing 210.

In some implementations, the various components of the housing 210 may be integrally formed as a single piece or component, for example as shown in the cross-sectional view of the housing 210 depicted in FIG. 2*b*. For instance, the housing 210 and its various components may be formed through injection molding. By integrating one or more housing components the fluid delivery manifold 200 disclosed herein may be more resistant to leaks and corrosion than pre-existing fluid delivery devices.

The plunger housing 215 may provide a portion of the integrated valve 205 and may be configured to receive pressurized air via the air inlet port 235 and the air channel 216. All or portions of the plunger housing 215 and the integrated valve 205 may be integrally formed. An interior of the plunger housing 215 may define at least a portion of the air chamber 240 and may also be adapted to receive at least a portion of the valve plunger 225, the return spring 245, actuator 250, and valve limiter 255. The plunger housing 215 may be fluidly isolated from the fluid delivery components, e.g., the fluid ingress channel 211, the outlet channel 212, the fluid inlet 220, and the fluid outlet 230, by one or more seals 219 such as a series of dynamic gaskets or O-rings arranged in the housing 210 and/or the plunger housing 215. At one end, the interior of the plunger housing 215 may also define a floor of the air chamber 240. At the opposite end, the interior of the plunger housing 215 may define a coupler 218, such as a threaded bore, for securely coupling with the actuator 250 and/or the sleeve 208. As illustrated in FIG. 2*b*, the sleeve 208 and the actuator 250 may be coupled for instance via fasteners and the sleeve 208 may be threadedly engaged with the plunger housing 215 to thereby secure the actuator 250 to the integrated valve 205.

The fluid inlet 220 may define a portion of the fluid ingress channel 211 and may be configured to receive motive fluid from a motive fluid source. One or more seals 221 such as O-rings or gaskets may be provided at the fluid inlet 220 for providing a fluid tight coupling with other fluid delivery components, such as a hose coupled to a water pump or an adjacent fluid inlet 220 of an adjacent fluid delivery manifold 200. An inlet coupler 222 may define a portion of, or may be joined to, the fluid inlet 220 and may be configured to couple to a fluid conduit of the motive fluid source such as the pressurized fluid source 107, or to an adjacent housing 210 of the adjacent fluid delivery manifold 200. Inlet fastening regions 224 on opposing sides of the fluid inlet 220 may be configured to secure the fluid inlet 220 to an adjacent fluid conduit or adjacent housing 210 by any suitable fastening means such as via a spring clip 224*a*, threaded connection, bayonet connection, and combinations. The inlet coupler 222 and fastening regions 224 may be integrally formed by the housing 210. The fluid ingress channel 211 may be configured to extend through the entirety of the housing 210 transversely relative to a longitudinal axis of the plunger housing 215 and the fluid ingress channel 211 may be defined in one or multiple fluid inlets 220. For instance, the fluid ingress channel 211 may be configured as a common fluid channel of successively fluidly connected individual fluid inlets 220 of a plurality of fluid delivery manifolds 200. An end of the fluid inlet 220 may be capped with an end cap 265 as shown in FIG. 2*a*. However, the fluid delivery manifold 200 may couple with an inlet of an adjacent fluid delivery manifold 200 as shown in FIG. 1, and provided herein.

Figure 2D:
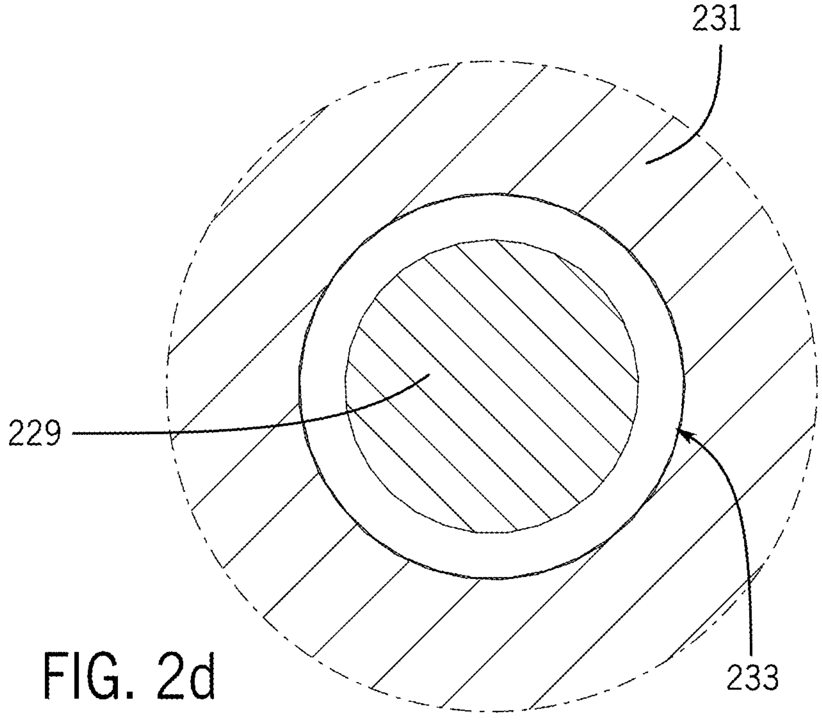
Figure 2E:
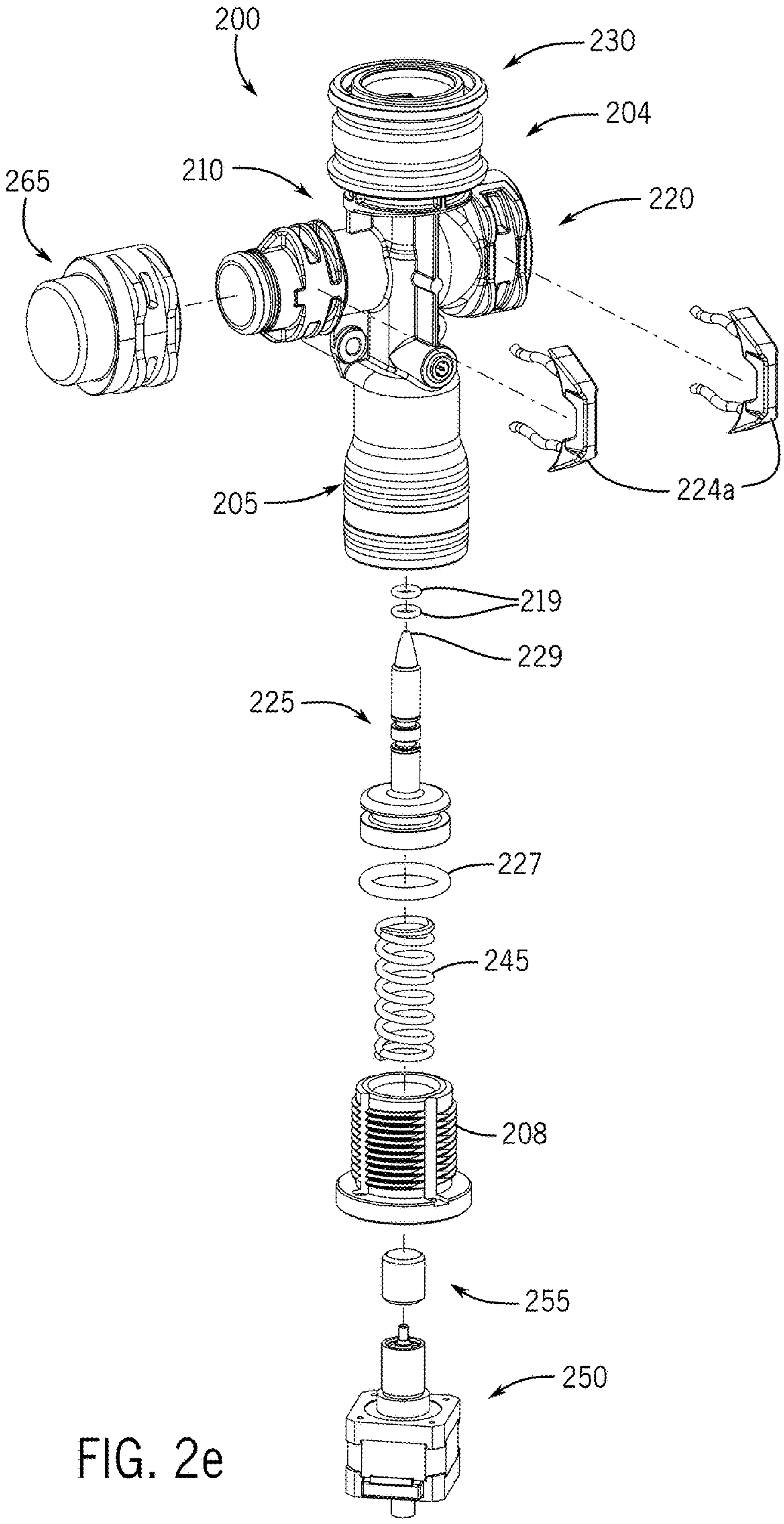
Figure 2F:
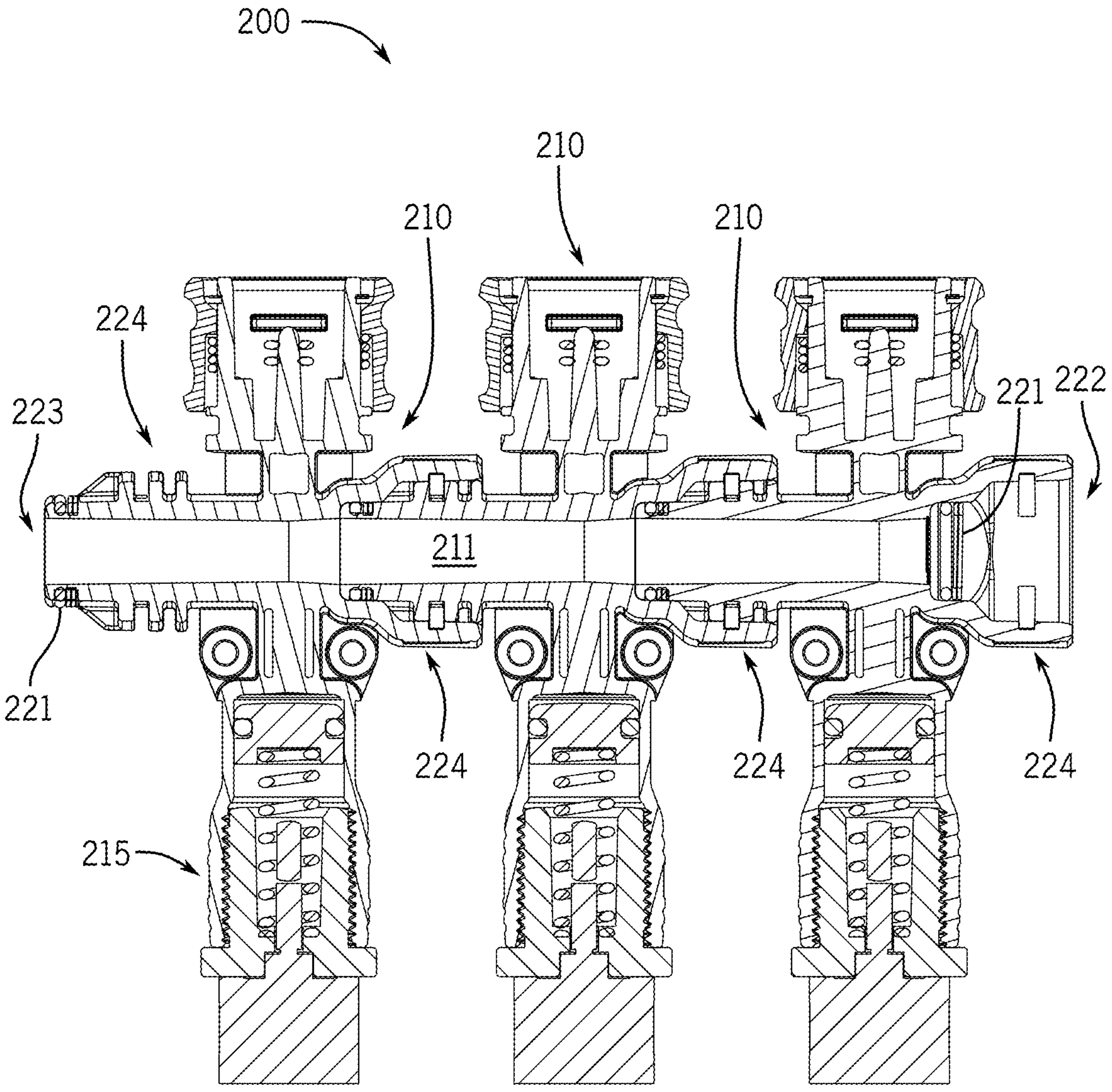
Figure 2G:
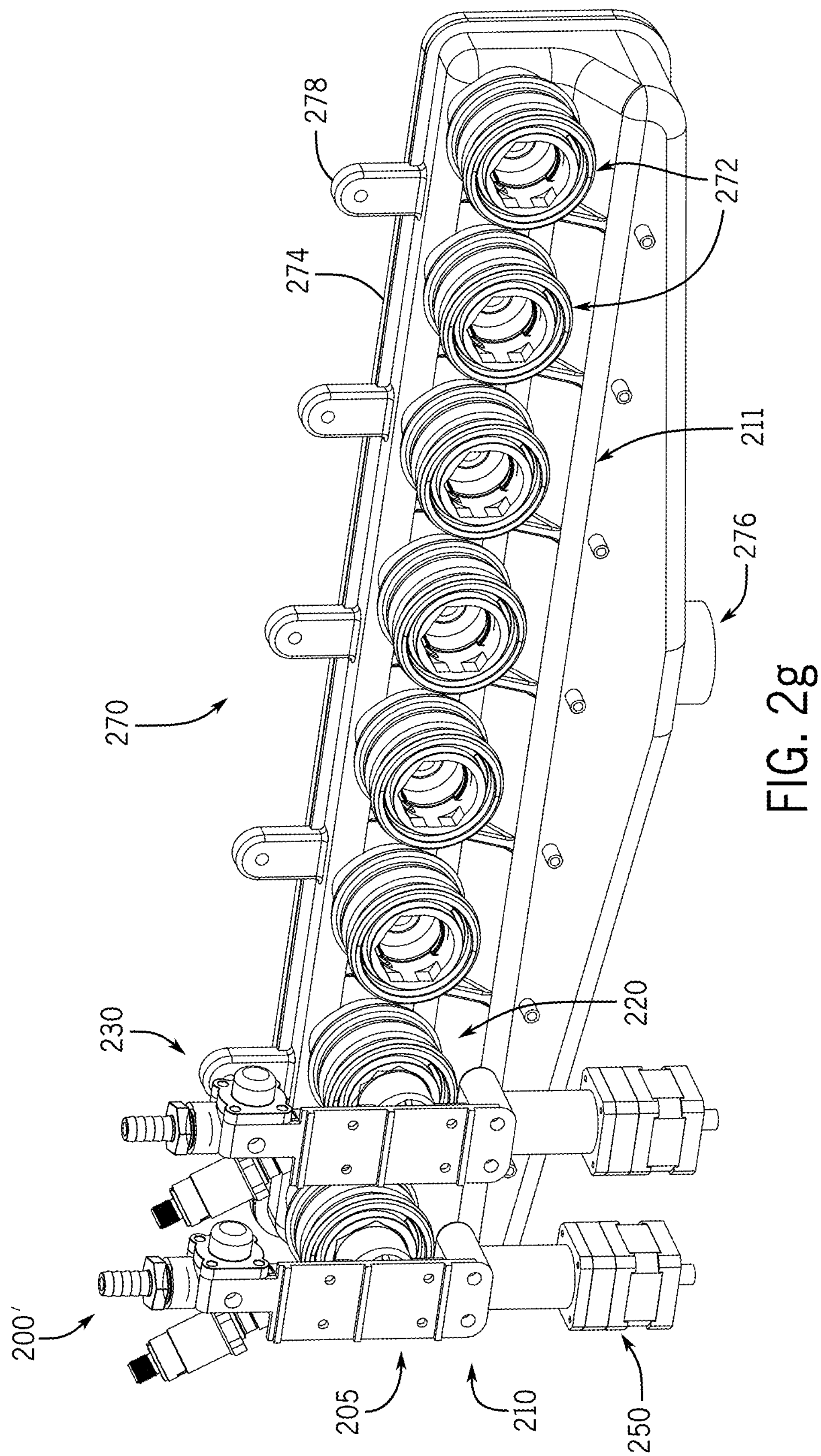
FIG. 2*g* illustrates an alternative fluid delivery manifold, according to various implementations of the present disclosure.
Figure 2H:
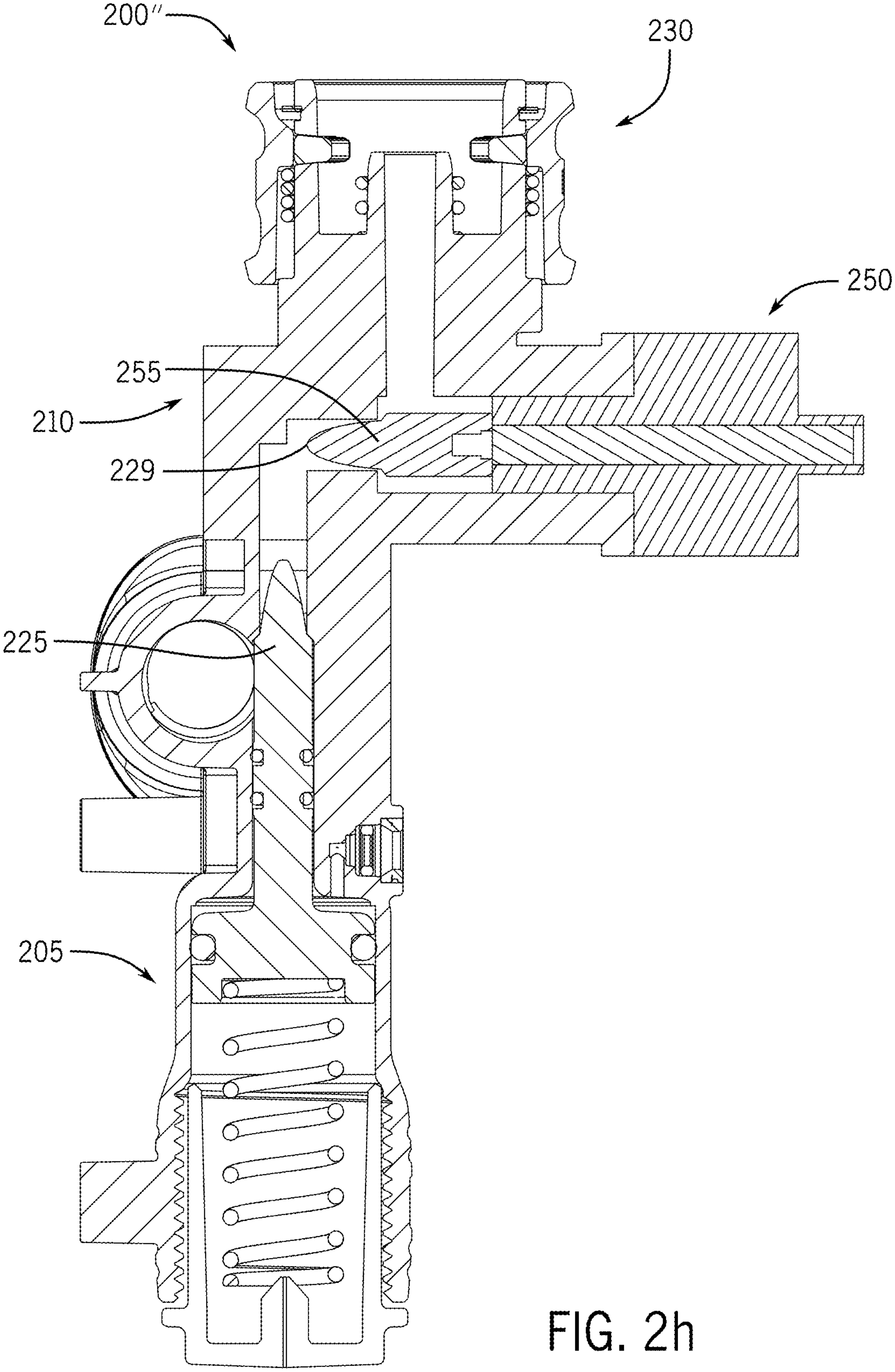
FIG. 2*h* illustrates another alternative fluid delivery manifold according to various implementations of the present disclosure.

In another example, as illustrated in FIG. 2*g*, an alternative fluid delivery manifold 200' of the present disclosure may provide the fluid ingress channel 211 in a fluid plenum 270 configured to receive a fluid inlet 220 of an individual housing 210, or a plurality of individual fluid inlets 220, at a plurality of outlet ports 272 defined in a housing 274 of the fluid plenum 270. In this example, an inlet port 276 of the fluid plenum may be fluidly coupled between a motive fluid source and the plurality of fluid plenum outlet ports 272 with the fluid ingress channel 211 arranged within the housing 274 of the fluid plenum 270. The plenum outlet ports 272 may be adjacently arranged along the housing 274. In some cases, the housing 274 may include coupling features 278 each for coupling to a syringe pump 100, components of the fluid delivery manifold 200 such as the housing 210, a loading valve 300, or other components of the fluid management system 500 such as the panel 101 or to a structure in the vehicle wash setting. In addition or alternatively, the housing 210 may include coupling features for coupling to a syringe pump 100, a loading valve 300, or other components of the fluid management systems.

The valve plunger 225 may be configured to be received in the plunger housing 215 and extend into the fluid outlet 230. The valve plunger 225 may be arranged between the fluid inlet 220 and the fluid outlet 230 and may block and permit the flow of motive fluid from the fluid inlet 220 through the valve orifice 233 of fluid outlet 230. The valve plunger 225 may include a plunger head 226 configured to be arranged in the air chamber 240, a circumferential seal 227 configured to seal the plunger head 226 against the internal walls of the air chamber 240, and a stem 228 extending therefrom configured to extend into the fluid passageway within the housing 210. Because the valve plunger 225 is configured to be actuated by pressurized air to cause motive fluid flow, the stem 228 may seal against the plunger housing 215 via one or more seals 219. The seals 219 may be received by the stem 228 or the plunger housing 215 and configured for fluidly isolating the plunger housing 215 from the fluid passageway to prevent pressurized air from entering the fluid passageway and to prevent motive fluid, e.g., water, from entering the air chamber 240 from the fluid passageway. A tip 229 of the valve plunger 225 at a distal end of the stem 228 may include a parabolic shape and may be referred to herein as a parabolic tip.

The fluid outlet 230 may be configured to dispense motive fluid from the fluid delivery manifold 200 during actuation of the valve plunger 225. An ingress 231 of the fluid outlet 230 may be configured to receive the plunger stem 228 and tip 229, and may also be referred to as a valve seat. When the valve plunger 225 is seated in the ingress 231, e.g., in the normal position or idle state, the fluid outlet 230 may be sealed-off from the fluid inlet 220 and fluid ingress channel 211 by the plunger tip 229 sealing against the valve seat or ingress 231. An egress 232 of the fluid outlet 230 may be configured to dispense motive fluid from the fluid outlet 230 upon opening of the valve orifice 233 of the fluid outlet 230. The ingress 231 and egress 232 of the fluid outlet 230 may be arranged at opposite ends of the outlet channel 212, and the valve orifice 233 may be positioned at the ingress 231 and at least partially defined by the ingress 231. An effective valve orifice area of the valve orifice 233 may be adjustable as provided herein. A check valve may be integrated in or fluidly coupled to the fluid outlet 230, for instance at the egress 232, to prevent backflow when the fluid delivery manifold 200 is in an idle state.

The air inlet port 235 may be configured to receive pressurized air for actuation of the valve plunger 225 in the integrated valve 205 to thereby control the dispensing of the motive from the fluid outlet 230. The air inlet port 235 may include the air channel 216 of the housing 210/plunger housing 215 as well as a half cartridge, push-to-connect, insert. A half cartridge push-to-connect means that the fluid delivery manifold 200, e.g., the housing 210, is used to form the outer housing of the push-to-connect fitting. Therefore, the integral components of the fluid delivery manifold 200 may include components of the push-to-connect air fitting and may define a sealing surface between the push-to-connect fitting and the air channel 216.

The air chamber 240 may be defined by the plunger housing 215 and may be configured to receive the valve plunger 225 and permit its movement back and forth between a normal, unactuated state and an actuated state during operation of the fluid delivery manifold 200 in which pressurized air is delivered to the air chamber 240. A first end wall 217*a* of the plunger housing 215 may define a floor of the air chamber 240. The distance the valve plunger 225 moves back and forth during operation may be limited by the valve limiter 255 as provided herein.

The return spring 245 may be received in the plunger housing 215 and arranged between the plunger head 226 and a second end wall 217*b* of the plunger housing or an insert thereof, e.g., the sleeve 208. The return spring 245 may be configured as a coil spring, e.g., a helical spring. In an unbiased state, the return spring 245 may hold the valve plunger 225 against the valve seat or egress 231, which may correspond to the normal or idle state of the integrated valve of the fluid delivery manifold 200. The biased state of the return spring 245 results from overcoming a bias of the return spring 245 in the unbiased state, which may be caused by movement of the valve plunger 225 in response to the introduction of pressurized air into the air chamber 240 from a pressurized air source 106 via the air inlet port 235, e.g., during an on cycle of the manifold, thus biasing or compressing the return spring 245. The compression distance of the return spring 245 into the biased state may be limited by the position of the valve limiter 255. In alternative implementations, the return spring 255 may be an optional component for instance when the actuator 250 is configured as a proportional solenoid, or the return spring 245 may be replaced with a different biasing mechanism such as pressurized fluid including pressurized air or liquid. For instance, the proportional solenoid may serve as both a valve limiter and as an actuator and may extend by a desired or predefined distance, e.g., based on control signals received from the control unit 400, to limit movement of the valve plunger 225 upon receipt of compressed air in the air chamber 240 to drive the valve plunger open.

The actuator 250 may be configured as a linear actuator, such as a stepper motor, and may control linear displacement of the valve limiter 255. Together, the actuator 250 and the valve limiter 255 may be referred to as an actuator assembly 260. The actuator 250 may be a captive stepper-driven linear actuator, however other linear actuators may also be used such as a servo-driven linear actuator or proportional linear solenoid. The actuator 250 may be configured for linearly adjusting the valve limiter 255 to cause a linear adjustment and/or sequential adjustment in the effective valve orifice area of the valve orifice 233. For instance, the actuator 250 may include a threaded arrangement 251, e.g., a threaded rod or threaded bore configured to threadedly engage with a complementary threaded arrangement 256 of the valve limiter 255. When the actuator 250 causes the valve limiter 255 to be fully extended, then during actuation of the fluid delivery manifold 200, the valve plunger 225 may open to permit a minimum amount of flow through the fluid outlet 230 via the valve orifice 233. In some cases, the minimum amount of flow may be no or 0 gpm of motive fluid, while in other cases, the minimum amount of flow may be about 0.1 gpm or about 0.1 to about 0.25 gpm. When the actuator 250 causes the valve limiter 255 to be fully retracted, then during actuation of the fluid delivery manifold 200, the valve plunger 225 may open to permit a maximum amount of flow through the fluid outlet 230. In some cases, the maximum amount of flow may be 25 gpm of motive fluid. The actuator 250 may thus be configured to move the valve limiter 255 in a stepwise manner between the minimum and maximum positions to adjust a level of motive fluid flow from the fluid outlet 230 during dispensing.

The valve limiter 255 may include a threaded arrangement 256 at one end for coupling to the actuator 250. The valve limiter 255 may be non-rotatable such that rotation by the actuator 250 causes a linear movement of the valve limiter 255 in the plunger housing 215, e.g., via the threaded arrangement 251, 256. A contact face 257 arranged at the other, opposite end from the threaded arrangement 256 may be configured to receive a face of the plunger head 226 during fluid dispensing, while limiting the distance of movement of the plunger 225 to thereby limit an effective valve orifice area of a valve orifice 233 upon movement of the stem 228 and its tip 229 away from the valve seat 231 of the fluid outlet 230. As shown in FIG. 2*b*, the valve limiter 255 may be configured as a cylindrical plug for contacting the plunger head 226 face, and the valve limiter 255 may be arranged within an interior of the coils of the return spring 245 to permit the return spring 245 to operate unimpeded. In other implementations, the valve limiter 255 may be configured as a sleeve and arranged about an exterior of the coils of the return spring 245.

In alternative implementations, the valve limiter 255 may be decoupled from the valve plunger 225. In such cases, the valve plunger 225 may function as an on/off valve for dispensing of motive fluid, while the valve limiter 255 may be arranged downstream of the valve orifice 233 and may for instance be configured with a valve needle adjustably movable in the fluid outlet 230. For instance, the valve needle may include a parabolic tip, like the parabolic tip 229 of the valve plunger 225, and the valve limiter 255 and actuator 250 may be configured to adjust the valve needle to linearly adjust the dispensing of motive fluid as disclosed herein. In this configuration, the valve limiter 255 may permit the flow metering valve needle to remain stationary between cycles, and may reduce the impact load on the valve limiter 255 and actuator 250 (e.g., stepper motor) as these components would not receive the force of the plunger 225 during cycling. FIG. 8*h* illustrates another alternative fluid delivery manifold 200" of the present disclosure including the valve limiter 255 including a parabolic tip 229, which is decoupled from the valve plunger 225. In cases where the fluid delivery manifold 200" includes a linear encoder 280, the sensor and gradations may be arranged on the valve limiter 255 and housing in an area adjacent to the valve limiter 255. In some cases, two linear encoders 280 may be provided on the fluid delivery manifold 200" at the valve limiter 255 and the valve plunger 225, each of which may be communicatively coupled to the control system 400 as provided herein. The other features of the fluid delivery manifold 200" shared in common with the fluid delivery manifold 200 of the present disclosure are not repeated herein in the interest of brevity.

The end cap 265 may be configured to join to the housing 210 of the fluid delivery manifold 200 to block motive fluid from exiting the fluid ingress channel 211 and the end of the fluid delivery manifold 200. The end cap 265 may thus serve to confine the motive fluid within the fluid ingress channel 211 and direct the fluid to the fluid outlet 230.

Various components of the fluid delivery manifold 200 may be integrally constructed, for instance by molding (e.g., injection molding) a chemically inert polymer such as HDPE, PTFE or PVDF. Non-integral components, such as the valve plunger 225 may also be constructed of inert polymers, while others may be constructed of metal, such as spring clips, helical springs (e.g., return spring 245), and inlet connectors. Additionally or alternatively the integrally constructed components may be machined or additive manufacturing may be used for their construction.

FIG. 2*e* illustrates an exploded view of various components of the fluid delivery manifold 200 disclosed herein.

Referring to FIGS. 1 and 2*f*, the fluid delivery manifold 200 may include a plurality of adjacently arranged manifold housings 210 along with their respective fluid delivery components, each being fluidly and mechanically coupled to one another. Although FIG. 1 shows four positions 510, e.g., four individual manifold housings 210 assembled to provide the fluid delivery manifold 200, the fluid delivery manifold 200 may include more or fewer manifold housings 210, such as a single position 510 with a single housing 210 as shown in FIGS. 2*a*-2*b*, three manifold housings 210 as shown in FIG. 2*f*, or two, five, six, seven, eight, nine, ten or more manifold housings 210.

Referring to FIG. 2*f*, a cross-sectional view of three manifold housings 210 of a fluid delivery manifold 200 having three outlets for use with a fluid management system having three positions 510 is illustrated with the fluid ingress channel 211 fluidly coupling the adjacently arranged housings 210. The housings 210 may be mechanically joined to an adjacent housing 210 by a respective inlet coupler 222 (e.g., an inlet ingress coupler) receiving an inlet egress coupler 223 of an adjacent the housing 210. More specifically, the inlet fastening region 224 at each inlet coupler 222 of the housing 210 may be coupled to the inlet egress coupler 223 of an adjacent housing 210 by any suitable fastening means such as a spring clip 224*a*, threaded connection, bayonet connection, and combinations. As shown, the inlet coupler 222, inlet egress coupler 223, and the fastening regions 224 may be integrally formed by the housing 210. As such, the fluid ingress channel 211 may extend through the entirety of the three housings 210 along a transverse length of the housings 210, which may be perpendicular to a longitudinal axis of the plunger housings 215. The couplings defining the fluid ingress channel 211 may be sealed by the one or more seals 221 (e.g., O-rings or gaskets) provided along the length of the motive fluid inlets 220. A free end of the inlet egress coupler 223 (left side) may be capped with an end cap 265 as shown in FIG. 2*a*, while a free end of the inlet coupler 222 (right side) may be fluidly coupled to a motive fluid source such as via a fluid conduit leading to the pressurized fluid source 107 (e.g., the water pump).

Operation of the Fluid Delivery Manifold 200

The actuation and metering functions of the fluid delivery manifold 200 are now described. Briefly, the valve plunger 225, particularly the stem 228 and tip 229 may be held concentric within the fluid outlet 230 and seal the valve seat or ingress 231 thereof when the fluid delivery manifold 200 is in a normal or idle state. Actuation of the fluid delivery manifold 200 may involve actuation of the valve plunger 225 using pressurized air delivered via the air inlet port 235 resulting in pressurization of the air chamber 240. Upon reaching a pressurization threshold within the air chamber 240, the pressure causes the valve plunger 225 to overcome the biasing force of the return spring 245 that normally forces the valve plunger 225 into the extended or normal position, resulting in the tip 229 carried by the stem 228 retracting from the valve seat 231 by a predetermined opening distance, e.g., a predetermined valve orifice area, to an open position to thereby permit the motive fluid to pass from the fluid ingress channel 211 through the valve orifice 233 at a rate determined by the effective valve orifice area of the valve orifice 233 created between the valve seat or ingress 231 and the tip 229 of the valve plunger 225, the area of which may be adjusted based on the distance of movement of the tip 229 away from valve seat or ingress 231 of the fluid outlet 230. The predetermined opening distance moved by the valve plunger 225 during retraction is based on the position at which the actuator 250 has moved the valve limiter 255 within the air chamber 240, which results in the face of the plunger head 226 contacting the contact surface 257 of the valve limiter 255 to thereby limit the opening distance of the valve plunger 225 and thus define the effective valve orifice area of the valve orifice 233 and flow rate.

The metering/regulation of the water flow through the water manifold 200 may be dependent upon the distance which the valve plunger 225 has been displaced from the ingress 231 of the fluid outlet 230. In FIG. 2*d*, the ingress 231 of the fluid outlet 230 is illustrated as a circle at which point the water outlet is the most necked down. The tip 229 of the valve plunger 225 may have a diameter equivalent to the valve seat or ingress 231 of the fluid outlet 230 at its proximal end and a smaller diameter at the distal end. The differences in diameter between the ingress 231 of the fluid outlet 230 and the plunger tip 229 may define the valve orifice 233, for instance as shown in FIG. 2*d*. The flow rate through the valve orifice may be a function of the motive fluid (water) physical properties, inlet pressure, outlet pressure, and the effective valve orifice area of the valve orifice 233. Assuming that all other properties remain constant (e.g., temperature, fluid contact surface finish, surface imperfections), the flow rate through the valve orifice 233 may be directly proportional to the effective valve orifice area of the valve orifice 233. That said, when the valve plunger 225 is fully extended, the area of the valve orifice 233 is zero, so the flow is also zero; and when the valve plunger 225 is fully retracted, the flow is at its maximum. In the embodiment of FIGS. 2*a*-2*d*, the plunger tip 229 has a parabolic curvature, which in effect causes the area of the valve orifice 233 to be linearly proportional to the displacement of the valve plunger 225. The parabolic tip 229 may be dimensioned to achieve a linear relationship between the effective valve orifice area, which is the cross-sectional area of the valve orifice 233 minus the cross-sectional area of the tip 229 of the valve plunger 229, and linear displacement of the tip 229 during linear displacement of the valve plunger 225. Having a linear relationship between the tip 229 displacement and the area of the valve orifice 233 using the parabolic tip 229 may facilitate providing a linear adjustment of the flow rate of the fluid across the full area of the valve orifice 233, resulting in consistent flow control resolution across the entire flow control span. Using a linear-type actuator 250 to control linear displacement of the tip 229 of the valve plunger 225 may provide a finite number of steps of the flow control span. For instance, the number is steps is determined by a linear displacement range of the actuator 250, pitch of the linear actuator lead screw, and step angle of the motor. Since the number of steps within the flow control span is finite, having an appropriately designed parabolic tip 229 may ensure that each step of the motor will change the flow rate by the same amount. This is in contrast to a traditional tapered valve needle, in which the relationship between the flow rate and needle valve displacement will be logarithmic, presenting problems for obtaining high resolution at low flow rates. The flow adjustment resolution per step of the motor will be large at the beginning of the tapered needle adjustment span and will continue to decrease as the displacement of the valve needle increases.

In FIG. 2*b*, the actuator 250 is configured as a linear stepper motor and is extended about 20% of its total distance thus having moved the valve limiter 255 by this amount, which in turn allows the valve plunger 225 to retract about 80% of a total opening distance. The actuator 250 may be communicatively coupled to the control system 400, which may be configured to cause the actuator 250 to be operated to thereby control the position of the valve limiter 255. For instance, in some implementations, the control system 400 may be configured to receive a selected outlet pressure, e.g., from a user, and based on the selection, the control system 400 may cause the actuator assembly 260 to adjust a position of the valve limiter 255 to reach a target flow rate or a target outlet pressure of the motive fluid when the valve plunger 225 is in the open position. The control system 400 may control a linear position of the valve limiter for instance by causing a linear adjustment of the actuator 250, e.g., when configured as a linear actuator.

Figure 3:
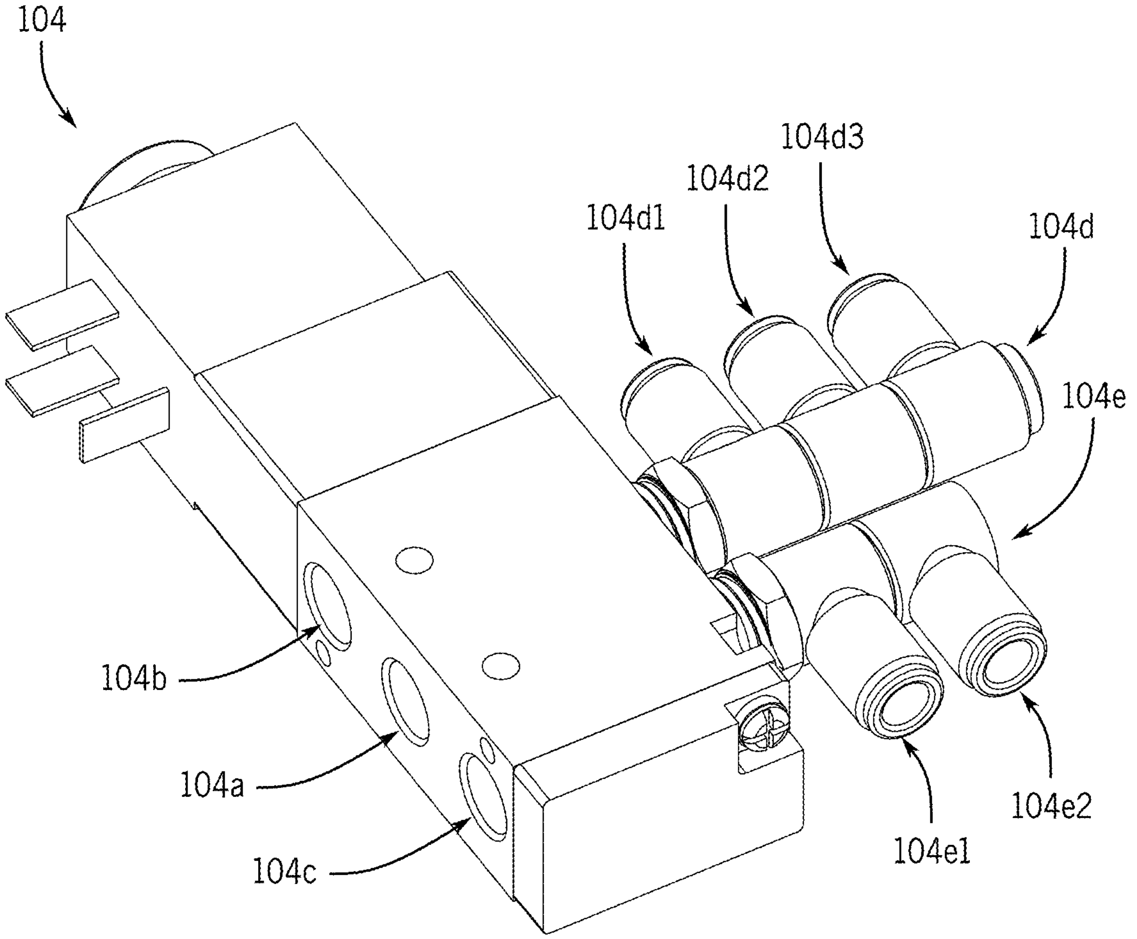
FIG. 3 illustrates an exemplary valve, according to various implementations of the present disclosure.

Actuation or operation of the fluid delivery manifold 200 to cause the valve plunger 225 to move to its open position may be pneumatic by pressurized air being delivered to the air inlet port 235 of the integrated valve 205 by the valve 104 depicted in FIG. 3, which is a 5/2 solenoid actuated valve. Switching of the valve 104 may cause the pressurized air to be delivered to the normally closed first outlet 104*d*, resulting in the first outlet 104*d* transmitting pressurized air to the air inlet port 235 resulting in retraction of the valve plunger 225, e.g., by the air pressure within the air chamber 240 overcoming the bias of the return spring 245, such that a valve orifice 233 defined between plunger tip 229 and the ingress 231 opens and permits flow of motive fluid as shown in the detail views of FIGS. 2*c* and 2*d*. Prior to actuation, and after the fluid delivery manifold 200 has cycled, the valve 104 may switch to the normal state or idle position, and the fluid delivery manifold 200 may not receive pressurized air from the valve 104. As a result, the return spring 245 may return to its unbiased state and force the tip 229 of the valve plunger 225 to seal against the valve seat 231 of the fluid outlet 230 and block flow.

More particularly, when the on cycle has ended, the valve 104 switches, and the air inlet port 235 is relieved or vented to atmosphere. The pressure within the air chamber 240 drops and the return spring 245 forces the valve plunger 225 back into the fully extended position. In the fully extended position, the plunger tip 229 interfaces with the ingress 231 of the fluid outlet 230 thereby closing the valve orifice 233 formed therebetween and prohibiting flow. The valve plunger 225 remains in this extended position with the valve orifice 233 closed-off until the next on cycle is triggered. The valve 104 may be communicatively coupled to the control system 400, which may cause the valve 104 to be operated to thereby control operation of the integrated valve 205.

FIG. 3 is an illustration of a 5/2 solenoid actuated valve, which may be the configuration of the valves 104 when used in operating pneumatic systems, such as the integrated valve(s) 205 of the fluid delivery manifold. For instance, pressurized air may be routed from the pressurized air source 106 (e.g., a pump) through the electronic solenoid-actuated valve 104 to one or more integrated valves 205. In FIG. 3, the valve 104 may share a common pressurized air inlet 104*a*, two exhaust ports 104*b*, 104*c*, and two outlets 104*d*, 104*e* in which the first outlet 104*d* is normally closed, and the second outlet 104*e* is normally open. The exhaust port 104*b* fluidly couples to the outlet 104*d*, and the exhaust port 104*c* fluidly couples to outlet 104*e*. The common air inlet 104*a* may be fluidly coupled to the pressurized air source 106 such as an air pump via fluid conduits such as flexible tubes for receipt of pressurized air therefrom, as well as to a pressure regulator 105 for regulating the pressure of the pressurized air delivered to the common air inlet 104*a*. The outlet 104*d* may be fluidly coupled to the air inlet ports 235 of the fluid delivery manifold, as well as other downstream components, e.g., a chemical supply, via fluid conduits, for transmission of the pressurized air by the valve 104. The outlet 104*e* may be fluidly coupled to a pneumatic port of a device pneumatically operated bi-directionally, such as the drive mechanism 150 of the syringe pump 100. The exhaust ports 104*b*, 104*c* may receive air exhausted from downstream components via the respective outlets 104*d*, 104*e*, for instance when such components transition to their non-actuated or idle state. For instance, exhaust port 104*b* may normally be open when the first outlet 104*d* is open to atmosphere, and exhaust port 104*c* may be normally closed when the second outlet 104*e* is open and in a normal position or idle state. In this example, the second outlet 104*e* is decoupled from the exhaust port 104*c* until the valve switches as provided herein.

Figure 4A:
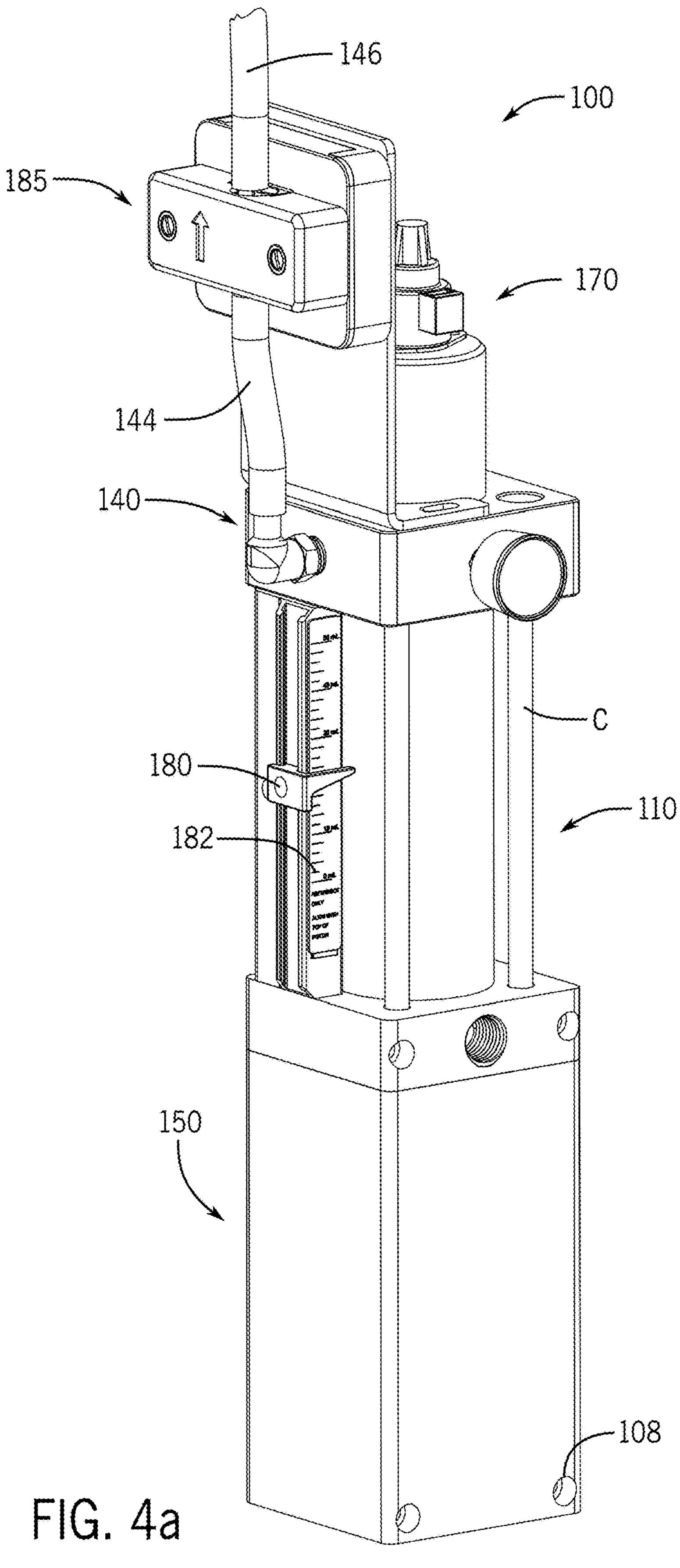
FIG. 4*a* illustrates an isometric view of a chemical delivery device that may be included with the fluid management systems of the present disclosure.

As shown in FIG. 3, the first outlet 104*d* may be split into three ports 104*d*1, 104*d*2, 104*d*3, for example, to supply pressurized air to up to three air inlet ports 235 of air chambers 240 of the integrated valves 205 of a fluid delivery manifold 200 having multiple housings 210, or to fewer than three air inlet ports 235 along with one or more pneumatically operated chemical supplies, e.g., to a lower cavity 152*b* of one or more syringe pumps 100 during a dispensing cycle (e.g., to the syringe pump of FIG. 4*a*).

In other implementations, the on cycle of the fluid delivery manifold 200 may be controlled by means of electrical signals in place of air signals, while causing the motive fluid to be dispensed. For instance, integrated valve 205 may use a proportional solenoid to act upon the valve plunger 225, and the displacement at which the valve plunger 225 is opened may be limited by the proportional solenoid and optionally the valve limiter 255 instead of being limited by the actuator 250. For instance, the proportional solenoid may act directly on the valve plunger 225 and the proportional solenoid may drive the valve plunger 225 open by a predefined distance upon receipt of electrical control signals.

The integrated valve 205 may additionally or alternatively be electrically controlled by means of an electrical actuator configured to actuate the valve plunger 225 and cause retraction thereof by a distance necessary to achieve the desired fluid flow rate. For instance, the valve plunger 225 may be coupled to the electrical actuator and be retracted by the actuator to open the valve orifice 233 to a desired distance. In this example, the return spring 245 may eliminated. In the foregoing, the valve or valves 104 of the valve bank 103 may be controlled by the valve node 102 and/or the control system 400. In examples where electrical signals are used in place of air signals, air conduits may be replaced with electrical connections.

A linear encoder 280 may determine the displacement of the valve plunger 225 and thus the size of the valve orifice 233 during the on cycle of the fluid delivery manifold 200, and encoder information may thus be used to maintain accuracy of the actuator 250. The linear encoder 280 may include a sensor 280*a* configured to sense gradations 280*b*. For instance, the sensor 280*a* may be arranged on the manifold housing 210 and the gradations 280*b* may be coupled to the valve plunger 225 such as at the plunger head 226 or the stem 228. The gradations may for instance be constructed of metal (e.g., configured as a metal scale) and the sensor may be configured with a magnet configured to sense the gradations. The linear encoder may have a similar configuration to the linear encoder 186 described in connection with the syringe pump 100. When using a linear-type electrical actuator to actuate the integrated valve 205, a linear encoder may track the linear steps, e.g., motor steps, and use such encoder information to maintain accuracy of the distance the valve plunger 225 opens during the on cycle. The control system 400 may be communicatively coupled to the linear encoder 280, which may use linear displacement information in controlling the vehicle wash components of the present disclosure, e.g., the actuator assembly 260, the drive mechanism 150, the adjustable valve 170, the valve 104, and so on.

Where a proportional solenoid is used to actuate the integrated valve 205, the displacement of the valve plunger 225 and thus the size of the valve orifice 233 may also be determined using a linear encoder, and similarly, the encoder information may be used to maintain accuracy of the proportional solenoid. In addition or alternatively, the current delivered to the proportional solenoid may be correlated to a displacement of the proportional solenoid and the valve plunger 225. In addition or alternatively, a flow meter may be used to measure the fluid flow rate from the fluid outlet 230 and operation of the proportional solenoid may be controlled and adjusted using the control system 400 based on flow rate data from the flow meter.

In embodiments, sensors may be used to determine flow characteristics of the dispensed motive fluid, such as flow rates and fluid pressure. For instance, a flow sensor or pressure sensor P (FIG. 2*a*) may be fluidly coupled to the fluid outlet 230. A liquid flow meter may determine the flow rate of the motive fluid dispensed from the outlet 230. The liquid flow meter may have a similar configuration to the liquid flow meter 185 described in connection with the syringe pump 100, and may be a thermal mass flux type flow meter, an ultrasonic flow meter, a positive displacement flow meter, a turbine flow meter, and so on. A pressure sensor P may sense an outlet pressure of the fluid dispensed from the fluid outlet 230, and the pressure information may be used to calculate flow rate therefrom and maintain accuracy of the integrated valve 205. In another example, a pressure sensor 645 may be fluidly coupled to a motive fluid pump 640 (FIG. 5*a*), which pump may be fluidly coupled to the fluid inlet 220. The control system 400 may be communicatively coupled to one or more of the pressure sensors P, 645 and be configured to cause the position of the valve limiter 255 to be adjusted based on pressure sensor data.

Flow characteristic information derived from such sensors may be used to actively meter the motive fluid flow through the fluid delivery manifold 200 due to the control system 400 being communicatively coupled to such sensors and/or the linear encoder 250 or similar displacement device. For instance, where an increased outlet pressure or an increased motive fluid flow is needed, the control system 400 may cause the actuator 250 or similar displacement device to be retracted, which allows the valve plunger 225 to also retract further by an equivalent amount to increase the size of the valve orifice 233. Conversely, if less outlet pressure or less flow is needed, the actuator 250 or similar displacement device may be extended, which may force the valve plunger 225 to further extend, thereby shrinking the size of the valve orifice 233, which reduces the outlet pressure and flow rate.

Operation of the fluid delivery manifold 200 having multiple manifold housings 210, e.g., as provided in FIG. 2*f*, may be similar to the fluid delivery manifold 200 including a single manifold housing 210 described in connection with FIGS. 2*a*-2*e*. For instance, the three integrated valves 205 may be individually controlled by air or electrical signals according to the approaches disclosed herein. For pneumatic operation, each manifold housing 210 may be coupled to one or more valves 104, such as an individual valve 104 of the valves of the valve bank 103, and the valves 104 may be individually controlled by the control system 400 or valve node 102. This may provide for the independent operation of the integrated valves 205 of the fluid delivery manifold 200. For instance, the control system 400 may be configured to control the position of the valve limiter 255 of each of actuator assemblies 260 of the plunger housings 210 as well as an actuation status of each of the valves 104 coupled to the air inlet ports 235. As a result of the air chambers 240 being fluidly coupled to the individual valves 104, the control system 400 may thus be configured to individually control fluid dispensing from each of the individual fluid outlets 230.

Figure 4B:
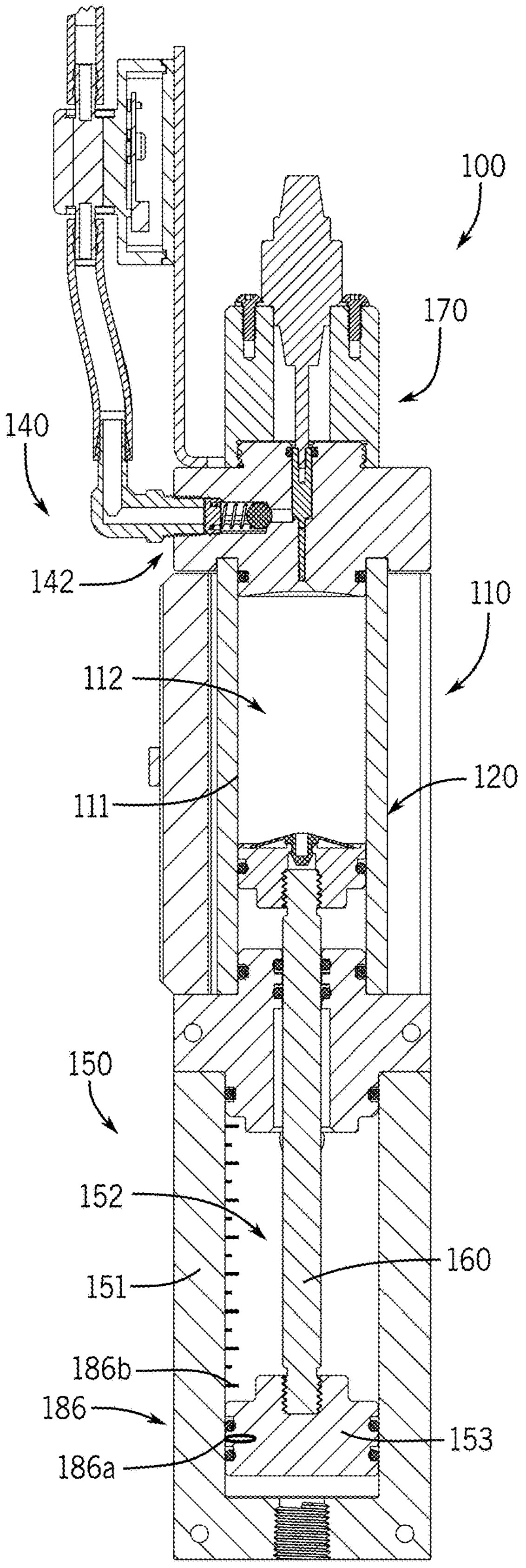
FIG. 4*b* illustrates a cross-sectional view of the chemical delivery device in FIG. 4*a* through the outlet.
Figure 4C:
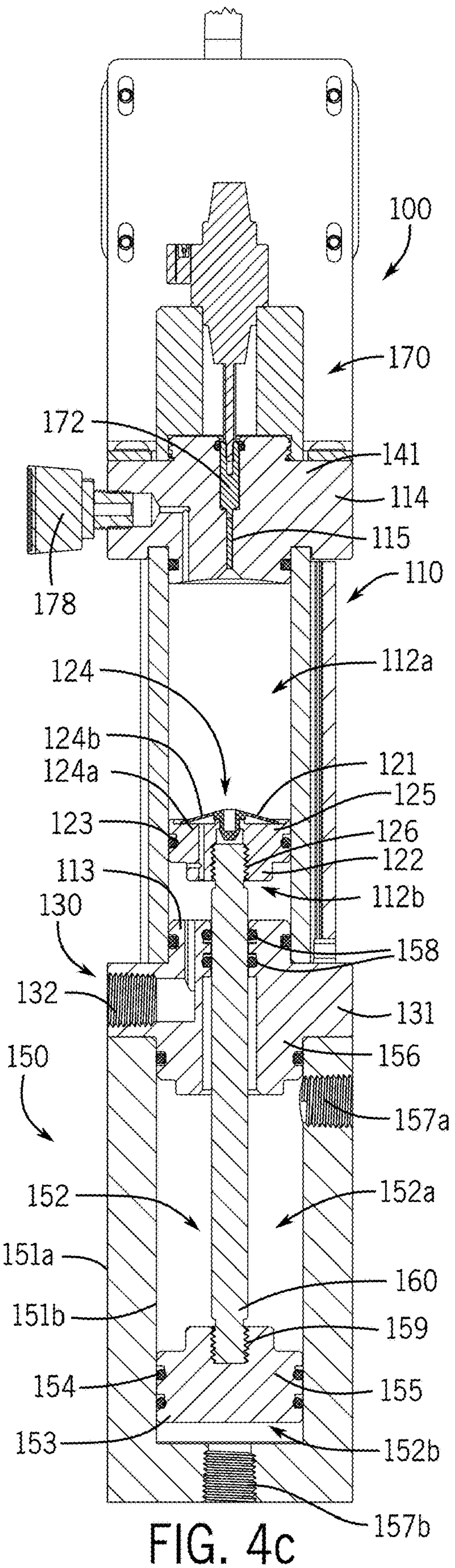
FIG. 4*c* illustrates another cross-sectional view of the chemical delivery device in FIG. 4*a* through the inlet.
Figure 4D:
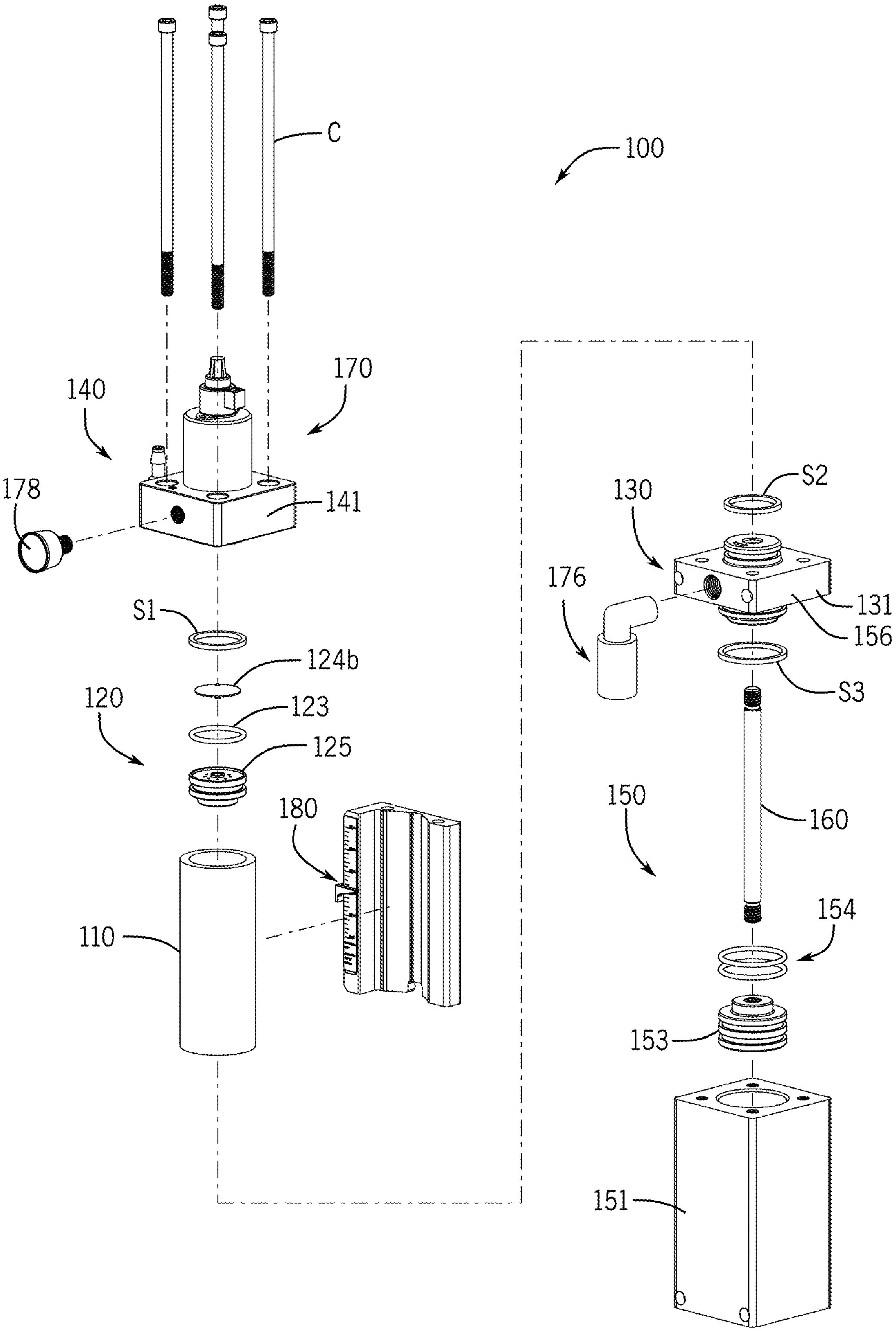
FIG. 4*d* illustrates an exploded view of the chemical delivery device of FIG. 4*a;*
Figure 4E:
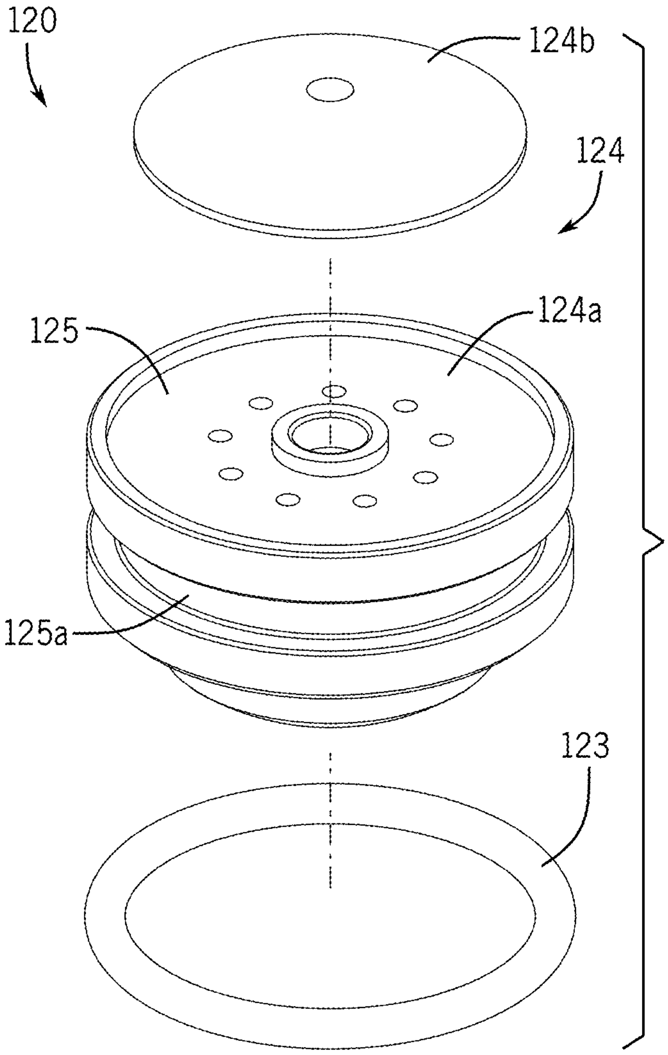
FIG. 4*e* is a top, left isometric, exploded view of the piston of the chemical delivery device of FIG. 4*a;*
Figure 4F:
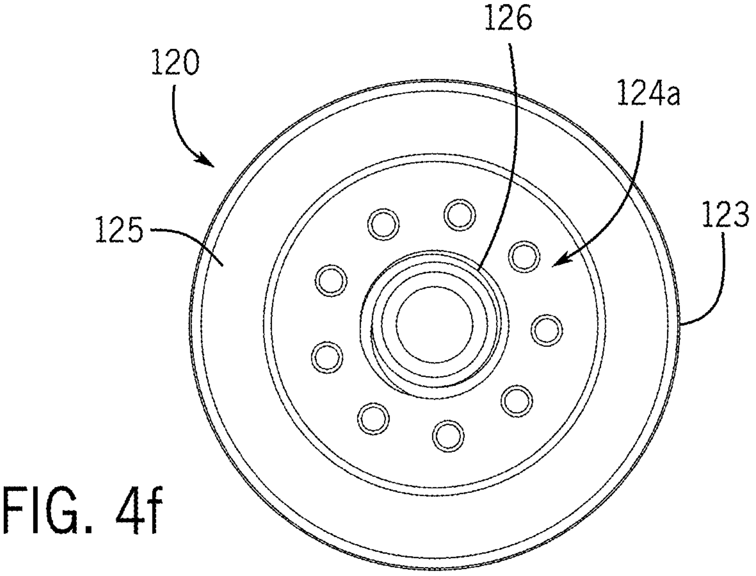
FIG. 4*f* is a bottom view of the piston assembly of the chemical delivery device of FIG. 4*a;*

The control system 400 may also be configured to control chemical dispensing from chemical supplies fluidly coupled to corresponding mixing sites configured to receive motive fluid from the fluid delivery manifolds 200. More particularly, in some implementations, corresponding air inlet ports 235 of the fluid delivery manifold 200 and drive mechanisms of chemical supplies may share a common valve 104 controlled by the control system 400, and their respective outlets may be fluidly coupled to a common loading valve 300 (FIG. 5*b*). For instance, as shown in FIG. 3, due to the first outlet 104*d* of the valve 104 being split, the supply of pressurized air may be simultaneously delivered to the drive mechanism of a syringe pump 100 (e.g., FIGS. 4*a*-4*g*) provided as the chemical supply, and to the air inlet port 235 of the fluid delivery manifold 200, each of which may have their outlets fluidly coupled to a common loading valve 300 (e.g., FIGS. 6*a*-6*d*). As such, the control system 400 causing delivery of a control signal from the common valve 104 to the integrated valve 205 of the fluid delivery manifold 200 and to the drive mechanism 150 of the chemical supply, may result in the coordinated delivery of motive fluid and chemical to the common loading valve 300, and a dilution ratio may be controlled using the various flow rate and pressure control devices disclosed herein (e.g., via use of the adjustable valves 170, the actuators 250, the flow meters, the linear actuators, the sensors, and/or the control system 400, as well as their disclosed alternatives and related systems). Accordingly, in addition to controlling the manifold assembly 200, the control system 400 may control a plurality of chemical supplies, each coupled to a mixing site, with each mixing site receiving motive fluid from the fluid outlet 230 of a respective integrated valve 205 and chemical from at least one of the chemical supplies, mix the motive fluid and the chemical to form a mixture, and dispense the mixture.

Dilution ratios of chemical to motive fluid may be controlled using one or more of the vehicle wash components of the present disclosure, such as any or all of the syringe pump 100, fluid delivery manifold 200, loading valve 300, control system 400, and alternatives thereto as provided herein. The fluid management systems of the present disclosure may accordingly implement one or more dilution control approaches. As the vehicle wash systems of the present disclosure include these vehicle wash components and/or the fluid management systems, the vehicle wash systems may thus deliver diluted solutions of chemical and motive fluid to downstream components for application in vehicle wash settings having predefined dilution ratios as controlled by the aforementioned components and systems.

In some implementations, the syringe pump 100 and the fluid delivery manifold 200 may each be configured to control a rate of chemical and fluid delivery, and therefore a dilution ratio. For instance, a rate of delivery of pressurized chemical delivered through the adjustable valve 170 of the syringe pump may be controlled by a size of the valve orifice 171, which may be adjustable using the valve needle 172. When the valve needle 172 is fully retracted, the size of the valve orifice 171 is at its largest and permits the maximum amount of flow of chemical from the syringe pump 100, and when the valve needle is fully extended, flow of chemical is blocked. A rate of delivery of motive fluid delivered from the outlet 230 of the fluid delivery manifold 200 may be controlled by an effective valve orifice area of the valve orifice 233, which may be adjustable based on a position of the plunger tip 229 of the valve 225 relative to the ingress 231 of the outlet 230 (e.g., FIGS. 2*c* and 2*d*). When the plunger tip 229 is fully retracted, the size of the size of the valve orifice 233 is at its largest and permits the maximum amount of flow of motive fluid from the fluid delivery manifold 200, and when the plunger tip 229 is fully extended, flow of motive fluid is blocked.

Dilution rates may thus be controlled by controlling the size of one or both valve orifices 171 and 233 of the respective syringe pump 100 and fluid delivery manifold 200. For instance, the stepper motor 175, or other linear actuator such as a proportional solenoid, of the adjustable valve 170 of the syringe pump 100 may be operably coupled to the valve needle 172 to control its displacement to thereby adjust the size of the valve orifice 171 and thus rate of chemical dispensing; while the actuator 250 of the fluid delivery manifold 200 may control the position of the valve limiter 255 to adjust a retraction distance of the plunger tip 229 and a resulting orifice size of the valve orifice 233 and thus a rate of fluid dispensing. Due to the dispensed chemical and fluid being combined at a mixing site, controlling the rate of dispensing of the chemical and the motive fluid results in control of the dilution rate. The positions of each of the valve needle 172 and the plunger tip 229 may be adjusted in a stepwise manner to adjust a level of flow from the respective valve orifices 171, 233. Further, the adjustments may be linear displacements, which may enable for the linear adjustment of flow and dilution rates.

Syringe Pumps

The control of the delivery of chemical and its metering may be achieved using the syringe pump 100 of the present disclosure. The syringe pump 100 or components thereof may be configured to dispense chemical for mixing with motive fluid dispensed from the fluid delivery manifold 200, and its operation may be controlled by the control system 400. The syringe pump 100 may accordingly be a component of the fluid management systems of the present disclosure.

The syringe pump 100 may be a positive displacement pump in which chemical is drawn-in and pressurized, for instance to several times that of atmospheric pressure, and dispensed or injected into downstream components as provided herein.

The syringe pump 100 may be coupled to an actuation source, such as a pressurized fluid supply, e.g., via the valve bank 103, may include mounting structures 108 such as feet or fasteners, which may be integrally formed in the syringe pump 100, for securing to various external surfaces and/or objects at a vehicle wash location, such as the common panel 101, and may be configured to dispense chemical from a chemical supply.

The syringe pump 100 is a departure from prior vehicle wash components and systems by the elimination of venturi-style chemical injection, which relies on vacuum pressure, e.g., suction, for the injection of chemicals into downstream components. In addition, the syringe pump 100 may be configured as a continuous priming syringe pump in which a chemical supply is drawn into the syringe pump 100 during chemical dispensing therefrom, and the drawn-in chemical primes the syringe pump 100 during a resetting thereof. Details of the configuration of the syringe pump 100 are provided throughout the present disclosure.

Turning to FIGS. 4*a*-4*d*, the syringe pump 100 may be an assembly including a chemical chamber 110 with a piston 120, an inlet 130 and an outlet 140, a drive mechanism 150 with a drive shaft 160, an adjustable valve 170, a slider 180, and a flow sensor such as a flow meter 185 and/or a linear encoder 186. One or more seals or gaskets, such as seals S1, S2 and S3 may provide a fluid tight connection between various components of the syringe pump 100. Seals or gaskets may be formed materials including but not limited to of fluoroelastomers or other synthetic rubbers such as highly fluorinated Viton™, or Aflas® fluoroelastomers.

The chemical chamber 110 may be a vessel configured to receive and dispense the chemical and have a single inlet and a single outlet. The chemical chamber may sealingly receive the piston 120 at an internal wall 111 defining a fluid chamber 112 of the chemical chamber 110, which may have a fixed or predetermined volume and a constant cross-section along a longitudinal length. The fluid chamber 112 may be configured to hold chemical therein and be constructed of chemically resistant and/or chemically inert materials such as polymer resins, e.g., polyvinylidene difluoride (PVDF) (Kynar®), polyethylene, polypropylene, other engineered plastics such as polyether ether ketone (PEEK), polybutylene terephthalate (PBT). In some cases an inner lining of the chemical chamber 110 may be formed of chemically resistant material and an outer chamber or tube of the chemical chamber 110 may be formed of pressure bearing material. For example, a clear polycarbonate or PVC outer tube may be lined with a clear fluorinated ethylene propylene (FEP) tube. The chemical chamber 110, or portion thereof, e.g. an upper chemical chamber 112*a* provided herein, may be configured to hold a volume of chemical of about 20 to about 200 ml, such as about 50 to about 100 ml, about 50 ml, 100 ml, 150 ml, 200 ml, or 250 ml, or a hold a volume that is at least slightly larger than a maximum volume of a dispensing stroke of chemical from the chemical chamber 110 during a dispensing operation.

In some implementations, the chemical chamber 110 may be transparent and may permit a user to view the chemical being dispensed from and replenished into the chemical chamber 110 as well as the operation of the piston 120. At a proximal or inlet end, the fluid chamber 112 may be sealed by a first plug 113, which may be configured with an internal circumference for slidably receiving the drive shaft 160, and with an external circumference for sealing against the internal wall 111 of the fluid chamber 112, e.g., via one or more seals or gaskets. The first plug 113 may define a portion of the inlet 130 as provided herein. A distal or outlet end of the fluid chamber 112 may be sealed with a second plug 114, which second plug 114 may be configured with one or more egress channels 115 for receiving chemical during dispensing, and with an external circumference for sealing against the internal wall 111 of the fluid chamber 112. In some implementations, the second plug 114 may define a portion of the adjustable valve 170 provided herein.

The piston 120 and may seal against the internal wall 111 of the fluid chamber 112, and may be configured to be movable bi-directionally along the longitudinal length of the fluid chamber 112. In FIGS. 4*a*, 4*b*, and 4*c*, the piston 120 may be movable between the proximal inlet 130 and the distal outlet 140 of the chemical chamber 110, and the outlet 140 may be on a first side 121 of the piston 120 and the inlet 130 may be on a second side 122 of the piston 120 opposite the first side 121. Pistons of the present disclosure may be formed of chemically resistant materials, which may be the same materials used to form the gaskets and seals provided herein.

A circumferential seal 123 may surround an external wall of the piston 120 and may seal against an internal circumference of the fluid chamber 112 to prevent passage of chemical between the circumferential seal 123 and the chemical chamber 110. As shown in FIGS. 4*c* and 4*e*, the circumferential seal 123 may surround a head or body 125 of the piston 120. For instance, the body 125 may define a recess 125*a* in which the circumferential seal 123 is retained, and when arranged in the recess 125*a*, the outer circumference of the circumferential seal 123 may be slightly larger than an outer circumference of the body 125 as shown in FIG. 4*f*. The circumferential seal 123 may maintain a seal between the fluid chamber 112 and the piston 120 throughout operation of the piston 120.

A one-way valve 124 may be provided in the chemical chamber 110, such as in the head or body 125 of the piston 120 and may permit passage of chemical from the second side 122 to the first side 121 of the piston 120 and prevent the passage of chemical from the first side 121 to the second side 122 thereof. The one-way valve 124 may be configured as a liquid piston check valve and be oriented to allow chemical to pass from the lower chemical chamber 112*b* to the upper chemical chamber 112*a*, and prohibit flow in the opposite direction. In the embodiment shown in FIGS. 4*b* to 4*f*, the one-way valve 124 is an umbrella valve with a plurality of through holes 124*a* defined in the head 125 of the piston 120 and a seal 124*b* of the one-way valve 124 blocks passage of chemical through the through holes 124*a* in one direction. As shown in FIG. 4*e*, the one-way valve 124 may receive the seal 124*b* at an upper face of the piston head 125 and may be flexible so as to permit chemical to pass through the egresses of the through holes 124*a* defined in the upper face during retraction or resetting of the piston 120, and move to a closed position during an advancing or dispensing movement of the piston 120. As shown in FIG. 4*f*, the lower face of the piston head 125 may define ingresses of the through holes 124*a* so as to permit chemical to enter the through holes 124*a* during such retraction or resetting position 120. Although nine through holes 124*a* are depicted in the one-way valve 124, more or fewer through holes may be provided and may have varying shapes and dimensions, and the configuration may be selected to allow various types of chemicals having various viscosities to pass through during resetting of the piston 120. For instance, at least one through hole 124*a* may be provided with a selected size, e.g., based on the chemicals and viscosities to be received therethrough, which may include one, two, three, four, five, six, seven, eight or more through holes. The umbrella valve is one type of one-way valve or check valve, and other check valve types may include but are not limited to: a flapper check valve, a duck bill check valve, a ball check valve or a poppet check valve. In other configurations, the circumferential seal 123 may be configured to serve as a check valve and for instance may circumferentially seal against the fluid chamber 112 and the piston 120 during dispensing and may permit passage of chemical during resetting.

The piston head 125 of the piston 120 may include a coupler 126 such as a threaded bore (FIGS. 4*c*, 4*f*) or a threaded projection for coupling with the drive shaft 160. The coupler 126 may be arranged along the longitudinal axis of the piston 120 to facilitate the linear movement of the assembly of the piston 120 and drive shaft 160. Where a plurality of through holes 124*a* of the one-way valve 124 are provided, these may be are arranged concentrically about the area of the piston head 125 that couples to the drive shaft 160.

The inlet 130 of the chemical chamber 110 may be configured to be fluidly coupled to a chemical supply and receive chemical therefrom and may be referred to as a chemical inlet. The inlet 130 may include an inlet body 131 defining an inlet port 132 extending between an exterior of the syringe pump 100 and an interior of the fluid chamber 112 and may be configured to draw-in chemical from a fluid supply. The inlet port 132 may include a coupler, such as threads, barbs or a coupling (e.g., L-shaped coupler with barbs and/or threads), and may be configured to be fluidly connected to fluid conduits of a chemical supply or other upstream components. The inlet port 132 may provide the chemical to the lower chemical chamber 112*b* of the fluid chamber 112. In some implementations, the inlet body 131 and the first plug 113 of the chemical chamber 110 may be unitarily formed.

The outlet 140 of the chemical chamber 110 may configured to be fluidly coupled to downstream components for facilitating vehicle wash operations, such as components of a corresponding fluid management system, and may be referred to as a chemical outlet. The outlet 140 may receive chemical from the fluid chamber 112, for instance via the adjustable valve 170 configured for adjusting a valve orifice size and thus an amount of chemical dispensed from the outlet 140. The outlet 140 may include an outlet body 141 defining an outlet port 142 (FIG. 4*b*) extending between an exterior of the syringe pump 100 and an interior of the fluid chamber 112 and may be configured to dispense the chemical from the fluid chamber 112. The outlet port 142 may include a coupler as provided herein for fluidly connecting to downstream fluid conduits. In some implementations, the outlet body 141 and the second plug 114 of the chemical chamber 110 may be unitarily formed.

At either or both of the inlet 130 and the outlet 140 of the chemical chamber 110, the syringe pump may include a check valve, e.g., check valve 176 (FIGS. 1*g* and 1*h*). The check valve(s) may open when the piston 120 is driven in the advancing or dispensing direction, where pressure in the fluid chamber 112*a* opens the check valve arranged at the outlet 140, and/or vacuum opens the check valve arranged at the inlet 130. The check valve(s) may close when the piston 120 is retracted or moved in a resetting stroke to thereby prevent backflow of chemical at such port or ports. The check valves may prevent backflow of chemical when the drive mechanism 150 is in the idle state or when the drive mechanism 150 causes one-way valve 124 to open (e.g., causes the piston 120 to move in the proximal direction during priming of the upper chemical chamber 112*a*) during the resetting stroke. The check valve(s) at these ports of the chemical chamber 110 may have a configuration that differs from the one-way valve 124 arranged in the chemical chamber 110, and for instance may be configured as ball check valves (FIG. 4*g*), whereas the one-way valve 124 may be configured as an umbrella valve or any other suitable valve configuration disclosed herein.

The drive mechanism 150 may be configured to drive the piston 120 towards and away from the proximal and distal ends of the chemical chamber 110, e.g., the drive mechanism 150 may move the piston 120 bi-directionally. In FIGS. 4*a*-4*d*, the drive mechanism 150 may define a housing 151 including an external wall 151*a* and an internal wall 151*b* defining a drive chamber 152 (FIGS. 4*b*, 2*c*), a piston 153, a circumferential seal 154 surrounding a body 155 of the piston 153, a plug 156, ports 157*a*, 157*b*, and one or more seals 158 isolating the drive mechanism from the chemical chamber.

The housing 151 of the drive mechanism 150 may be configured be coupled to the chemical chamber 110 and to house various components of the drive mechanism 150. For instance, the housing 151 may be coupled directly to the chemical chamber 110 or via the inlet body 131 and/or plug 156. In some implementations, couplers C such as threaded tie rods may couple the drive mechanism housing 151 to the chemical chamber 110, and with reference to FIGS. 4*a* and 4*d*, the couplers C may be received through openings defined in the outlet body 141 and/or plug 114 and the inlet body 131 and/or plugs 113, 156 with the chemical chamber 110 arranged therebetween, and the couplers C may be threadedly engaged with the drive mechanism housing 151.

The drive chamber 152 of the housing 151 of the drive mechanism 150 may have a fixed volume and a constant cross-section along a longitudinal length, which may enable a seal to be maintained between the drive chamber 152 and a piston 153 of the drive mechanism 150 throughout operation of the drive mechanism 150. For example, the drive chamber 152 may have a barrel or circular shape, and the piston 153 may have a complementary shape thereto with the circumferential seal 154 surrounding the body 155. The piston body 155 may include a coupler 159 such as a threaded bore (FIG. 4*c*) or a threaded projection for coupling with the drive shaft 160. The coupler 159 may be arranged along the longitudinal axis of the piston 153 to facilitate the linear movement of the assembly of the piston 153, the drive shaft 160 and the piston 120. The drive chamber 152 may be configured to receive driving fluid such as compressed air or compressed liquid, e.g., the drive mechanism 150 may be pneumatic or hydraulic, and may be divided into an upper cavity 152*a* and a lower cavity 152*b* by the piston 153 and as such the chambers 152*a*, 152*b* may have a variable volume during operation of the syringe pump 100, while the drive chamber 152 has a fixed volume divided between the upper and lower cavities. The drive chamber 152 may be sealed at an upper or proximal end by a plug 156, which may be configured with an internal circumference for slidably receiving the drive shaft 160, and with an external circumference for sealing against the internal wall 151*b* of the drive chamber 152, e.g., via one or more seals or gaskets. In some implementations, the plug 156 of the drive mechanism 150 may be formed unitarily with the inlet body 131 of the inlet 130 and the first plug 113 of the chemical chamber 110. The chambers 122, 152 of the chemical chamber 110 and the drive mechanism 150 may be isolated from each other by the one or more seals 158 such as a series of dynamic gaskets or O-rings arranged in the plug 156 and/or the inlet body 131 and/or the plug 113 of the chemical chamber 110. The drive chamber 152 may include an upper or distal pneumatic port 157*a* fluidly coupled to the upper cavity 152*a*, and a lower or proximal pneumatic port 157*b* fluidly coupled to the lower cavity 152*b*. Such ports of the drive mechanism 150 may include a coupler as provided herein for fluidly connecting to a supply of driving fluid (e.g., compressed air or liquid). In FIGS. 4*a*-4*d*, the chemical chamber 110 and the drive mechanism 150 may be arranged along a longitudinal axis of the syringe pump 100 and the chambers 122, 152 may be fixed relative to each other.

In alternative configurations, the drive chamber 152 may be integral with the plug 156, e.g., may define a single component, and a plug may be located on the bottom of the drive chamber 152 proximate the lower pneumatic port 157*b*, which for instance may facilitate installation of the piston 153 or servicing.

In FIGS. 4*a*-4*d*, the drive shaft 160 of the drive mechanism 150 may be joined to the piston 120 of the chemical chamber 110 and may drive the piston 120 in a first direction towards the outlet 140 and may drive or otherwise cause the piston 120 to move in a second direction opposite the first direction towards the inlet 130. For instance, the drive shaft 160 may be joined between the piston 120 of the chemical chamber 110 and the piston 153 of the drive mechanism 150 and may cause the piston 120 to be slaved in movement as the piston 153 is driven during operation of the drive mechanism 150. The drive shaft 160 may be slidably arranged in the syringe pump 100 and slide in the proximal and distal directions of the chemical chamber 110 and the drive mechanism 150. In some implementations, the drive shaft 160 may be non-rotatable and include a linear guide such as a longitudinal groove or splines configured to receive a guide or splines of the plug 156 for linearly guiding the drive shaft 160 during operation of the drive mechanism 150. In additional or alternative configurations, the drive shaft 160 may be threaded, for instance where the drive mechanism 150 includes a mechanical drive configured to drive the drive rod 160 during operation such as via a threaded engagement with a rotational drive sleeve or nut. In certain configurations, the drive shaft 160 may be configured to be linearly driven and guided via a longitudinal guide and include threading for being driven by the rotatable drive sleeve. Alternatively, the drive sleeve may be linearly driven and linearly drive the piston 120. The one or more seals 158 may surround the drive shaft 160 for fluidly isolating the drive mechanism 150 from the chemical chamber 110.

Figure 4G:
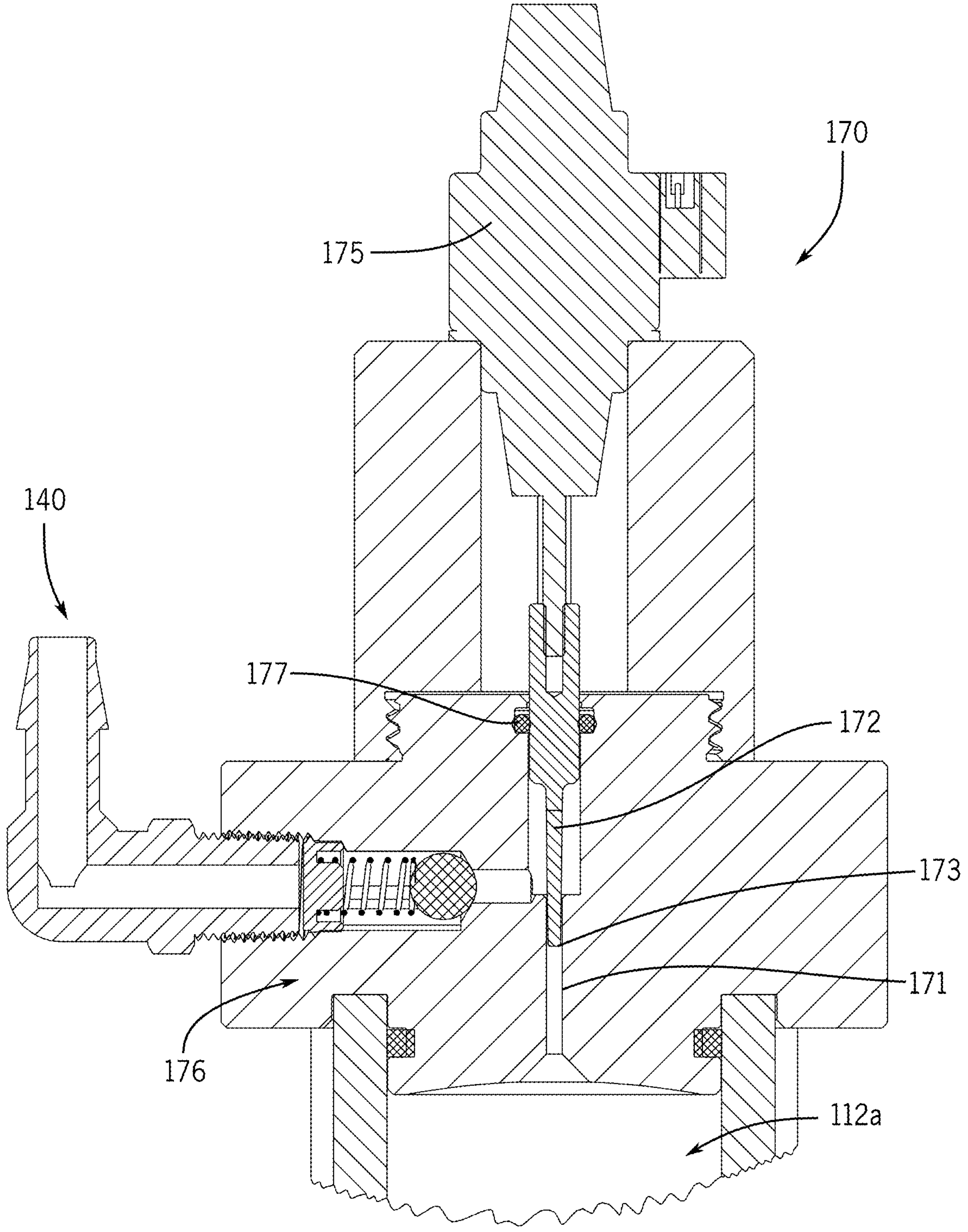
FIG. 4*g* is a detail view of an adjustable valve of the chemical delivery device of FIG. 4*a;*
Figure 5B:
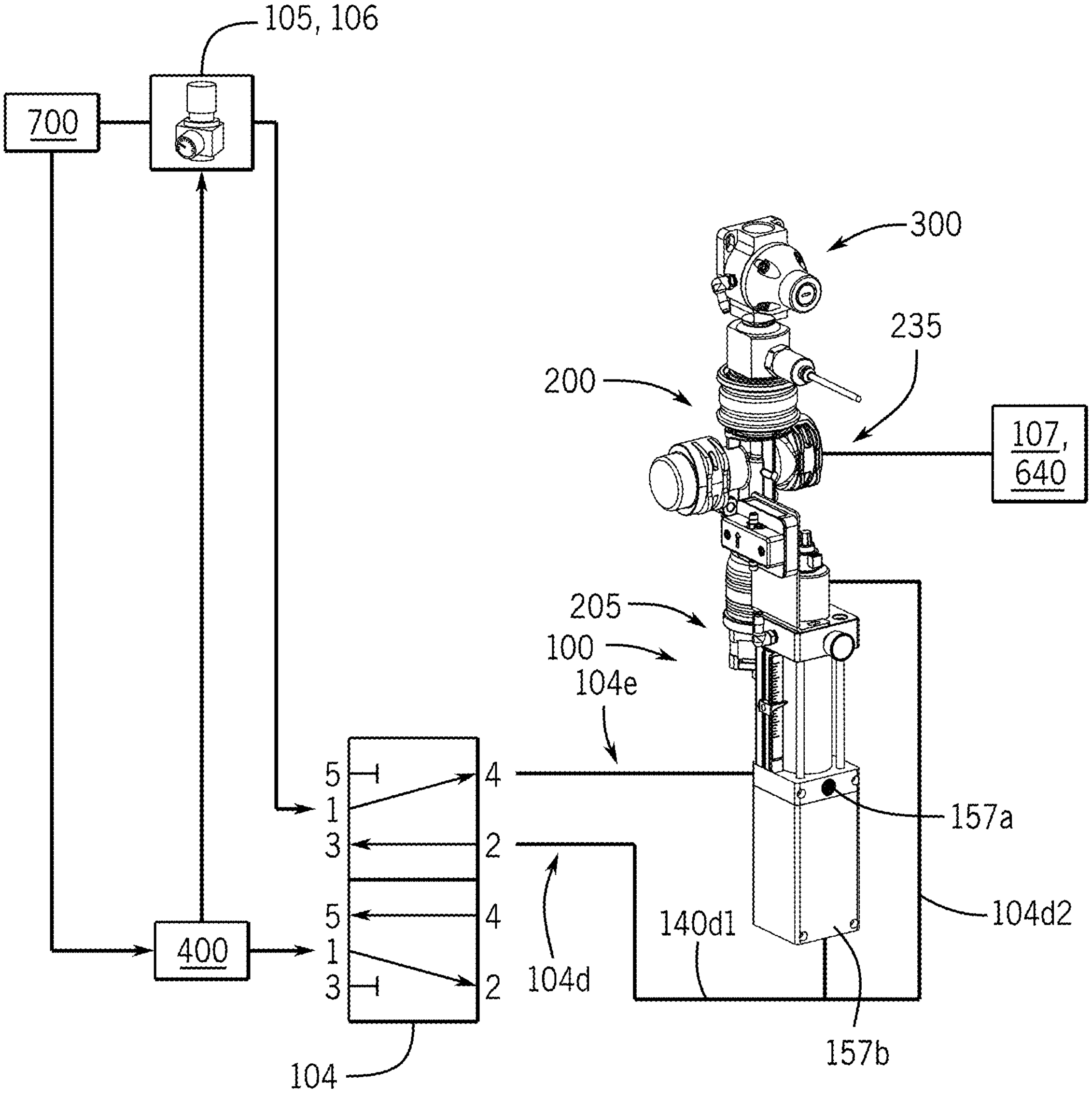
FIG. 5*b* is a schematic diagram of a valve circuit of the fluid management systems, according to various implementations of the present disclosure.

With reference to FIG. 4*g*, the adjustable valve 170 may include a valve orifice 171, valve needle 172, a linear stepper motor 175, an upper check valve 176, and a valve needle gasket 177. In some implementations, the valve orifice 171 may be the same as the one or more egress channels 115 of the second plug 114. The valve orifice 171 may be fluidly coupled to the outlet port 142 of the outlet 140, and the valve needle 172 may be movable arranged in the valve orifice 171 upon actuation of the stepper motor to adjust the size of an effective valve orifice area of the valve orifice 171 as provided herein. The upper check valve 176 may be arranged between the valve orifice 171 and the outlet port 142 and may prevent backflow of chemical into the fluid chamber 112.

A pressure gauge 178 configured as a pressure sensor (FIG. 4*c*) may optionally be provided to measure the fluid pressure within the upper chemical chamber 112*a*.

The slider 180 may slide up and down (e.g., manually by hand or mechanically by being attached to the drive mechanism) along the longitudinal length of the chemical chamber 110 and point to a position on a graduated volumetric scale 182 to serve as a reference for a user to visually confirm an amount of chemical dispensed from the syringe pump 100 per dispensing stroke of a dispensing operation is at the desired amount. For instance, the user may confirm the end of the dispensing stroke corresponds to the position of the slider 180 along the scale 182.

Figure 4H:
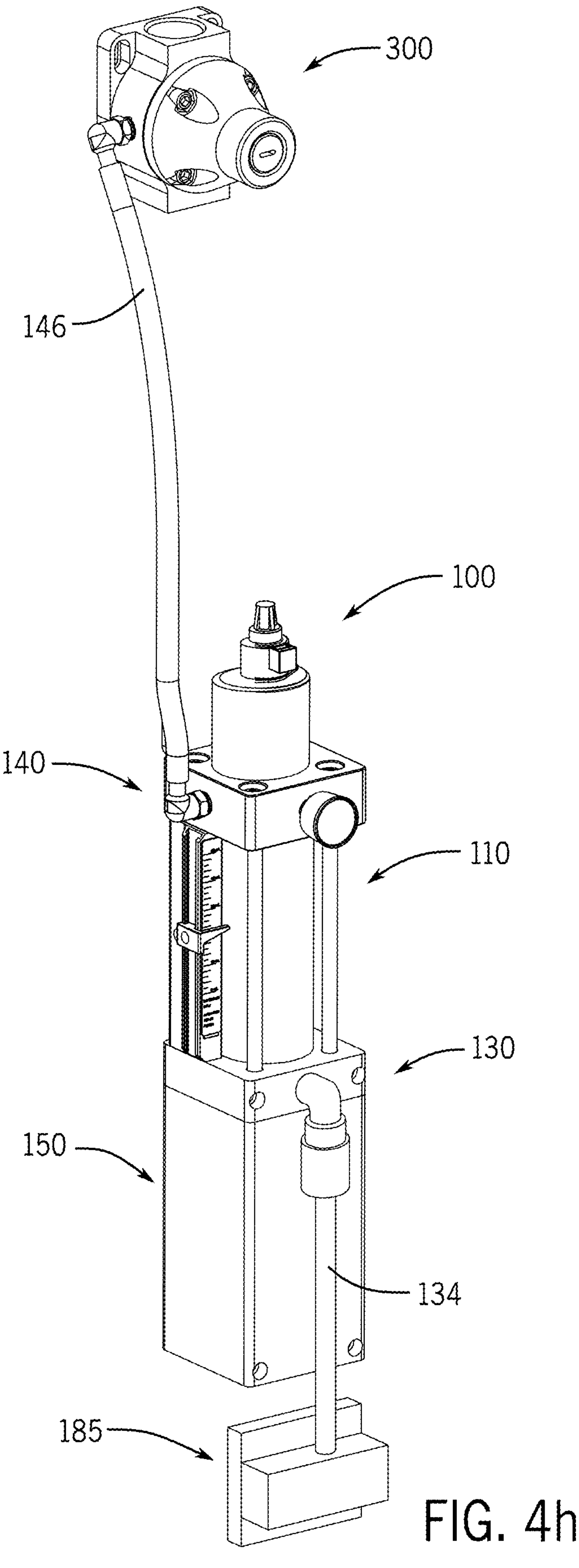
FIG. 4*h* illustrates an isometric view of the chemical delivery device of FIG. 4*a* coupled to a loading valve.

The liquid flow meter 185 may be one type of flow sensor that may be used according to various implementations. The flow meter 185 may be used to derive a fluid flow rate or volume. Information from the flow meters may be used to calculate or determine flow rates by the control system 400 for instance based on voltage readings, voltage current readings, pulse counts or flow values from the flow meters. The flow meter 185 may be coupled to a fluid line of a vehicle wash component of the present disclosure and configured to measure the flow rate of the fluid therethrough. The liquid flow meter 185 may be a positive displacement flow meter; however the flow meter 185 may also be another type such as an ultrasonic flow meter, a thermal mass flux type flow meter, a turbine flow meter, etc. The flow meter 185 may be configured to measure liquid flow rate continuously, such as during each operational cycle or portion thereof, e.g., dispensing stroke. The flow meter 185 may be communicatively coupled to a control system 400 (FIG. 3*a*) and for instance may transmit flow rate data thereto. Due to configurations of the syringe pump 100, which simultaneously draws in an equal amount of chemical as what is being dispensed, the flow meter 185 may be positioned at the outlet 140 (FIG. 4*a*) or the inlet 130 (FIG. 4*h*) of the chemical chamber 110. In examples, and with reference to FIG. 4*h*, the chemical drawn into the inlet 130 of the syringe pump 100 may first pass through the flow meter 185 for sensing the flow of chemical entering the syringe pump 100. The flow meter 185 may be fluidly coupled to the inlet 130 via a chemical inlet tube 134. Positioning at the inlet 130 as shown in FIG. 4*h* may be advantageous since the liquid flow meter 185 may experience only vacuum and not pressure, and may additionally allow for the shortening or elimination of one or more chemical outlet tubes thereby shortening the distance which the pressurized chemical travels. However, the flow meter 185 may be positioned at the outlet 140 of the syringe pump 100 and fluidly coupled via the outlet tube 144 and function to sense flow of chemical dispensed from the syringe pump 100 as shown in FIG. 4*a*. The flow meter 185 may be communicatively coupled to the control system 400 as provided herein. Alternatively, in embodiments in which the chemical flow information is derived from the use of a linear position feedback system (e.g., a linear encoder 186) coupled to the piston and drive shaft assembly (e.g., the assembly of the pistons 120, 153 and the drive shaft 160), the flow meter 185 may not be necessary, and the chemical may proceed to downstream component such as the upper chemical outlet tube 146 and/or a mixing or delivery site such as a loading valve 300, and/or a vehicle wash applicator 630 of the vehicle wash system 600 of FIG. 5*a*.

A linear encoder 186 (FIG. 4*b*), e.g., a linear position feedback system, is another type of flow sensor that may be used according to various implementations. The linear encoder 186 may be used to derive a fluid flow rate or volume. The linear encoder 186 may include a sensor 186*a* configured to sense each of a series of gradations 186*b*. For instance, the sensor 186*a* may be coupled to a piston and drive shaft assembly such as one of the pistons 120, 153 or the drive shaft 160 of the syringe pump 100, and the gradations 186*b* may be arranged along a length of the drive chamber 152 or the chemical chamber 110. The gradations may be constructed of metal (e.g., configured as a metal scale) and the sensor may be configured with a magnet configured to sense the gradations. Each gradation may correspond to a predefined volume of chemical dispensed, and the gradations may be evenly spaced. The linear encoder 186 may be used to determine the linear displacement of the drive shaft 160, which corresponds to a predetermined volume of chemical dispensed from the chemical chamber 110 for determining the flow rate of chemical dispensed from the syringe pump 100. The linear encoder 186 may be communicatively coupled to the control system 400 (FIG. 1) and for instance may transmit linear displacement data thereto. Based on the linear displacement information, the control system 400 may determine a flow rate of the chemical dispensed from the syringe pump 100.

Operation of the Syringe Pump

In operation, the syringe pump 100 may advance to dispense chemical and retract to recharge the syringe pump 100 with chemical drawn therein during dispensing. In a more particular example, the syringe pump 100 may undergo an operational cycle. The operational cycle may correspond to when the syringe pump 100 (or other vehicle wash component) is active, e.g., not in an idle state, and may have a dynamic or variable duration. This variable duration enables the syringe pump 100 to dispense different amounts of chemical across operational cycles. The operational cycle is also referred to as a dispensing cycle or a dispensing operation in which chemical is dispensed by advancing the piston 120 and the syringe pump is reset by retracting the piston 120. In such dispensing operations, the drive mechanism 150 may cause the piston 120 and drive shaft 160 and optionally the piston 153 depending on the type of drive mechanism, referred to as the piston and drive shaft assembly, to extend once in a dispensing stroke and to retract once in a resetting stroke. The extension of the piston 120 in the chemical chamber 110 may thus be referred to as, or be a part of, a dispensing stroke of the dispensing operation, and the retraction of the piston 120 may thus be referred to as, or be a part of, a resetting stroke of the dispensing operation. In some cases, upon completion of the resetting stroke, before a subsequent dispensing operation is or can be initiated, the syringe pump 100 may be in an idle state. Further, the upper chemical chamber 112*a* may have a volume such that a sufficient amount of chemical will be available for the duration of the dispensing stroke for the majority of commercial vehicle wash applications. The benefit of a syringe pump 100 of this nature, e.g., which only cycles once during an injection or dispensing operation, is that chemical delivery flow is uninterrupted and consistent, in contrast to a pump which cycles multiple times and/or frequently (e.g., such as diaphragm pumps, piston pumps, gear/lobe pumps) during a dispensing operation resulting in disruptions in chemical dispensing.

When chemical is to be dispensed from chemical chamber 110, the drive mechanism 150 may exert a force on the piston and drive shaft assembly in the distal direction or towards the outlet 140, which in turn causes the chemical within the upper fluid chamber 112*a* to be pressurized and the one-way valve 124 located on the head 125 of the piston 120 is forced shut, preventing the chemical from moving from the upper chemical chamber 112*a* to the lower chemical chamber 112*b* via the one-way valve 124, thus resulting in the chemical being dispensed from the upper fluid chamber 112*a* in the dispensing stroke. In addition, a circumferential seal may be constantly maintained between the fluid chamber 112 and the piston 120, e.g., throughout operation of the piston 120. For example, the fluid chamber 112 may have a barrel or circular shape, and a circumference of the piston 120 may have a complementary shape thereto, enabling such a seal to be maintained therebetween throughout movement of the piston 120 (e.g., throughout operation of the drive mechanism 150).

As the piston and drive shaft assembly continues through its dispensing stroke, the chemical within the upper chemical chamber 112*a* continues to be dispensed and flow out of the syringe pump outlet 140 to downstream components. During such dispensing, a vacuum occurs (pressure lesser than atmospheric) in the lower chemical chamber 112*b* resulting in chemical being drawn into the lower chemical chamber 112*b* from a chemical supply through the inlet 130. Consequently, during the dispensing stroke, the chemical chamber 110 receives staged chemical in the lower chemical chamber 112*b*. For instance, as shown in FIG. 5*a*, the chemical may be drawn into the syringe pump(s) 100 from a chemical supply such as barrels 610, 615 of a vehicle wash system 600 during piston 120 advancement or dispensing, due to the chemical supply being at atmospheric pressure, the chemical is drawn into the inlet 130 by the vacuum or suction.

Since the syringe pump 100 is a closed system, during dispensing, the rate at which the chemical is drawn into the lower chemical chamber 112*b* is approximately equal to the rate at which fluid is dispensed from the upper chemical chamber 112*a* via the outlet 140. Consequently, the syringe pump 100 may be configured such that the upper chemical chamber 112*a* and the lower chemical chamber 112*b* remain entirely filled with chemical throughout the operation of the syringe pump 100. In some implementations the inlet 130 may be configured to flow more volume of chemical than a maximum flow rate of the outlet 140. For instance, an orifice of the inlet may be larger than an orifice of the outlet, or larger than the largest orifice size of an adjustable outlet. This configuration may ensure that the fluid chamber 112 is always full due to the inlet 130 being able to draw in chemical at least as fast as chemical is being dispensed from the outlet 140, and in some cases faster than dispensing, which can prevent vacuum voids from being created in the fluid chamber 112, e.g., the lower chemical chamber 112*b*.

Once the dispensing stroke of the dispensing operation has been completed by the syringe pump 100, the drive mechanism 150 may be caused to retract the piston 120 in the resetting stroke, for instance by the valve node 102 or by the control unit 400 triggering the associated valve 104 within the valve bank 103 to switch positions to initiate the resetting stroke.

In the resetting stroke, since the one-way valve 124 allows flow from the lower chemical chamber 112*b* to the upper chemical chamber 112*a*, the piston 120 passes freely through the chemical within the fluid chamber 112 and the chemical contained within the lower fluid chamber 112*b* passes into the upper fluid chamber 112*a* of the fluid chamber 112 via the one-way valve 124. As such the newly received chemical in the upper fluid chamber 112*a* may be primed chemical in a condition for dispensing from the outlet 140 in a subsequent dispensing operation. A check valve may additionally be located prior to (e.g., upstream from) the inlet 130 of the chemical chamber 110 and may be configured to permit chemical to enter into the inlet 130 but prevent chemical from exiting when the piston and drive shaft assembly returns to the retracted position. The fluid pressure in the lower fluid chamber 112*b* may remain constant or may slightly increase during the resetting stroke due to the piston 120 generating pressure in its resetting or retracting movement in the chemical chamber and as the chemical passes through the one-way valve 124.

The rate at which the piston and drive shaft assembly retracts during the resetting stroke may be dependent upon a number of factors, such as: friction between contacting surfaces, the flow coefficient (Cv) through the one-way valve 124, the viscosity of the chemical contained within the chemical chamber 110 and the force/speed of the drive mechanism 150. For instance, the retract time may be less than a second in duration for chemicals having a viscosity of ~1000 cPs within the chemical chamber 110. This rapid "recharge" time (e.g., the time in between dispensing strokes, which may be the time it takes for the upper chemical chamber 112*a* to be filled with chemical from the lower chemical chamber 112*b* so that the fluid chamber 112 is ready to cycle again in a subsequent dispensing operation) may provide advantages in vehicle washes, since the time between dispensing strokes of sequential dispensing operations may be as short as a few seconds. Due to syringe pumps 100 of the present disclosure receiving staged chemical during the dispensing stroke of the dispensing cycle, the syringe pumps 100 can be recharged within a few seconds, e.g., during the resetting stroke where the upper chemical chamber 112*a* is primed, while traditional syringe pumps with an equivalent size can take more than a minute to draw in and become fully filled with fluid having a viscosity of ~1000 cPs.

Once the piston and drive shaft assembly has completed its resetting stroke, e.g., is fully retracted or in a retracted position, and fluid pressure between the upper chemical chamber 112*a* and lower chemical chamber 112*b* has equalized, the syringe pump 100 is ready for the next dispensing stroke of the next dispensing operation, e.g., pending a command from the valve node 102 or control system 400. Prior to the next dispensing operation, the syringe pump 100 may be in its idle state with the piston 120 remaining in its retracted position.

Returning to the dispensing stroke, and with reference to FIG. 4*g*, as chemical is pressurized, the chemical is forced from the upper chemical chamber 112*a* into the adjustable valve 170, e.g., through the valve orifice 171. The rate at which the chemical flows through the valve orifice 171 may be controlled by the valve needle 172 (additionally dependent upon fluid viscosity, pressure differential, etc.). To control the linear displacement of the valve needle 172 a linear stepper motor 175, or other linear actuator such as a proportional solenoid, may be operably coupled to the valve needle 172. When the linear stepper motor 175 is fully extended the valve needle 172 may be seated within the valve orifice 171 effectively allowing no flow to pass (e.g., FIG. 4*c*). When the linear stepper motor 175 is in the fully retracted position (e.g., FIG. 4*g*), the effective valve orifice area of the valve orifice 171 is at its largest and permits the maximum amount of flow for which the adjustable valve 170 has been designed for. Partial extension of the valve needle 172 within the valve orifice 171 permits a portion of the maximum amount of flow, which may be controlled in steps using the linear stepper motor 175.

The valve needle 172 may be configured with a parabolic tip 173, which may be dimensioned to achieve a linear relationship between the effective valve orifice area, which is the cross-sectional area of the valve orifice 171 minus the cross-sectional area of the valve needle 172, and linear displacement of the valve needle 172 during linear displacement of the valve needle 172. Having a linear relationship between the valve needle 172 displacement and the area of the valve orifice 171 using the parabolic tip 173 may facilitate providing a linear adjustment of the flow rate of the chemical across the full area of the valve orifice 171, resulting in consistent flow control resolution across the entire flow control span. Using a linear stepper motor 175 to control linear displacement of valve needle 172 may provide a finite number of steps of the flow control span. For instance, the number is steps is determined by the displacement range of the linear actuator, pitch of the linear actuator lead screw, and step angle of the stepper motor. Since the number of steps within the flow control span is finite, having an appropriately designed parabolic tip 173 may ensure that each step of the motor will change the flow rate by the same amount. This is in contrast to a traditional tapered valve needle, in which the relationship between the flow rate and needle valve displacement will be logarithmic. This is especially problematic when high resolution at low flow rates is necessary, since the flow adjustment resolution per step of the motor will be large at the beginning of the needle adjustment span and will continue to decrease as the displacement of the valve needle increases.

Upon passing through the effective valve orifice area created by the valve orifice 171 and valve needle 172, the dispensed chemical may then pass through an upper check valve 176. The upper check valve 176 may be configured to allow chemical to flow out from the adjustable valve 170 but not back in. Additionally, the chemical is blocked from traveling up the stem of the valve needle 172 due to the valve needle gasket 177. After passing by the upper check valve 176 the chemical may enter the syringe pump outlet 140 such as the outlet port 142 fluidly coupled to one or more fluid conduits such as outlet tubes 144, 146 (FIG. 4*a*). Although the adjustable valve 170 is illustrated as being downstream of the outlet 140, in some implementations, the adjustable valve 170 may be fluidly coupled to the inlet 130 and may adjust the flow of upstream chemical passing into the chemical chamber 110 via the inlet 130. In such a modification, the adjustable valve 170 may control the effective valve orifice area to control the amount of flow of chemical into the lower chemical chamber 112*b* via the inlet 130 to thereby control the amount of flow of chemical out of the upper chemical chamber 112*a* during dispensing. Alternatively, although the adjustable valve 170 is shown as being integrated into the outlet body 141 (e.g., top cap of the syringe pump) providing a compact package, the needle valve 170 may be located further downstream of the check valve 176 to control the flow of chemical from the syringe pump 100.

The dispensing stroke of the piston and drive shaft assembly may be variable for instance based on a control signal delivered to the drive mechanism 150. Accordingly, in some cases, the slider 180 may be positioned along the length of the chemical chamber 110 and point to a position on the graduated volumetric scale 182 for use as a reference to visually confirm an amount of chemical dispensed per dispensing stroke is at the desired amount. This may provide a rapid approach for a user to determine the dispensed chemical volume through mechanical means, particularly where the chemical chamber 110 is transparent, allowing the user to view the chemical being dispensed from the syringe pump 100 during operation. In addition or alternatively, a flow sensor such as the flow meter 185 and/or the linear encoder 186 may be used to determine the dispensed chemical volume as provided herein.

The operation of the syringe pump 100 may be controlled by the valve node 102 or by the control system 400, and the drive mechanisms 150 of the syringe pumps 100 of the fluid management systems may be individually operated. As such, the control system 400 and/or valve node 102 be configured as a controller with a processor and memory (e.g., as a computer), may be communicatively coupled to such a controller, or both, and may be programmed with instructions to control or perform the methods or the operations described herein. In some examples, the control system 400 and/or valve node 102 includes a programmable logic controller (PLC) configured to, or be programmed to, control or perform methods or operations described herein. As such machine-readable medium including instructions may be executed by the processing circuitry of the control system 400 and/or valve node 102 of the present disclosure.

Prior to initiating a dispensing operation, the chemical chamber 110 in an empty state may be primed or charged with chemical to commission the syringe pump 100 for undergoing the dispensing operations. In a priming operation, for instance, the chemical may be caused to enter the chemical chamber 110 via the one-way valve 124, and air within the chemical chamber 110 may be vented via the outlet 140 as the piston 120 moves to a retracted and an extended position within the chemical chamber 110 multiple times.

The rate at which the chemical is dispensed from the syringe pump 100 is at least partially controlled by the effective valve orifice area of the valve orifice 171 of the adjustable valve 170 of the syringe pump 100 (additionally dependent upon fluid viscosity, pressure differential, etc.). The effective valve orifice area of the valve orifice 171 of the adjustable valve 170 is controlled by the position of the valve needle 172, as provided above in connection with FIGS. 4*a*-4*g*. Accordingly, in operation of the syringe pump 100 the effective valve orifice area of the valve orifice 171 at the outlet 140 of the syringe pump 100 may be adjusted to facilitate regulating a distance the piston 120 and drive shaft 160 travels during the dispensing stroke of the dispensing cycle, and thus the effective valve orifice area of the valve orifice 171 may facilitate regulating an amount of pressurized chemical dispensed from the outlet 140 during the dispensing stroke of the dispensing cycle. For instance, the drive mechanism 150 may be actuated for a pre-determined period of time during the dispensing stroke, and the amount of chemical dispensed may be based on the orifice size of the adjustable valve 170. Other approaches to controlling the amount of chemical dispensed from the syringe pump 100 may include but are not limited to adjusting the pre-determined dispensing cycle time; and/or using a flow rate adjustment device to adjust an orifice size of the top and/or lower pneumatic port 157*a*, 157*b*, which may be used alone or in combination with the adjustable valve 170 coupled to the inlet 130 or the outlet 140. Accordingly, flow rate adjustment devices may include but are not limited to providing an adjustable valve 170 at or in the pneumatic port(s) and/or fluid port(s), use of a pinch valve, use of a needle in the flow path, providing a tortuous path, use of a proportional solenoid; and/or adjusting a driving speed of the drive mechanism 150 configured with a variable drive.

The control system 400 may control the duration in which the syringe pump 100 is cycled, e.g., a duration of the operational cycle. For instance, the control system 400 may be communicatively coupled to the flow sensor, such as the liquid flow meter 185 or linear encoder 186. The control system 400 may use data from the flow sensor for determining the flow rate of chemical dispensed from the syringe pump 100, for instance during the dispensing stroke or the dispensing cycle. Based on the information received from the flow sensor, the control system 400 may determine a predetermined volume of chemical has been dispensed and may cause the drive mechanism 150 to cease chemical dispensing, continue chemical dispensing, and/or may cause the adjustable valve 170 to adjust the effective valve orifice area of the valve orifice 171 to thereby adjust a rate of flow of chemical through the outlet 140. In some implementations, the adjustable valve 170 may be operated between operational cycles or during a resetting stroke. In such embodiments, the control system 400 may provide closed loop control of the syringe pump 100.

The control system 400 may be communicatively coupled with a centralized or main car wash controller 700 and may be configured to receive signals from the centralized controller 700, interpret and process that signal, and generate and send the generated signal to the valve drive mechanism. For instance, in the absence of a signal from the centralized controller 700, the control system 400 and/or the drive mechanism 150 may be in their idle state, e.g., following a retraction stroke of the dispensing cycle. A signal from the centralized controller 700 may serve as a trigger for the control system 400, which may result in the control system 400 generating a separate signal for operation of the syringe valve 100 and other components of the fluid management system 500.

The signal from the centralized controller 700 may be a dispensing signal for causing the dispensing cycle to operate, e.g., at a specific time, for a first pre-determined period of time or both, and the control system 400 may generate a different signal for operating the syringe valve 100 for a second, different pre-determined period of time.

In another example, the signal from the centralized controller 700 may be a signal configured for a type or model of vehicle wash component that differs from the syringe pump 100. In this case, the signal received by the control system 400 may interpreted simply as a trigger for the fluid management system 500 or components thereof to operate. For instance, the control system may generate a signal to operate the syringe pump 100 in a dispensing cycle for a pre-determined period of time as set by the control system 400.

Pneumatic Operation of Syringe Pump

The syringe pump 100 may be pneumatically operated and the drive mechanism 150 may be an integral double-acting pneumatic cylinder. The pressurized air source 106 may provide the pressurized air to the drive mechanism 150 to cause pneumatic operation. The pressurized air source 106 may be communicatively coupled to the one or more processors 410 of the control system 400 and optionally the power source 520 for causing chemical dispensing. For instance, the actuator 104 or valve bank 103 may receive control signals from the control system 400 to cause the pressurized air source 106 to deliver pressurized air to cause the dispensing and resetting strokes of the drive mechanism 150. In another example, the one or more processors 410 may cause control signals to be transmitted to the pressurized air source 106 for delivery of pressurized air to the drive mechanism 150 of the syringe pump 100 via the actuator 104. The actuator 104 and actuators of the valve bank 103 may be configured as solenoid valves containing an electrical coil. The solenoid valves may be pneumatically piloted valves such as coaxial valves, double acting coaxial valves, or as solenoid actuated coaxial valves, as pneumatic actuated angle seat valves or as a pneumatically actuated ball valves.

With reference to FIGS. 4*a*-4*d*, the drive shaft 160 may be directly coupled to the piston 120 of the chemical chamber 110 and to the piston 153 of the drive mechanism 150. In an idle state of the drive mechanism 150, the upper cavity 152*a* of the drive chamber 152 may be pressurized with air through the top or distal pneumatic port 157*a* and the lower cavity 152*b* of the drive chamber 152 may be open to atmosphere through the lower or proximal pneumatic port 157*b*. This pressure differential across the piston 153 forces the piston 153 to the furthest retracted position in the drive chamber 152, and the piston 153 may be at or near the proximal end of the drive chamber 152 resulting in a minimal volume in the lower cavity 152*b*. Since the piston 153 of the drive mechanism 150 is coupled to the piston 120 of the chemical chamber via the drive shaft 160, the piston 120 is also drawn proximally into a furthest retracted position when the drive mechanism 150 is in the idle state.

For initiating the dispensing stroke, the pneumatic air signals at the drive mechanism 150 are instantaneously flipped, such that the lower cavity 152*b* is pressurized through the lower pneumatic port 157*b* and the upper cavity 152*a* is opened to atmosphere through the top pneumatic port 157*a*. This switching may occur from the valve bank 103 which may be controlled in communication with the valve node 102 or the control unit 400. When this switching occurs, the air pressure in the lower cavity 152*b* is now greater than the pressure in the upper cavity 152*a*, and as a result, a force is imparted on the piston and drive shaft assembly, which in turn drives the piston 120 to the extended position during the dispensing stroke resulting in the chemical within the fluid chamber 112 being pressurized. The pressure experienced by the liquid chemical in the fluid chamber 112 is approximately equal to the air pressure in the lower cavity 152*b* multiplied by the ratio of the piston 153 area to the piston 120 area (assuming that frictional losses are negated). As a result the one-way valve 124 located on the head 125 of the piston 120 is forced shut, preventing the chemical from moving from the upper chemical chamber 112*a* to the lower chemical chamber 112*b* via the one-way valve 124.

When the valve 104 switches, the air signals to the syringe pump 100 are instantaneously reversed. The top pneumatic port 157*a* is now pressurized with air and the lower pneumatic port 157*b* is opened to atmosphere. This causes a pressure differential between the upper air cavity 152*a* and lower air cavity 152*b*, and as a result the piston and drive shaft assembly is forced back into the retracted position (e.g., FIG. 4*c*) in the resetting stroke, and the one-way valve 124 allows flow of chemical from the lower chemical chamber 112*b* to the upper chemical chamber 112*a* for its dispensing from the outlet 140 in a subsequent dispensing operation.

The rate at which the piston and drive shaft assembly retracts during the resetting stroke using a pneumatic drive mechanism 150 may, in addition to the factors discussed above, additionally be dependent upon a number of factors, such as: the flow coefficient (Cv) of air entering through the top pneumatic port 157*a*, and the flow coefficient of air exiting through the lower pneumatic port 157*b*. Since the flow coefficient (Cv) may be changed for either the air entering through the top pneumatic port 157*a* or the air exiting through the lower pneumatic port 157*b* using a flow adjustment device, the speed at which the piston and drive shaft assembly retracts may be adjusted, e.g., decreased or increased, by adjusting this flow coefficient (Cv) for either port.

The operation of the syringe pump 100 may be controlled by the valve node 102 or by the control system 400 which may incorporate the functions of the valve node 102, and for instance the duration which the syringe pump 100 is cycled may be controlled by such component(s). The valve bank 103 may include a plurality valves 104, and the valves 104 may be configured to be fluidly coupled and cooperate with the pneumatic ports of the drive mechanism 150 of the syringe pump 100, as well as other pneumatic ports of the fluid management systems disclosed herein. The valve bank 103 under direction of the valve node 102 or control system 400 may enable individual actuation of the valves 104, which may be electrically connected to a power source, e.g., power source 520, for causing one or more of the individual valves 104 to switch resulting in a change in air pressure within the drive mechanism 150 or other components of the fluid management systems. The valve node 102 may be configured as a controller with a processor and memory (e.g., as a computer), may be communicatively coupled to such a controller, or both. In some implementations, the valve node 102 may be integrated in the control system 400 of the fluid management systems as provided herein.

Where the drive mechanism 150 is pneumatically operated, the drive mechanism 150 may be configured as a double acting linear pneumatic cylinder, and air pressure may be applied to actuate the piston 120 as well as the one-way valve 124 depending on the direction of the piston's 120 movement via the valves 104.

The pneumatically operated syringe pump 100 may be a continuous priming syringe pump due to the chemical chamber 110 being primed during movement of the piston and drive shaft assembly in both directions. Particularly, when the drive mechanism 150 is in the unactuated, or idle state, the piston 153 of the piston and drive shaft assembly may be forced in the proximal direction, e.g., during the resetting stroke, by the valve 104 delivering the pressurized air from the second outlet 104*e* (when in its normally open position) to the upper cavity 152*a* to thereby cause the chemical chamber 110 to be primed with the chemical solution as the chemical solution passes from the lower chemical chamber 112*b* into the upper chemical chamber 112*a* via the one-way valve 124. The chemical chamber 110 may additionally be primed with staged chemical solution during dispensing, e.g., during the dispensing stroke, when the new chemical solution is drawn into the lower chemical chamber 112*b* from the chemical supply via the inlet 130 while the valve 104 delivers the pressurized air from the first outlet 104*d* to the lower cavity 152*b* when opened from its normally closed position.

The rate at which the chemical is dispensed from each respective syringe pump 100 may be controlled by the controlling effective valve orifice area of the valve orifice 171 of the adjustable valve 170, as provided above in connection with FIGS. 1*a*-1*h* as well as the other approaches to controlling the amount of chemical dispensed from each respective syringe pump 100 provided herein.

Mechanical Operation of Syringe Pump

In other implementations, the syringe pump 100 may be actuated by means of electrical signals in place of air signals, and the drive mechanism 150 may be mechanically driven such as via a linear stepper motor or a proportional solenoid. For instance, the control system 400 may cause electrical signals to be sent to cause mechanical operation of the drive mechanism 150. More particularly, other linear driving mechanisms may be used in place of the disclosed pneumatic or hydraulic drive mechanisms 150. One such example would be a linear stepper motor drive. With this implementation the linear stepper drive may be coupled to the piston and drive shaft assembly and may take the place of the drive chamber 152. The linear stepper drive may operate by rotating the stepper motor, resulting in extension of a linear actuator at the rate necessary to achieve the desired chemical flow rate. For instance, the drive shaft 160 may be threaded and be extended during rotation of the stepper motor. This implementation may achieve the same benefits of the continuous priming function of the syringe pump 100 disclosed herein due to the staged chemical being received during the dispensing stroke of the dispensing cycle, and the syringe pump 100 being quickly recharged during the resetting stroke in which the upper chemical chamber 112*a* is primed. This implementation could also potentially eliminate the need for a control valve 170 and a flow meter 185, since the flow rate should be directly proportional to the rate at which the piston 120 is extended by the linear stepper. However, in pressurized fluid delivery systems in which a pump is required to inject chemical into a pressurized system, this type of drive mechanism may experience challenges with achieving the correct delivery pressure while maintaining the target flow rate. For example, in the event that a viscous fluid is required to be dispensed at a high flow rate, the stepper motor may not have enough torque to achieve the desired flow rate at high pressure, resulting in the motor slipping and missing steps. To ensure that the stepper motor remains accurate, an encoder may be used track the motor steps and ensure that steps are not missed.

Fluid Delivery Manifold and Syringe Pump Dispensing into Fluid Management System In additional examples of pneumatic operation of the fluid delivery manifold 200 and syringe pump(s) 100, the first outlet 104*d* of the valve 104 may be split to the fluid delivery manifold 200 as well as to the lower cavity 152*b* of the syringe pump(s) 100 of the fluid management system 500 of FIG. 1, which may be provided in combination with various components of a vehicle wash system, e.g., a car wash.

In FIG. 5*a*, the fluid management system 500 of FIG. 1 is schematically illustrated in combination with a vehicle wash system 600, a main car wash controller 700 and a communications gateway 800.

The vehicle wash system 600 may include chemical supplies 610, 615 (e.g., individual barrels of a chemical), vehicle wash applicators 630, one or more fluid lines 635, a fluid source 640 which may be in addition to or the same as the pressurized fluid source 107 (e.g., a pressurized water pump) of the fluid management system 500, and a pressure sensor 645. The components of the vehicle wash system 600 may be housed within a single vehicle wash location. The chemical supplies 610, 615 may include individual vessels (e.g., barrels) of a chemical, such as a concentrated chemical, pre-mixed chemicals, or a chemical solution (e.g., a pre-mixed or pre-diluted chemical solution in water). Although two chemical supplies 610, 615 are illustrated as being fluidly coupled to the fluid management system 500, more or fewer chemical supplies may deliver chemical to the system 500. The vehicle wash applicators 630 may include chemical and/or mixed solution applicators such as fluid nozzles, foamers, and other dispensers. The fluid lines 635 may carry the fluid dispensed from the system 500 to the vehicle wash applicators 630. The fluid source 640 may be configured as a water pump and/or a municipal water supply. The fluid source 640 may be the same or different from the pressurized motive fluid source 107 and may provide motive fluid to the motive fluid delivery device or mixing site. The fluid source 640 may be communicatively coupled to the control system 400 and optionally the power source 520 for the delivery of the motive fluid. For instance, the control system 400 may cause control signals to be transmitted to the fluid source 640 for delivery of motive fluid to the fluid management system. In another example, upon receipt of power from the power source 520 in response to control signals received from the one or more processors 410, the fluid source 640 may deliver fluid pressure to cause motive fluid to be delivered to the fluid delivery manifold 200 during an on-cycle. In addition to providing water pressure to the fluid management system 500, the fluid source 640 may provide pressure assistance to a water supply, e.g., a municipal water supply, or may provide the sole source of pressure to the motive fluid delivered to the fluid management system 500.

The main car wash controller 700 illustrated in FIG. 5*a* may generally be a power source that delivers timed control voltage signals to car wash devices at the vehicle wash location. Such signals generally provide timing signals and operational parameters for operating devices within the vehicle wash facility during the vehicle wash operations. While the car wash controller 700 may control the operation of other car wash devices at the vehicle wash location, the car wash controller 700 more simply delivers a signal to the fluid management system 500 for subsequent interpretation by the control system 400 and action. This configuration provides the fluid management system 500 autonomy relative to other devices within the car wash that are controlled in a customary manner by the car wash controller 700. More particularly, the main car wash controller 700 is responsible not only for initiating operations such as initiating proper air, water, and chemical dispensing, but also for coordinating other aspects of the car wash including the position of the vehicle relative to the dispensing and cleaning apparatus. It does this by using programmable logic controller (PLC) or similar technology to send signals to various car wash equipment. These signals might be control voltages, analog signals, or digital signals. While the car wash controller 700 can control a variety of different vehicle wash components, the fluid management system 500 of the present disclosure are responsible for orchestrating their own operation due to the ability of the control system 400 to interpret control signals, e.g., timing signals, received from the car wash controller 700 and generate separate control signals for operation of the vehicle wash component according to parameters set by the control system 400. In a vehicle wash location, a number of car wash components may thus be controlled by the car wash controller 700, while fluid management systems provided according to implementations of the present disclosure operate independently from the car wash controller's 700 commands.

The communications gateway 800 illustrated in FIG. 5*a* may be configured to communicatively couple the fluid management system 500 to a computer network 1000, and may be configured with a processor and memory. Each vehicle wash location may include its own communications gateway 800 and the gateway 800 may be coupled to remote locations via the internet, as well as to the local devices and systems at the vehicle wash location via the internet via a local area network (LAN) or other near range communication equivalents, e.g., Wi-Fi, Bluetooth or LoRa, RFID, NFC, ANT, Zigbee, or WLAN, or via long range communication equivalents such as WAN. Accordingly, the communications gateway 800 may be coupled to multiple fluid management systems located at the vehicle wash location. The communications gateway 800 may be configured to send programming updates or operational parameters to the control system 400 of the fluid management system(s).

Returning to the fluid management system 500 of FIG. 1, the system 500 may be configured to facilitate car wash operations of the vehicle wash system 600 of FIG. 5*a* under the control of the control system 400 by causing the fluid management system 500 to dispense chemical received from the chemical supplies 610, 615, dispense motive fluid from fluid received from the fluid source 640, and dispense a mixed solution of chemical and motive fluid to one or more vehicle wash applicators 630. The control system 400 may be configured to receive control signals from external sources such as the main car wash controller 700 and communications gateway 800 located at the same vehicle wash setting as the fluid management system 500, and in response to receiving the control signals, the one or more processors 410 may interpret the signals and instruct one or more of the components of the fluid management system 500 to operate, for instance according to separate instructions as provided herein.

Turning to FIG. 5*b*, the fluid management system 500 may be configured for routing and regulating air pressure to the syringe pumps 100 and the fluid delivery manifold 200 thereof, as well as other pneumatically operated components of the vehicle wash system 600. In FIG. 5*b*, the valve 104 may be operated to cause coordinated dispensing from the syringe pump 100 and the fluid delivery manifold 200, which are illustrated as an assembly with the loading valve 300. Although one vehicle wash assembly is shown in FIG. 5*b*, it will be appreciated that multiple valves 104 may be provided to operate multiple assemblies, and for instance, the inlets of the fluid delivery manifold 200 may be coupled to define a fluid ingress channel 211 (FIG. 2*b*) and be implemented in a fluid management system of the present disclosure. In FIG. 5*b*, the first outlet 104*d* of the valve 104 is illustrated as being split to the lower cavity 152*b* of the syringe pump 100 as well as to the fluid delivery manifold 200.

In operation of the assembly, in the absence of a control signal, the valve 104 may be in the idle state, and the piston 153 may be held under pressure in its retracted state, and the valve plunger 225 (FIG. 2*b*) may block the valve orifice 233 to prevent flow of motive fluid from the fluid outlet 230 of the fluid delivery manifold 200, e.g., due to the biasing force of the return spring 245 holding the valve plunger 225 in the closed position. In this state, the fluid delivery manifold 200 may not receive a supply of compressed air at the air inlet port 235.

Upon receipt of a control signal, the valve 104 may switch and cause the first outlet 104*d* move to an open position and the pressurized air to be routed from split port 104*d*1 to the lower pneumatic port 157*b* to activate the plunger 153 such that the drive mechanism 150 dispenses the pressurized chemical from the outlet 140 of the syringe pump 100, while the pressurized air from the split port 104*d*2 simultaneously delivers pressurized air to the air inlet port 235 of an integrated valve 205 of the fluid delivery manifold 200 (FIG. 2*b*), resulting in dispensing of motive fluid for downstream mixing with the dispensed chemical at the loading valve 300 or other mixing site.

During the dispensing stroke of the syringe pump 100, the pressure experienced by the liquid chemical in the fluid chamber 112 is due to the drive mechanism 150 exerting a driving force on the piston 120 in the distal or dispensing direction of the syringe pump 100. More particularly, the force of the drive mechanism 150 in the dispensing direction results in the one-way valve 124 of the piston 120 being forced shut, thus pressurizing the chemical in the upper chemical chamber 112*a*, which is sealed via the circumferential seal 123 and closed one-way valve 124. The pressurized chemical is thus forced from the upper chemical chamber 112*a* into the adjustable valve 170, first through a valve orifice 171 (FIG. 4*g*), and then past the upper check valve 176 to the outlet 140 and fluidly coupled downstream components, e.g., one or more outlet tubes 144, 146. Due to the fluid coupling of the syringe pump 100 to the loading valve 300, e.g., directly or via the outlet tube 146 (FIG. 4*h*), the loading valve 300 begins to pressurize during the dispensing stroke as the pressurized chemical is received therein from the syringe pump 100. As the fluid pressure builds within a normally closed loading chamber 335 (FIG. 6*d*) of the loading valve 300, the pressure eventually reaches a point at which the force of the pressurized chemical in the loading chamber 335 is great enough to overcome an opening threshold, e.g., of a biasing mechanism 315 (e.g., FIG. 6*b*), and cause the loading valve 300 to open and permit passage of pressurized chemical from the loading chamber 335 into a motive fluid pathway 310 (e.g., FIG. 6*d*) of the loading valve 300 such that a mixed solution of motive fluid and pressurized chemical is directed to the one or more vehicle wash applicators 630. In such embodiments, the pressurized chemical may be injected into the motive fluid stream by pressurizing the chemical to a pressure greater than that of the motive fluid. In other words, in implementations, the pressure delta from the fluid to the chemical must be greater than zero to achieve chemical injection.

Once the dispensing stroke of the dispensing cycle ends, the fluid pressure within the loading chamber 335 rapidly drops and it returns to its normally closed position to stop the flow of chemical from the loading valve 300. Since the loading valve 300 closes or shuts-off once the chemical pressure has dropped below its opening threshold, the chemical within the fluid coupling between the loading valve 300 and the syringe pump 100 (e.g., in the chemical outlet tubes 144, 146 or other fluid conduit defined in a body or housing of the assembly) remains pressurized between dispensing cycles. As a result, when the next dispensing cycle starts, only a small amount of pressure needs to be built up in order to overcome the opening threshold of the loading chamber 335, also resulting in a rapid injection response upon the start of the next or subsequent operational cycle of the syringe pump 100 or system 500.

Once the on cycle of the fluid delivery manifold 200 has ended, the valve 104 switches returning the fluid delivery manifold 200 to its idle state, and the air inlet port 235 is relieved or vented to atmosphere. The pressure within the integrated valve 205 drops and the valve plunger 225 returns back into its fully extended position to block the valve orifice 233, e.g., under the force of a return spring 245, thereby prohibiting flow of motive fluid. The valve plunger 225 remains in this extended position with the valve orifice 233 closed-off until the next on cycle is triggered.

The end of the on cycle and the dispensing stroke may coincide with each other for instance when same or a common valve 104 is fluidly coupled to each of the syringe pump 100 and fluid delivery manifold 200, for instance as shown in FIG. 5*b*. In such cases, a duration of the dispensing stroke and a duration of the on cycle may be the same. Further, the dispensing stroke and the on cycle may be initiated simultaneously. In alternative configurations, separate valves 104 of the valve bank 103 of the fluid delivery system 500 may be responsible for actuating a respective syringe pump 100 and fluid delivery manifold 200. In such cases, the air signals delivered to the fluid delivery manifold 200 and the syringe pump 100 from separate valves 104 may differ from one another, for instance in order to provide a different duration of the air signal delivered for the dispensing stroke of the syringe pump 100 compared to the duration of the air signal delivered for the on cycle of the fluid delivery manifold 200, to stagger the air signals, to split the air signals for use with other pneumatically operated vehicle wash components, to operate the components at different pressures, and combinations thereof.

In some implementations, the control system 400 and/or the main car wash controller 700 may signal operation of the assembly components. The car wash controller 700 may send a signal to the control system 400, and the control system 400 may cause the syringe pump 100 and the fluid delivery manifold 200 to operate, e.g., via causing one or more solenoid valves 104 to be actuated. In some cases, the control system 400 may analyze the received signal and generate a new control signal for sending to the pressure regulator 105 and/or the valve(s) 104, to initiate the dispensing operations of the syringe pump 100 and fluid delivery manifold 200.

The rate at which the chemical is dispensed from the syringe pump 100 and into the loading chamber 335 may be controlled by the effective valve orifice area of the valve orifice 171 of the adjustable valve 170 of the syringe pump 100, as provided above at least in connection with FIGS. 4*a*-4*g*, or may be controlled using other approaches provided above.

Loading Valve

According to the present disclosure, the loading valve 300 may be located downstream of the fluid delivery manifold 200 and a chemical supply, e.g., a syringe pump 100, and configured to receive dispensed motive fluid and chemical. As illustrated in FIGS. 6*a*-6*d*, the loading valve 300 may include a chemical inlet 305, a body 308, a pass-through conduit 310 also referred to as a motive fluid pathway, a biasing mechanism 315, a biasing mechanism housing 318 with an adjustable compression screw 319, a diaphragm 320, an injection nozzle 325, a sealing lip 330, a chemical priming cavity 335 configured as a loading chamber, and a buffer 340.

Figure 6A:
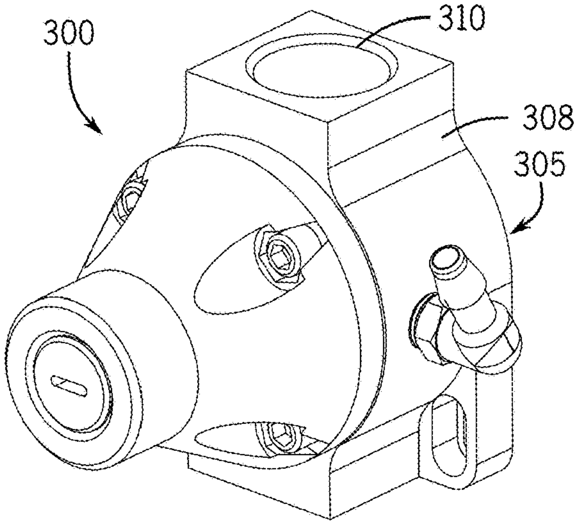
FIGS. 6*a*-6*d* illustrate various views of a loading valve, according to implementations of the present disclosure.
Figure 6B:
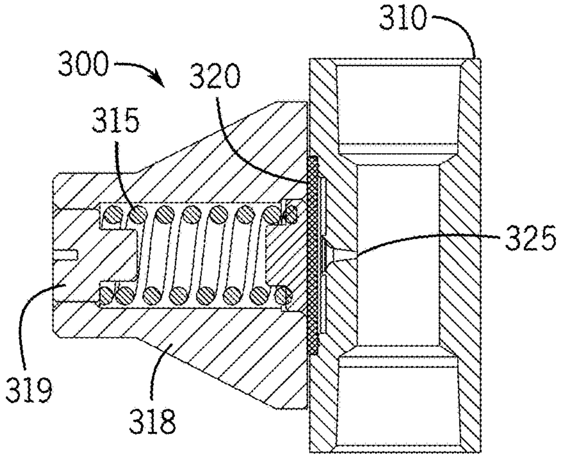
Figure 6C:
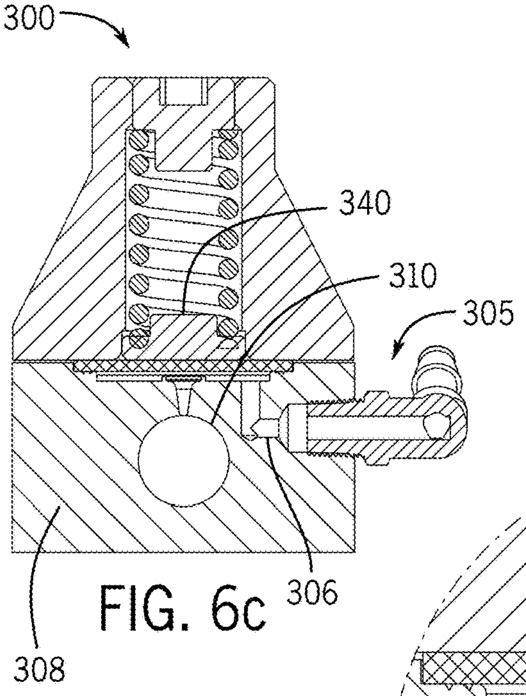
Figure 6D:
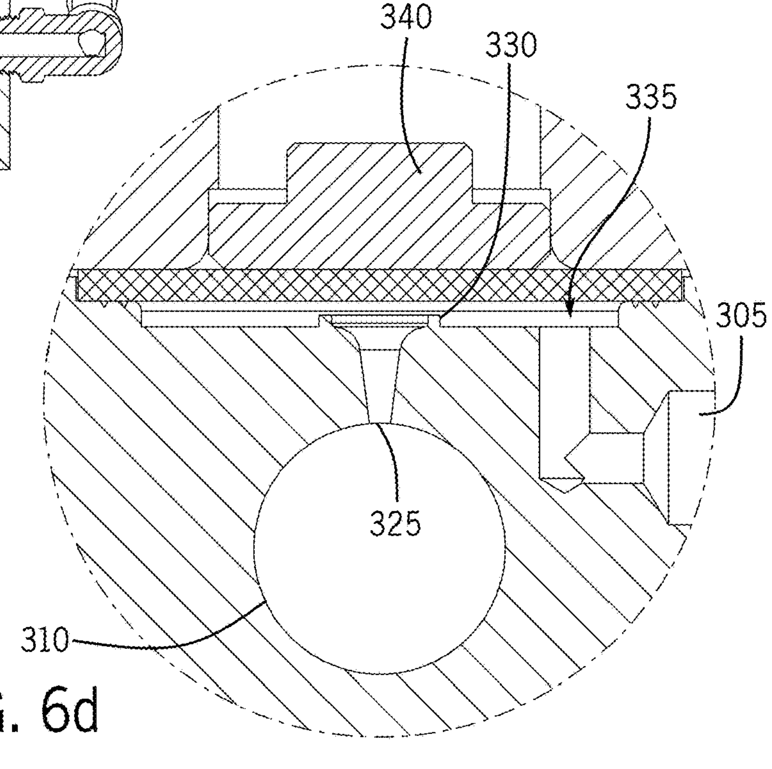

The chemical priming cavity 335 may be configured as a loading chamber and may receive pressurized chemical from the syringe pump 100 via an egress of a channel 306 of the chemical inlet 305 (FIG. 6*c*). The priming cavity 335 may be covered by the diaphragm 320, and the size of the priming cavity 335 may be selected based on desired injection characteristics.

The loading valve 300 may be configured to prohibit chemical received from the syringe pump 100 from exiting through the injection nozzle 325 until the chemical pressure has reached a predefined threshold.

When the syringe pump 100 or fluid management system (e.g., system 500) is idle or between operational cycles, the loading valve 300 may be in a normal/closed position due to the biasing mechanism 315 being in a relaxed, untensed state. In this normal/closed position, the biasing mechanism 315 may exert a biasing pressure as a downward force on the diaphragm 320, resulting in the diaphragm 320 flexing and being forced into the sealing lip 330. In this position of the diaphragm 320, the chemical priming cavity 335 is sealed from the injection nozzle 325 and flow of chemical through the nozzle 325 may thus be prohibited. Since the chemical priming cavity 335, chemical inlet 305, the chemical conduits (e.g., outlet tubes 144, 146) and the syringe pump 100 are all fluidly coupled, when the syringe pump 100 injection cycle begins the chemical contained within this fluid coupling begins to pressurize. As the fluid pressure builds within the chemical priming cavity 335, e.g., during the dispensing stroke, the pressure eventually reaches a point at which the force of the pressurized chemical exerted on the diaphragm 320 is great enough to overcome the biasing force of the biasing mechanism 315. As the pressure exceeds the force exerted by the biasing mechanism 315, a predefined pressure threshold is reached and the diaphragm 320 begins to separate from the sealing lip 330 and permits passage of pressurized chemical from the priming cavity 335 into the injection nozzle 325 such that the chemical is dispensed onto the pass-through conduit 310, and the dispensed chemical may be mixed for instance with motive fluid from a fluid delivery manifold 200. Once the injection cycle ends, the fluid pressure within the chemical priming cavity 335 rapidly drops, and the biasing mechanism 315 once again forces the diaphragm 320 into the closed position and stops the flow of chemical.

Although the operation of one loading valve 300 is described, it will be appreciated that multiple loading valves may be provided and operated individually or simultaneously. For instance the fluid management system 500 of FIG. 1 is illustrated as including four loading valves 300 each coupled to a respective syringe pump 100 and outlet of a fluid delivery manifold 200, but more or fewer loading valves may be provided for instance based on a target area where the chemical is to be dispensed.

Methods of Delivering Motive Fluid from Fluid Delivery Manifolds

Figure 7:
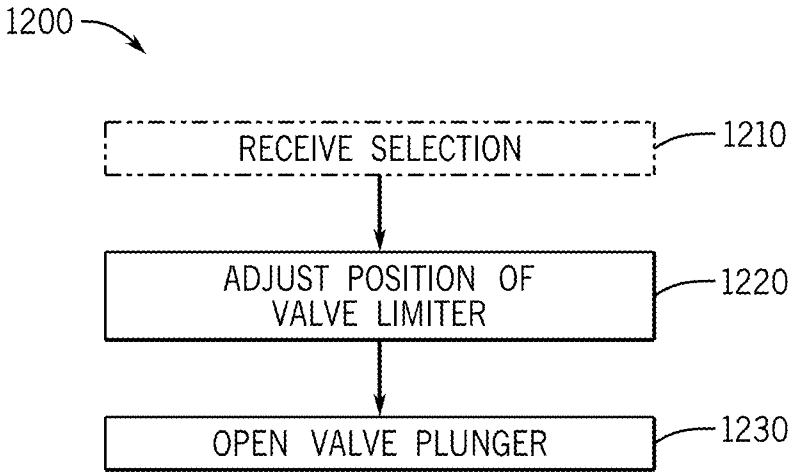
FIG. 7 is a flowchart of a method of delivering motive fluid from a fluid delivery manifold according to implementations of the present disclosure.

A method of delivering motive fluid from a fluid delivery manifold 200 is illustrated in the flowchart of FIG. 7. In FIG. 7, the method 1200 may optionally involve receiving a selection (step 1210). For instance, the control system 400 may be programmed to receive a user selection. The selection may include an outlet pressure, a fluid flow rate from the outlet, a target outlet pressure and/or flow rate, a chemical flow rate, parameters such as temperature of the fluid, chemical, atmosphere, nozzle type, fluid type, chemical type and so on.

The method 1200 may involve adjusting a position of the valve limiter 255 (step 1220). For instance, the control system 400 may be programmed cause the position of the valve to be adjusted, which may result in adjustably controlling the effective valve orifice area of a valve orifice 233 of the fluid outlet 230 of the manifold 200 based on a distance of movement of the valve plunger 225 to an open position thereof.

The method 1200 may further involve opening the valve plunger 225 (step 1230). For instance, the control system 400 may be programmed to cause the valve plunger 225 to be moved to the open position to result in fluid being dispensed based on the selection. More particularly, by opening the valve plunger 225, it contacts the valve limiter 255 resulting in the effective valve orifice area of the valve orifice 233 being sized to permit fluid dispensing from the fluid outlet 230 based on the selection, which may result in dispensing at a target flow rate, a target outlet pressure, or both. The dispensed motive fluid may be received at downstream components for subsequent application to vehicles in the vehicle wash as provided herein.

The steps of method 1200 may proceed simultaneously with the control system 400 causing adjustments and/or dispensing from the syringe pump 100 as well as other components of the fluid management and vehicle wash systems of the present disclosure. For instance, chemical and fluid may be dispensed simultaneously from multiple syringe pumps 100 and multiple fluid outlets of the fluid delivery manifold 200, and the flow of chemical from the syringe pumps 100 may dispense chemical at different rates based on flow adjustments of the syringe pumps' components, e.g., the adjustable valves 170, while the motive fluid may be dispensed at different rates from the fluid outlets, e.g., based on a position of the valve limiter 255 associated with each integrated valve 205. Further, in some cases, both the duration of dispensing and rates of dispensing may be different across the syringe pumps 100 and integrated valves of the fluid delivery manifold 200.

The disclosed embodiments may be combined with: features of the fluid delivery management systems disclosed in U.S. Pat. No. 10,443,747 B2, and entitled "Manifold with Integrated Valve"; features of the sensing and control systems and methods of the disclosure of U.S. Publication No. US 2021/0349482 A1, entitled "Sensing and control of vehicle wash components and systems and methods thereof"; U.S. Patent Application Publication No. US20230139033A1, entitled "SYSTEMS AND METHODS FOR MONITORING AND CONTROLLING DILUTION RATES", U.S. Non-Provisional patent application Ser. No. 18/596,979, filed Mar. 6, 2024, and entitled "CHEMICAL DELIVERY SYSTEM WITH DILUTION CONTROL"; features of chemical delivery systems that include eductors, e.g., venturi valves, that rely on vacuum pressure for chemical dispensing are disclosed in U.S. Pat. No. 8,887,743 B2; and features of dilution devices are disclosed in US 2019/0022607 A1, the disclosures of all of which are incorporated herein by reference for any useful purpose.

Features from any of the disclosed embodiments may be used in combination with one another, without limitation. In addition, other features and advantages of the present disclosure will become apparent to those of ordinary skill in the art through consideration of the following detailed description and the accompanying drawings.

What is claimed is:

1. A fluid delivery manifold for use with a fluid delivery system, the fluid delivery manifold comprising:

a fluid passageway comprising a fluid inlet and a fluid outlet;

at least one integrated valve, each integrated valve comprising a plunger housing, the plunger housing comprising an air chamber and configured to receive a valve limiter within an interior thereof, wherein the fluid inlet, the fluid outlet, and the plunger housing are integrally-constructed, and wherein the air chamber and the fluid passageway are non-fluidly coupled relative to each other;

a valve plunger arranged in the plunger housing configured to block a valve orifice of the fluid outlet in a closed position of the valve plunger to prevent passage of fluid from the fluid inlet through the valve orifice, and to open the valve orifice in an open position of the valve plunger to permit the passage of the fluid from the fluid inlet through the valve orifice for dispensing from the fluid outlet; and an actuator assembly coupled to each integrated valve of the at least one integrated valve, each actuator assembly comprising an actuator and the valve limiter, wherein the actuator is configured to adjust a position of the valve limiter within the interior of the air chamber to adjustably control an effective valve orifice area of the valve orifice based on a distance of movement of the valve plunger to the open position;

a pressure sensor fluidly coupled to the fluid delivery manifold located on a motive fluid pump fluidly coupled to the fluid inlet;

another pressure sensor fluidly coupled to the fluid outlet; and a control system integrated into an assembly including the fluid delivery manifold and communicatively coupled to the actuator assembly, the pressure sensor and the another pressure sensor, wherein the control system is configured to cause the actuator assembly to adjust the position of the valve limiter at least based on pressure sensor data of the pressure sensor and of the another pressure sensor.

2. The fluid delivery manifold of claim 1, wherein the valve plunger comprises a parabolic tip.

3. The fluid delivery manifold of claim 1, wherein the actuator is configured for linearly adjusting the valve limiter to cause a linear change in the effective valve orifice area, wherein the valve limiter is in a threaded engagement with the actuator, the actuator being configured as one of a linear stepper motor or a proportional solenoid.

4. The fluid delivery manifold of claim 1, further comprising a return spring configured to engage with a plunger head of the valve plunger for biasing the valve plunger in the closed position such that the valve plunger normally blocks the passage of the fluid through the valve orifice, the air chamber is configured to receive pressurized air to overcome a bias of the return spring during an on cycle of the fluid delivery manifold to thereby cause the valve plunger to move to the open position by a predetermined distance based on the position of the valve limiter.

5. The fluid delivery manifold of claim 4, wherein the valve limiter is arranged within coils of the return spring or the valve limiter is configured as a sleeve arranged about an exterior of the coils.

6. The fluid delivery manifold of claim 1, wherein the control system is configured to receive a selection from a user corresponding to a selected outlet pressure, and based on the selected outlet pressure, the control system is configured to cause the actuator assembly to adjust the position of the valve limiter to reach a target flow rate or a target outlet pressure of motive fluid when the valve plunger is in the open position.

7. The fluid delivery manifold of claim 1, wherein the valve plunger is normally in the closed position such that the valve plunger blocks the valve orifice, and the air chamber is configured to receive pressurized air to thereby cause the valve plunger to move to the open position by a predetermined distance based on the position of the valve limiter, and further comprising at least one solenoid valve fluidly coupled to the air chamber for delivering the pressurized air to the air chamber, wherein the control system is further configured to control an actuation status of each of the at least one solenoid valve.

8. The fluid delivery manifold of claim 1, wherein the control system is further configured to control at least one chemical supply, wherein each of the at least one chemical supplies is fluidly coupled to a mixing site, wherein each mixing site is configured to receive motive fluid from the fluid outlet and chemical from a respective chemical supply of the at least one chemical supply, mix the motive fluid and the chemical to form a mixture, and dispense the mixture.

9. The fluid delivery manifold of claim 1, wherein the at least one integrated valve comprises a plurality of integrated valves, and wherein the control system is communicatively coupled to and configured to cause each actuator of the plurality of integrated valves to control the position of each valve limiter.

10. The fluid delivery manifold assembly of claim 9, wherein each of the air chambers is fluidly coupled to an individual solenoid valve of the at least one solenoid valve such that the control system is configured to cause individual control of fluid dispensing from each of the fluid outlets of the plurality of integrated valves.

11. The fluid delivery manifold of claim 1, wherein the fluid passageway is configured as a common fluid channel of successively fluidly connected individual fluid inlets.

12. A method of delivering motive fluid from a fluid delivery manifold for use with a fluid delivery system, comprising:

using the fluid delivery manifold of claim 1 to adjust the position of the valve limiter; and causing the valve plunger to be moved to the open position in which the valve plunger contacts the valve limiter to thereby define the effective valve orifice area of the valve orifice such that the fluid is dispensed from the fluid outlet at a flow rate based on the effective valve orifice area.

13. The fluid delivery manifold of claim 1, wherein the fluid delivery manifold, the control system, and at least a portion of at least one chemical supply are mounted on a common structure.

14. The fluid delivery manifold of claim 1, wherein the fluid passageway further comprises a fluid rail configured to receive individual fluid inlets at a plurality of outlet ports of the fluid rail, and an inlet port of the fluid rail is fluidly coupled between a motive fluid source and the plurality of outlet ports.

* * * * *